(12) United States Patent
Almeida

(10) Patent No.: US 10,346,608 B2
(45) Date of Patent: Jul. 9, 2019

(54) VIRUS IMMUNE COMPUTER SYSTEM AND METHOD

(71) Applicant: John Almeida, Plano, TX (US)

(72) Inventor: John Almeida, Plano, TX (US)

( * ) Notice: Subject to any disclaimer, the term of this patent is extended or adjusted under 35 U.S.C. 154(b) by 0 days.

(21) Appl. No.: 16/008,779

(22) Filed: Jun. 14, 2018

(65) Prior Publication Data

US 2019/0180027 A1      Jun. 13, 2019

Related U.S. Application Data

(63) Continuation-in-part of application No. 15/839,450, filed on Dec. 12, 2017, and a continuation-in-part of application No. 16/005,399, filed on Jun. 11, 2018.

(51) Int. Cl.
| | |
|---|---|
| *G06F 21/56* | (2013.01) |
| *G06F 21/51* | (2013.01) |
| *G06F 8/61* | (2018.01) |
| *H04L 9/08* | (2006.01) |
| *G06F 9/445* | (2018.01) |

(52) U.S. Cl.
CPC .............. *G06F 21/51* (2013.01); *G06F 8/61* (2013.01); *G06F 9/445* (2013.01); *G06F 21/56* (2013.01); *H04L 9/0894* (2013.01); *G06F 2221/033* (2013.01)

(58) Field of Classification Search
CPC . G06F 21/51; G06F 8/61; G06F 9/445; G06F 21/56; G06F 2221/033; H04L 9/0894
See application file for complete search history.

(56) References Cited

U.S. PATENT DOCUMENTS

| | | |
|---|---|---|
| 4,757,534 A | 7/1988 | Matyas et al. |
| 4,847,902 A | 7/1989 | Hampson |
| 6,212,635 B1 * | 4/2001 | Reardon ................. G06F 21/34 380/30 |
| 6,941,284 B2 | 9/2005 | DeFilippo et al. |
| | | (Continued) |

OTHER PUBLICATIONS

Korean Intellectual Property Office, International Search Report on PCT/US2018/051196 (identical daughter application of U.S. Appl. No. 16/008,779), dated Jan. 3, 2019, 3 pgs., PCT/ISA/210, Republic of Korea.

(Continued)

*Primary Examiner* — Yonas A Bayou
(74) *Attorney, Agent, or Firm* — Louis Ventre, Jr.

(57) ABSTRACT

A method and apparatus prevents hacker code from infecting an application program by requiring decryption of the application program prior to running the application program on a computer. The device is preferably a computer system that includes a dongle, or a separate unit that is connected or connectable to the computer. A security program decrypts a first key with a second key stored on the dongle. When a new application is installed the first time on the computer, the security program uses a decrypted first key to encrypt whatever is installed such that the encrypted application program is the only installed version of the application program on any non-transitory computer readable memory accessible by the computer. When a command is given to startup the application program, whatever code is needed for startup is first decrypted using the decrypted first key.

16 Claims, 27 Drawing Sheets

(56) References Cited

U.S. PATENT DOCUMENTS

| | | | |
|---|---|---|---|
| 7,228,436 B2 | 6/2007 | Kawaguchi | |
| 2002/0029347 A1* | 3/2002 | Edelman | G06F 21/10 |
| | | | 713/193 |
| 2007/0250627 A1* | 10/2007 | May | G06F 21/56 |
| | | | 709/225 |
| 2010/0017623 A1 | 1/2010 | Ogram | |
| 2011/0035813 A1 | 2/2011 | Trantham | |
| 2011/0113235 A1* | 5/2011 | Erickson | G06F 21/34 |
| | | | 713/152 |
| 2013/0227641 A1* | 8/2013 | White | H04L 63/20 |
| | | | 726/1 |
| 2014/0075517 A1* | 3/2014 | Alrabady | G06F 21/572 |
| | | | 726/4 |
| 2014/0250299 A1* | 9/2014 | Kim | G06F 21/51 |
| | | | 713/158 |
| 2017/0220330 A1* | 8/2017 | Soini | G06F 8/61 |
| 2018/0137272 A1* | 5/2018 | Kamal | H04W 4/80 |

OTHER PUBLICATIONS

Korean Intellectual Property Office, International Search Report on PCT/US2018/051196 (identical daughter application of U.S. Appl. No. 16/008,779), dated Jan. 3, 2019, 5 pgs., PCT/ISA/237, Republic of Korea.

\* cited by examiner

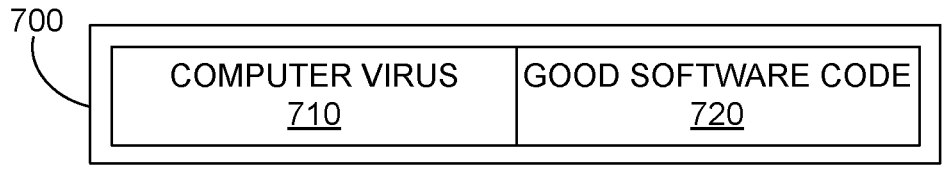
FIG. 5
FIG. 6
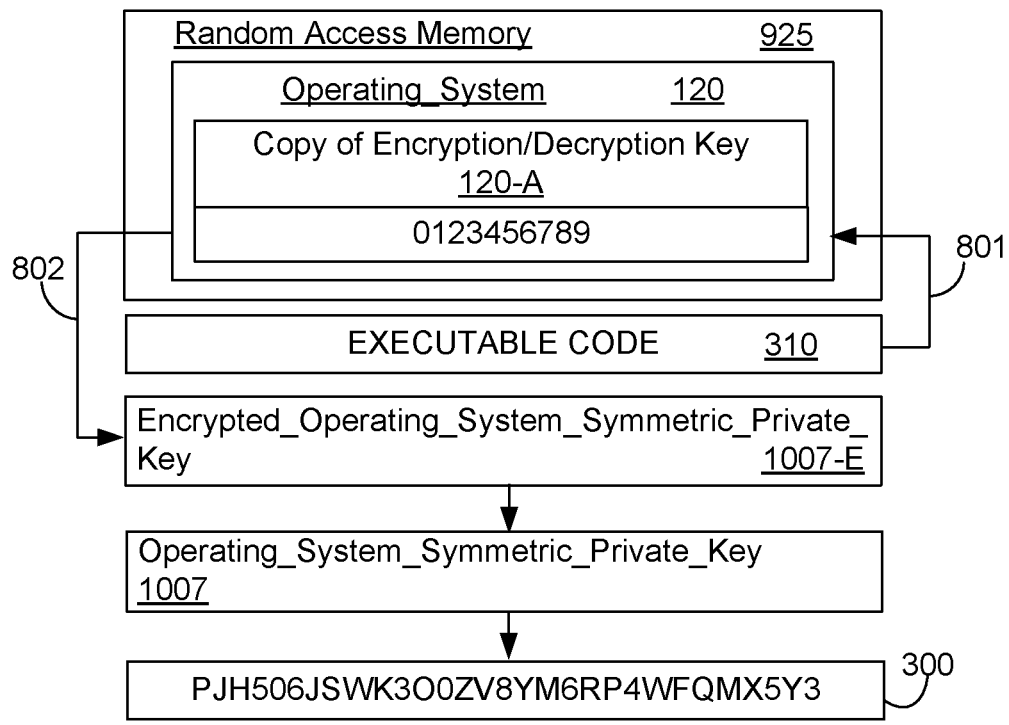
FIG. 7 PRIOR ART
FIG. 8A

PRIOR ART
FIG. 15  CODE INJECTION HACKING
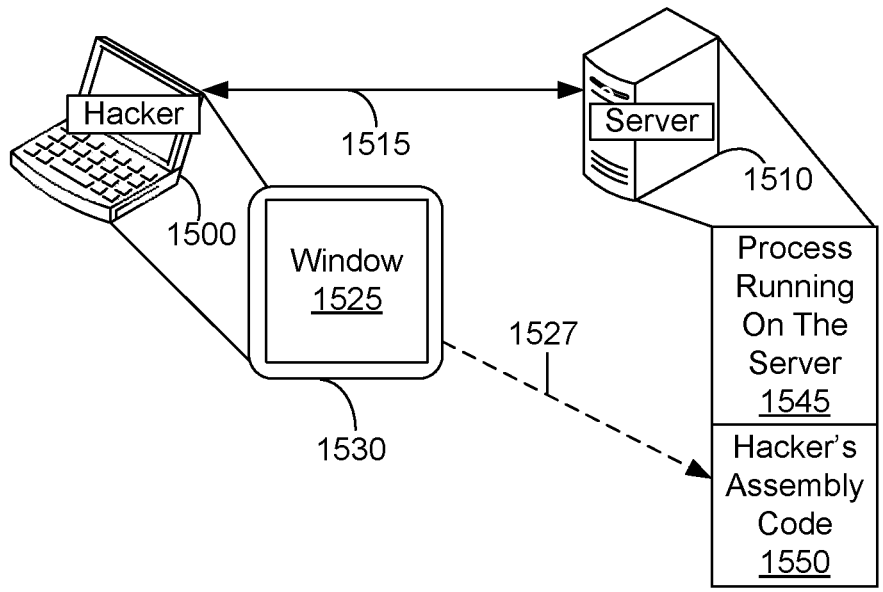
PRIOR ART
FIG. 16  CODE EXECUTION
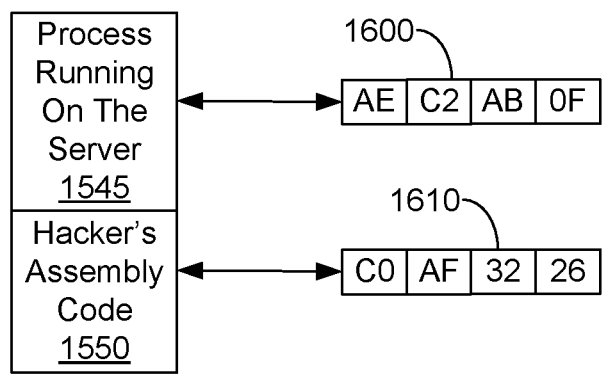

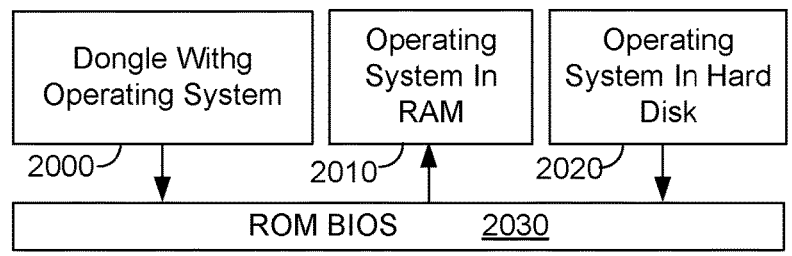
PRIOR ART
FIG.20 OPERATING SYSTEM LOADING
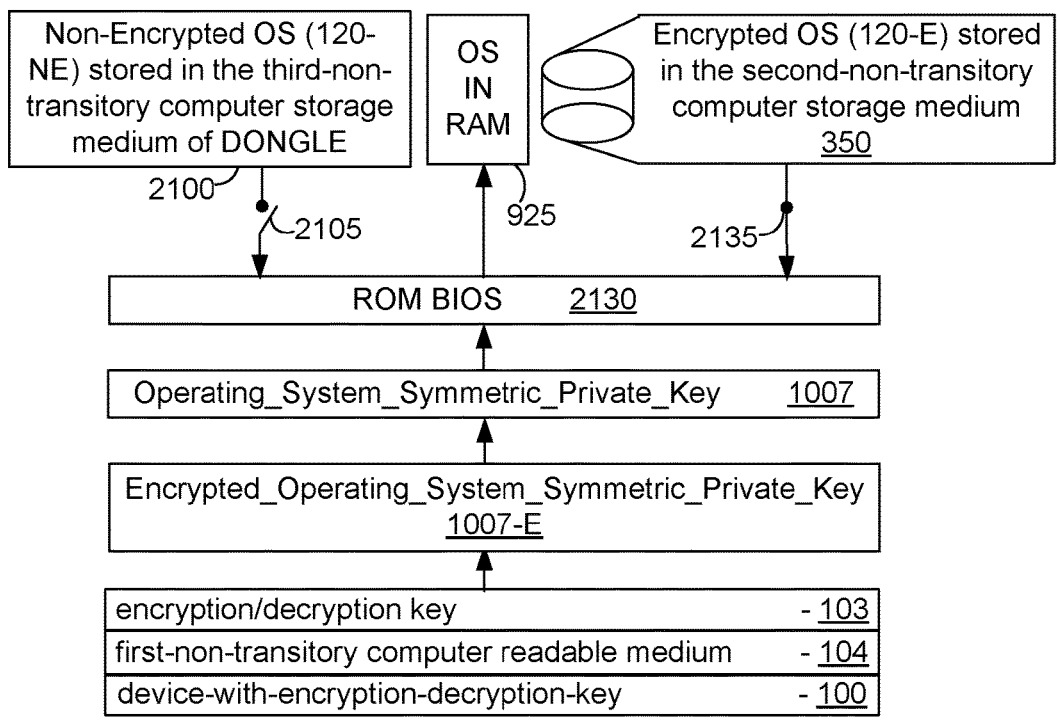
FIG.21
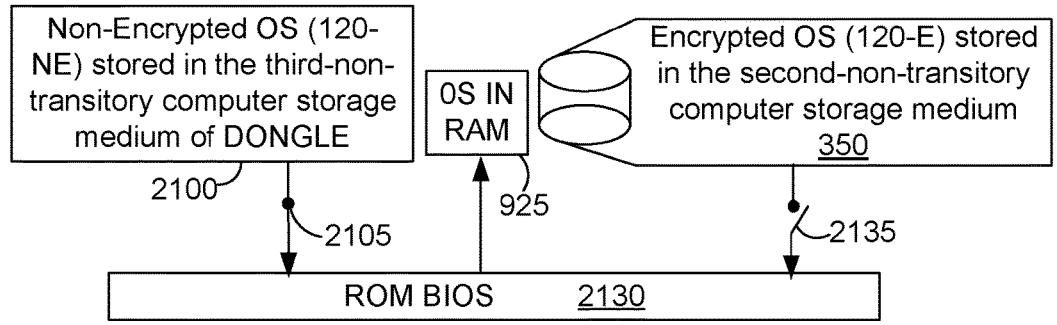
FIG.22

Second preferred method:: A method for controlling loading of multiple operating systems into a random access memory accessible by a computer, the computer comprising a first non-transitory computer storage medium, a second non-transitory computer storage medium, a third non-transitory computer storage medium, the random access memory, a central processing unit, a basic input/output system, and a switch
2500

First storing step: storing a first key in the first non-transitory computer storage medium, the first key usable for encryption of an operating system symmetric private key and decryption of an encrypted operating system symmetric private key
2505

Second storing step: storing an encrypted operating system on the computer in the second non-transitory computer storage medium
2510

Third storing step: storing an encrypted operating system symmetric private key in the second non-transitory computer storage medium
2515

Fourth storing step: storing a non-encrypted operating system on the computer in the third non-transitory computer storage medium
2520

Setting step: setting the switch to enable the basic input/output system to load either the encrypted operating system or the non-encrypted operating system into the random access memory
2525

Configuring step: configuring the computer to power up and then to implement steps comprising:
making the first key available from the first non-transitory computer storage medium to the basic input/output system;
when the switch is set to enable the basic input/output system to load the encrypted operating system, direct the basic input/output system to read the encrypted operating system from the second non-transitory computer storage medium and using the first key to decrypt the encrypted operating system symmetric private key deriving a decrypted operating system symmetric private key and using the decrypted operating system symmetric private key to decrypt the encrypted operating system as requested by the central processing unit; and, when the switch is set to enable the basic input/output system to load the non-encrypted operating system from the third non-transitory computer storage medium, directing the basic input/output system to disable access to the first key, then read the non-encrypted operating system from the third non-transitory computer storage medium, and then store the non-encrypted operating system in the random access memory accessible by the computer.
2530

FIG.25

| Third preferred method: A method for improving operation of a computer to provide the computer with immunity from infection of a software program by a software virus or by memory software code injection      2600 |

| 3M hosting step: hosting an operating system in a non-transitory computer storage medium accessible by a computer      2605 |

| 3M receiving step: receiving at the computer an encrypted operating system symmetric private key through a network connection      2610 |

| 3M decrypting step: decrypting the encrypted operating system symmetric private key on the computer to derive a decrypted operating system symmetric private key      2615 |

| 3M encrypting step: encrypting a software program using the decrypted operating system symmetric private key upon first installation of the software program and thereby create an encrypted software program that is the only installed version of the software program on the computer      2620 |

| 3M partial decrypting step: when executing a command to start the software program, requiring the operating system to use the decrypted operating system symmetric private key to decrypt a first part of the encrypted software program necessary to start the software program      2625 |

| 3M subsequent decrypting step: requiring the computer to use the decrypted operating system symmetric private key to subsequently decrypt any second part of the encrypted software program that is needed during operation of the first part      2630 |

| 3M storing step: storing the first part and any second part that is decrypted in a random access memory accessible by the computer      2635 |

| 3M precluding step: precluding the operating system from running any executable code that has not been previously encrypted with the decrypted operating system symmetric private key      2640 |

FIG.26

VIRUS IMMUNE COMPUTER SYSTEM AND METHOD

CROSS-REFERENCE TO RELATED APPLICATIONS

This application is a continuation-in-part of application Ser. No. 15/839,450, filed 12 Dec. 2018, and also a continuation-in-part of application Ser. No. 16/005,399, filed 11 Jun. 2018, both of which are hereby incorporated by reference herein in their entireties.

TECHNICAL FIELD

In the field of information security, a system and method is disclosed to prevent the execution of hacker code on a computer, improving the function, operation, and security of data on the computer.

BACKGROUND ART

Currently, computer programs (also referred to as executable code) are configured to be executed in a specific operating system and an executable code for a specific operating system can be executed in any machine running that specific operating system.

Therefore, any piece of executable code, malicious or not, for specific operating system will be executed in any computer running that operating system. It is done this way to enable a single program (i.e., executable code), to be written once and executed in any machine running the same operating system. This is the currently in use mechanism which lays in the core of currently in-use computer technology (e.g., the combination of hardware/software), which we use in our everyday lives.

The vast majority of living humans in every nation of the world uses a computer of some sort, every single day—be it in the form of a server computer, a laptop computer, a desktop computer, a cellphone, a pad computer or any device which make the use of computer technology: hardware and software.

In the developed world, most humans are so dependent on computers, helping us with all kind of tasks in our daily lives that most cannot function properly without a computer's help. Many are not now able to travel from one city's location to another without the use of electronic maps in our mobile devices.

Most of the computer programs (also termed "software applications" or just "applications") used are for our well-being, and we all are glad for their existences. But there are other kinds of adverse applications that are programmed for the single purpose, to create havoc and disruption in our daily lives. And they are called computer viruses, computer worms, adware, fishing software, ransomware, etc. (each such adverse application may be referred to herein as hacker code, a computer virus, or a virus).

In cryptography, encryption is the process of encoding a message or information in such a way that only authorized parties can access it. Encryption does not in itself prevent interference, but denies the intelligible content to a would-be interceptor. In an encryption scheme, the intended information or message, referred to as plaintext, is encrypted using an encryption algorithm, generating cipher-text that can only be read, if decrypted.

For technical reasons, an encryption scheme usually uses a pseudo-random encryption key generated by an algorithm. It is in principle possible to decrypt the message without possessing the key, but, for a well-designed encryption scheme, considerable computational resources and skills are required, which sometimes, can take a great length of time in the number of many years of computational prowess using very expensive and powerful computers, which in many cases, is not feasible or economically possible. But on the other hand, an authorized message recipient possessing the decryption key can easily decrypt the message using the key supplied by the originator/message's sender to the message recipient.

Basically, encryption is a form for hiding a message as not to make its actual/original content available to an intermediary which is not supposed to know the actual message/content. For instance, if the message would have been: "9", and the pre-agreed upon method was to multiply the value of "7" to the message before it was sent, then once "7" is multiplied to "9" the result will be "63". Anyone reading this message will not know that the actual value is "9", but once the intend recipient receives the value "63" all that will be needed will be to divide the received value "7" by "63", and the result will be "9"—the original value.

Of course, this example is very simplistic, but it gives an idea how encryption works. In an actual computer encryption, very sophisticated method is used. Some uses the computer's logical functions or sophisticated mathematical algorithm. And any kind of available encryption mechanism in use today or to be invented in the future can be used to achieve the purpose of encrypting a non-encoded software code and to decrypt an encrypted one. But for the sake of clarity, a more complex format which computer uses will be explained shortly.

Software installation and the behavior of the operating system (120) is altered using the disclosed methods and will be different from the operating systems of the prior art currently known or in use. With the prior art operating systems, the operating system gets an un-encrypted software code and installs it on the computer by creating all the required procedures for its later execution, then saving it unencrypted on the computer's non-transitory storage.

Software execution of the prior art involves acting on user input to request that the computer, upon which the unencrypted software is installed, engage the operating system to read software executable code and cause the central processing unit to execute it, thus, initiating the software's operation.

Computer infection of the prior art software is possible since, any program once installed in the computer is in a single format. A virus can, therefore, be installed and executed the same as any other program and is usually introduced into the computer without the user's awareness, or the operating system sensing or reporting anything abnormal.

In virus execution under the prior art, the central processing unit does not distinguish what kind of software code being executed, it may be a good code (e.g., an accounting software) or a bad code (e.g., a virus), and therefore, a virus can be executed without the user's awareness, or the operating system sensing or reporting anything abnormal.

SUMMARY

A computer system includes a computer and a storage device that is separate unit from components necessary for startup of the computer. The storage device has a first-non-transitory computer storage medium that stores a device symmetric private key. The computer includes a central processing unit, an address bus, and a second-non-transitory computer storage medium on which is stored an encrypted operating system symmetric private key and a security program.

The security program is operable to: retrieve the device symmetric private key from the storage device; decrypt the encrypted operating system symmetric private key with the device symmetric private key; preclude the computer from storing the device symmetric private key or the decrypted operating system symmetric private key in any non-transitory computer storage medium; require the computer, upon first installation of an application program on the computer, to use the decrypted operating system symmetric private key to encrypt the application program such that the encrypted application program is the only installed version of the application program on any non-transitory computer readable memory accessible by the computer; enable the computer, each time a command is given to startup the application program, to use the decrypted operating system symmetric private key to decrypt a first portion of the encrypted application program needed implement the command, and to store what was decrypted in a random access memory accessible by the computer; require the computer to use the decrypted operating system symmetric private key to subsequently decrypt any second portion of the encrypted application program that is needed during operation of the first portion and to store what was subsequently decrypted in the random access memory accessible by the computer; and prevent access to the device symmetric private key after the device symmetric private key is first accessed to produce the decrypted operating system symmetric private key, unless express authorization is first obtained.

Optionally, the security program is further operable to prevent the computer from running any part of the application program that has not been first encrypted with the decrypted operating system symmetric private key.

Optionally, the security program is further operable to store the encrypted application program in the random access memory accessible by the computer.

Optionally, the security program is further operable to: produce a modulus value by causing the central processing unit to perform a modulus operand between an address bus value and a length of the decrypted operating system symmetric private key to derive a remainder; add the value of one to the remainder producing an added remainder value; use the added remainder value to point to a byte value in the decrypted operating system symmetric private key; and require the central processing unit to use the byte value for decryption of the encrypted application program stored in the random access memory.

Optionally, the security program is further operable to require the computer, after startup of the computer, to decrypt any executable code residing in the random access memory accessible by the computer, prior to running that executable code, where the decrypted operating system symmetric private key is used to decrypt said executable code.

Optionally, the security program is further operable to limit the storage device to a microchip integrated into a motherboard of the computer.

Optionally, the security program is further operable to prevent access to the device symmetric private key by implementing a procedure selected from the group consisting of producing and sending an automated signal from an operating system of the computer to the storage device, acting on manual input by a user at the physical location of the computer, producing and sending an automated signal from an basic input and output system of the computer to the security device, automatically activating a tristate switch, and causing the operating system to change a value in a flag to one recognized as a command to prevent such access.

Optionally, the first-non-transitory computer storage medium of the storage device is selected from the group consisting of an electronic chip, and a removable compact disk.

Optionally, the storage device is an electronic chip integrated into the computer.

Optionally, the storage includes a first-electronic tristate switch in the electronic chip; and wherein the security program is further operable to activate the first-electronic tristate switch in order to prevent access to the device symmetric private key.

Optionally, the storage device includes a second-electronic tristate switch in the electronic chip; and wherein the security program is further operable to activate the second-electronic tristate switch to prevent reading the device symmetric private key from the random access memory accessible by the computer.

In an alternative embodiment, a storage device is usable with a computer. The storage device includes a non-transitory computer storage medium, a central processing unit, a data bus, and an address bus. The non-transitory computer storage medium stores a key usable for decrypting encrypted program code. The encrypted program code is stored in a random access memory accessible by the computer. The key includes a plurality of bytes, each having a byte value. The central processing unit is connectable to the random access memory through the data bus and the address bus. The non-transitory computer storage medium stores computer code that is operable on the central processing unit of the storage device to: identify a designated location in the random access memory accessible by the computer holding an encrypted byte of executable code; perform a modulus operand between an address location of the encrypted byte of executable code and a length of the key to derive a remainder value; add one to the remainder value deriving a summed value; fetch the byte value of the byte in the plurality of bytes of the key, said byte located at the summed value; use the byte value that is fetched to decrypt the encrypted executable code starting at the designated location in the random access memory accessible by the computer, wherein such use producing a decrypted executable code; and execute the decrypted executable code.

A first preferred method disclosed herein is usable to control loading of multiple operating systems into a random access memory accessible by a computer. The computer includes a first-non-transitory computer storage medium, a second-non-transitory computer storage medium, a third non-transitory computer storage medium, the random access memory, a central processing unit, a basic input/output system, and a switch. This method includes steps of: storing a first key in the first-non-transitory computer storage medium, the first key usable for encryption of an operating system symmetric private key and decryption of an encrypted operating system symmetric private key; storing an encrypted operating system on the computer in the second-non-transitory computer storage medium; storing an encrypted operating system symmetric private key in the second-non-transitory computer storage medium; storing a non-encrypted operating system on the computer in the third non-transitory computer storage medium; setting the switch to enable the basic input/output system to load either the encrypted operating system or the non-encrypted operating system into the random access memory; and configuring the computer to power up and then to implement steps that include making the first key available from the first-non-transitory computer storage medium to the basic input/output system; when the switch is set to enable the basic input/output system to load the encrypted operating system, direct the basic input/output system to read the encrypted operating system from the second-non-transitory computer storage medium and using the first key to decrypt the encrypted operating system symmetric private key deriving a decrypted operating system symmetric private key and using the decrypted operating system symmetric private key to decrypt the encrypted operating system as requested by the central processing unit; and, when the switch is set to enable the basic input/output system to load the non-encrypted operating system from the third non-transitory computer storage medium, directing the basic input/output system to disable access to the first key, then read the non-encrypted operating system from the third non-transitory computer storage medium, and then store the non-encrypted operating system in the random access memory accessible by the computer.

A second preferred method disclosed herein is usable to improve the operation of a computer by providing the computer with immunity from infection of a software program by a software virus or by memory software code injection. The method includes steps of hosting an operating system in a non-transitory computer storage medium accessible by the computer; receiving at the computer an encrypted operating system symmetric private key through a network connection; decrypting the encrypted operating system symmetric private key on the computer to derive a decrypted operating system symmetric private key; encrypting a software program using the decrypted operating system symmetric private key upon first installation of the software program and thereby create an encrypted software program that is the only installed version of the software program on the computer; when executing a command to start the software program, requiring the operating system to use the decrypted operating system symmetric private key to decrypt a first part of the encrypted software program necessary to start the software program; requiring the computer to use the decrypted operating system symmetric private key to subsequently decrypt any second part of the encrypted software program that is needed during operation of the first part; and precluding the operating system from running any executable code that has not been previously encrypted with the decrypted operating system symmetric private key.

Optionally, the second preferred method includes a step of storing the first part and any second part that is decrypted in a random access memory accessible by the computer.

A third preferred method for improving operation of a computer is to provide the computer with immunity from infection of a software program by a software virus or by memory software code injection implementing steps that include hosting an operating system in a non-transitory computer storage medium accessible by a computer; receiving at the computer an encrypted operating system symmetric private key through a network connection; decrypting the encrypted operating system symmetric private key on the computer to derive a decrypted operating system symmetric private key; encrypting a software program using the decrypted operating system symmetric private key upon first installation of the software program and thereby create an encrypted software program that is the only installed version of the software program on the computer; when executing a command to start the software program, requiring the operating system to use the decrypted operating system symmetric private key to decrypt a first part of the encrypted software program necessary to start the software program; requiring the computer to use the decrypted operating system symmetric private key to subsequently decrypt any second part of the encrypted software program that is needed during operation of the first part; and storing the first part and any second part that is decrypted in a random access memory accessible by the computer.

Optionally, the third preferred method includes a step of precluding the operating system from running any executable code that has not been previously encrypted with the decrypted operating system symmetric private key.

Technical Problem

Any piece of executable code programmed for one operating system will be able to run in any computer processing the operating system, and a computer virus designed to be executed in one operating system (e.g. MICROSOFT WINDOWS) will run in any computer running the WINDOWS operating system. And, if the executable code happens to be a virus, once it is programmed using a computer running WINDOWS, it will run in any computer with the WINDOWS operating system.

The reason that this happen is for the archaic way that operating system functions, it will not distinguish between a bad and good executable code.

Computer virus take advantage of this flaw, causing billions of dollars in loss around the globe and at present, no solution is available to stop their spread. When a virus infects one computer, it can easily infect any number of other computers, spreading from computer to computer. Then in many times, the infected computers are used to perform a coordinated cyberattack at a specific location Denial Of Service attack (i.e. the common acronym is DOS), server computer or website.

With the passing of time, hackers have become more and more prominent globally and they are always in search for means to cause the greatest damage possible. And once a compromised server falls to a hacker's handiwork, the loss of data and intellectual property of the compromised server sometimes reaches into the millions of dollars. In some cases, a hacker's code can bring down an organization. And other times, it is capable of influencing politically—possibly changing the course of elections and the freedom of society.

Hacker code is introduced into a computer by a cyberattack, direct hacking, phishing, etc., on the daily basis around the world. Hacker code can cause a disruption in the political process. One example of such disruption is the theft and release of information pertaining to the U.S. Democratic Party, which was reportedly done to influence the US Presidential Election of 2016.

A number of global cyberattacks, introducing hacker code in the form of "ransomware" has reportedly crippled government and business operation across 74 countries in 2017. Once a computer is infected with ransomware, the virus encrypts the files of the infected computer. Then, the hackers controlling the ransomware, demand to be paid to restore the infected computer.

Presently, the way to deal with computer viruses is by creating an antivirus software which inspects the computer's behaviors while working in conjunction with the computer's operating system, inspecting files when they are created, opened and read. For an antivirus to work, it first needs to have the virus structure and this is only possible after it becomes well know and after it had already spread to, and damaged many computers.

Antivirus software is of little use in preventing modern computer hacking before the first attack occurs. One problem is that once a hacker locates a software flaw running in the compromised computer, the hacker injects the adverse code, in many cases, specially designed for the compromised computer. Once the code is injected into the running process, the hacker is able to take full control of the computer. A problem with existing antivirus programs is that for one to be useful, it needs to scan the computer's memory to locate the invading virus. But, because the way the computer is designed, if any program scans a running process, that process may crash.

A virus is to a computer what a flu virus is to a human being, and antivirus is to a computer what a flu medicine is to a human.

What is missing from the state of the art and what is needed is, in effect, a computer virus vaccine which works as a shield to protect the computer before the virus or the computer hacking is activated. The prior art anti-viral programs are costly and cumbersome, requiring sophisticated software. They are computer medicine which is only effective after the infection or hacking has already happened.

Solution to Problem

The solution is a method and mechanism in the hardware and at the operating system level to stop the introduction of the virus in a computer by enabling each computer to have its own serial code like a human DNA, and once the serial code is used by the operating system to encode each piece of executable code, and therefore, a piece of encoded code from one computer will not execute in another computer, even when both computers are running the same piece of software running on the same operating system. Further, an executable code not having any kind of encoding, like viruses, will not be able to execute in a computer utilizing any of the devices or methods disclosed herein.

The solution lies in the limitation that only the authorized encrypted version of a program, namely its digital-DNA, can be executed on the computer. This limitation prevents any hacker code or other computer infection from running on the computer. Securing the computer in such way is not currently possible. And in the process offering the computer's owner peace of mind. The device and method disclosed will save a great deal of money in human resources devoted to computer security and in expenditures for all manner of antivirus software which will not now be needed by the computer owner.

Preferred methods and devices disclosed herein enable the protection of any kind of computing device at a low cost without slowing the device's functioning. It stops the running of injected code into a running software, and it also stops the running of computer virus of any kind. Preferred methods and devices disclosed herein are a computer vaccine shield, which stops virus infection and computer hacking before they happen.

Advantageous Effects

The devices and methods disclosed herein involve a hardware and software combination to encrypt/decrypt executable computer software code as to inhibit a code not part of the computer from being executed in the computer, thus, disabling the spread of all sorts computer virus and hacking by not allowing a foreign piece of software code to be installed or executed in the computer in the first place.

The methods and devices disclosed enable the user to avoid the expenses currently associated with antivirus software and other hacker prevention methods or devices which may currently be necessary to prevent a virus or unwanted code from executing in any kind of computer (e.g., personal, desktop, server, mobile, etc.): It has important uses for any network computer (whether or not wired, wireless, Internet, server, etc.) running any kind of Operating System (WINDOWS, UNIX, LINUX, APPLE Operating Systems, etc.).

Unlike current generation antivirus technology which may only become effective after the virus has already spread infecting and damaging many computers, the methods and devices disclosed herein prevent a computer virus from becoming an operable part of the computer by disabling it before it can cause any damage to the computer.

BRIEF DESCRIPTION OF DRAWINGS

The drawings illustrate preferred embodiments of the Virus immune computer system and method according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 5 illustrates the XORing of two values.

FIG. 6 continues the illustration of XORing shown in FIG. 5

FIG. 7 illustrates a computer virus of the prior art.

FIG. 8A illustrates the digital-DNA (also referred to as the encrypted software) saved in the computer.

FIG. 15 illustrates how code hacking can occur in the prior art.

FIG. 16 illustrates code execution of the prior art.

FIG. 20 illustrates the loading of the operating system of the prior art.

FIG. 21 illustrates the loading of the main operating system utilizing a method disclosed herein.

FIG. 22 illustrates the loading of the operating system from a dongle of an embodiment.

FIG. 25 diagrams optional additional steps the method for preventing a hacker code from infecting an application program on a computer.

FIG. 26 diagrams further optional additional steps the method for preventing a hacker code from infecting an application program on a computer.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

This description is organized by first presenting a concise disclosure of the methods and devices followed by a more thorough detailed disclosure with examples.

Concise Disclosure

Methods and devices to prevent a hacker code infection of a computer are disclosed herein. Preferred devices are discussed first referring to FIGS. 1 to 23, which illustrate the components of preferred devices along with their functions.

First Preferred Device

Figure 2A:
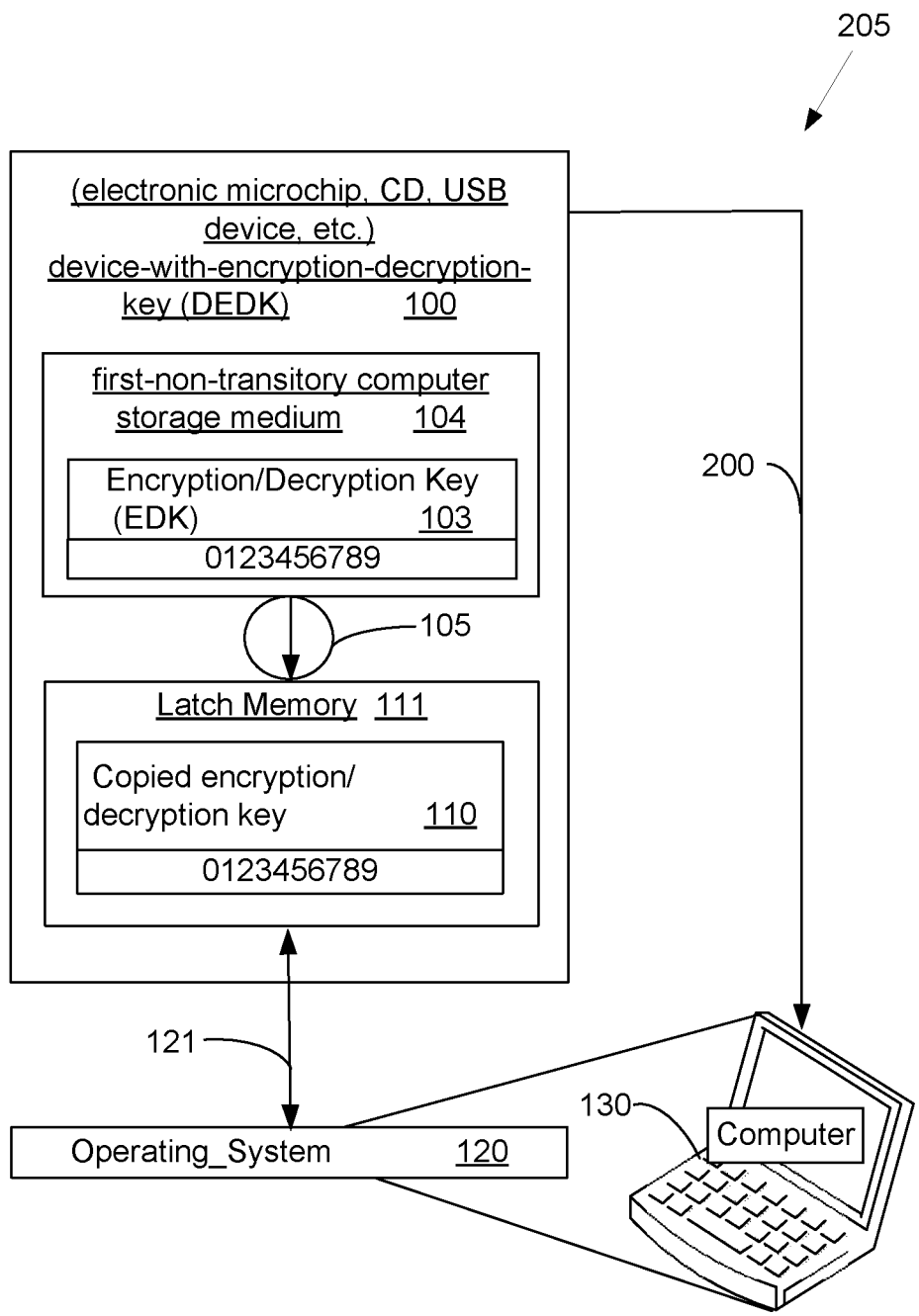
FIG. 2A illustrates a computer's operating system using the encryption/decryption key device.

The first preferred device is a computer system (205) shown in FIG. 2A. The computer system (205) includes a storage device. The storage device may be referred to herein as a DEDK or a device-with-encryption-decryption-key (100).

The storage device is a separate unit from components necessary for startup of a computer (130). The storage device includes a first-non-transitory computer storage medium (104) on which is stored a device symmetric private key, which is interchangeably referred to herein as the encryption/decryption key (103).

The device symmetric private key, i.e. the encryption/decryption key (103), is operable to decrypt an encrypted operating system symmetric private key (1007-E) so as to produce a decrypted operating system symmetric private key (1007).

The computer system (205) includes the computer having at least a central processing unit (905), an address bus, and a second-non-transitory computer storage medium on which is stored the encrypted operating system symmetric private key (1007-E) and a security program (2700) to perform operations. These operations preferably include a SP Retrieve Operation (2705); a SP Decrypt Operation (2710); a SP Preclude Operation (2715); a SP $1^{st}$ Require Operation (2720); a SP Enable Operation (2725); a SP $2^{nd}$ Require Operation (2730); and a SP Prevent Operation (2735).

The SP Retrieve Operation (2705) is operability to retrieve the device symmetric private key, i.e. retrieve the encryption/decryption key (103) from the storage device, i.e. from the device-with-encryption-decryption-key (100).

The SP Decrypt Operation (2710) is operability to decrypt the encrypted operating system symmetric private key (1007-E) with the device symmetric private key, i.e. with the encryption/decryption key (103), to produce the decrypted operating system symmetric private key (1007).

The SP Preclude Operation (2715) is operability to preclude the computer, which is also referred to herein as the first computer (130), from storing the device symmetric private key, i.e. with the encryption/decryption key (103), or the decrypted operating system symmetric private key (1007) in any non-transitory computer storage medium, such as for example the second-non-transitory computer storage medium (350).

The SP $1^{st}$ Require Operation (2720) is operability to require the computer, upon first installation of an application program, i.e. upon installation of non-encoded software (310) on the computer, to use the decrypted operating system symmetric private key (1007) to encrypt the application program such that the encrypted application program, which is also referred to herein as the Digital-DNA (300), is the only installed version of the application program on any non-transitory computer readable memory accessible by the computer.

The SP Enable Operation (2725) is operability to enable the computer, each time a command is given to startup the application program, to use the decrypted operating system symmetric private key (1007) to decrypt a first portion of the encrypted application program needed to implement the command, and to store what was decrypted in a random access memory (925) accessible by the computer.

The SP $2^{nd}$ Require Operation (2730) is operability to require the computer to use the decrypted operating system symmetric private key (1007) to subsequently decrypt any second portion of the encrypted application program that is needed during operation of the first portion and to store what was subsequently decrypted in the random access memory (925) accessible by the computer.

The SP Prevent Operation (2735) is operability to prevent access to the device symmetric private key, i.e. with the encryption/decryption key (103), after the device symmetric private key is first accessed to produce the decrypted operating system symmetric private key (1007), unless express authorization is first obtained.

Figure 28:
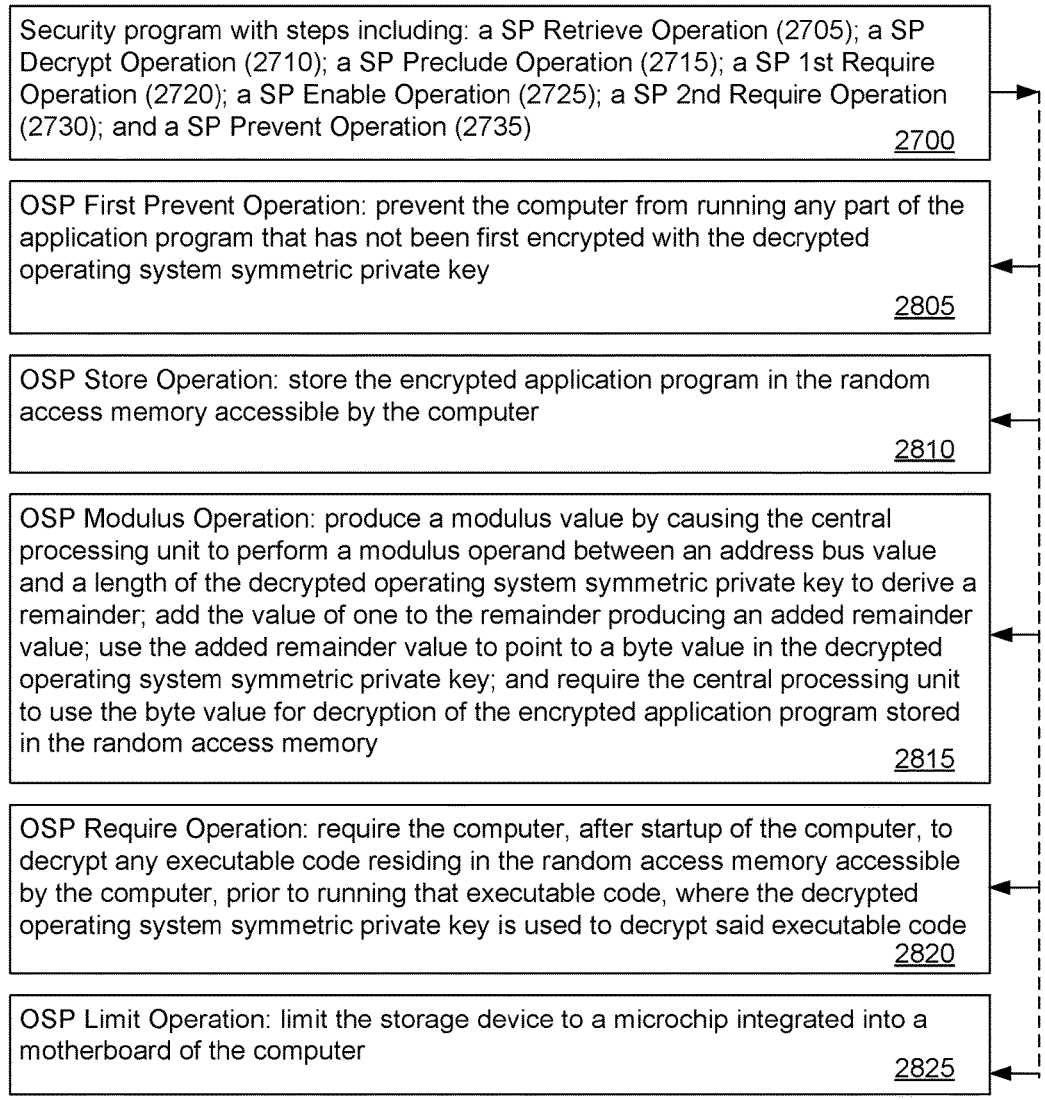
FIG. 28 diagrams optional operations in the security program of FIG. 27.
Figure 29:
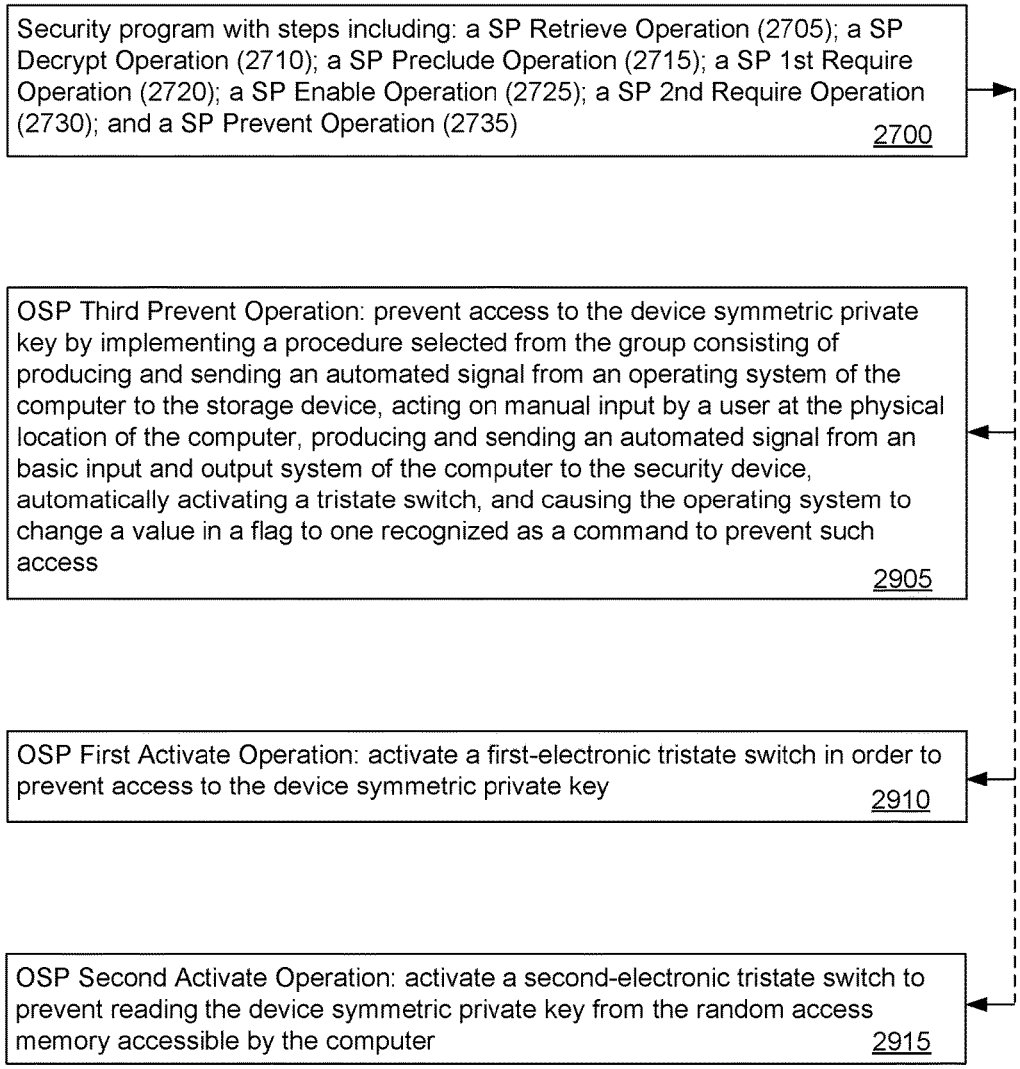
FIG. 29 diagrams more optional operations in the security program of FIG. 27

There are at least 9 preferred, but optional, software program operations (OSP), which are diagrammed in FIG. 28 and FIG. 29. Each optional operation is indicated by a dashed line from the box with the security program (2700) in FIG. 28 and FIG. 29. The optional software program operations include: an OSP First Prevent Operation (2805); an OSP Store Operation (2810); an OSP Modulus Operation (2815); an OSP Require Operation (2820); an OSP Limit Operation (2825); an OSP Third Prevent Operation (2905); an OSP First Activate Operation (2910); and an OSP Second Activate Operation (2915).

The OSP First Prevent Operation (2805) is operability to prevent the computer, also referred to as the first computer (130), from running any part of the application program has not been first encrypted with the decrypted operating system symmetric private key (1007).

The OSP Store Operation (2810) is operability to store the encrypted application program in the random access memory (925) accessible by the first computer (130).

The OSP Modulus Operation (2815) is operability to produce a modulus value by causing the central processing unit (905) to perform a modulus operand between an address bus value and a length of the decrypted operating system symmetric private key to derive a remainder; add the value of one to the remainder producing an added remainder value; use the added remainder value to point to a byte value in the decrypted operating system symmetric private key; and require the central processing unit to use the byte value for decryption of the encrypted application program stored in the random access memory.

The OSP Require Operation (2820) is operability to require the computer, after startup of the computer, to decrypt any executable code residing in the random access memory accessible by the computer, prior to running that executable code, where the decrypted operating system symmetric private key is used to decrypt said executable code.

The OSP Limit Operation (2825) is operability to limit the storage device to a microchip integrated into a motherboard of the computer.

The OSP Third Prevent Operation (2905) is operability to prevent access to the device symmetric private key by implementing a procedure selected from the group consisting of producing and sending an automated signal from an operating system of the computer to the storage device, acting on manual input by a user at the physical location of the computer, producing and sending an automated signal from an basic input and output system of the computer to the security device, automatically activating a tristate switch, and causing the operating system to change a value in a flag to one recognized as a command to prevent such access.

The OSP First Activate Operation (2910) is operability to activate a first-electronic tristate switch in order to prevent access to the device symmetric private key.

The OSP Second Activate Operation (2915) is operability to activate a second-electronic tristate switch to prevent reading the device symmetric private key from the random access memory accessible by the computer.

Preferred Methods

Figure 24:
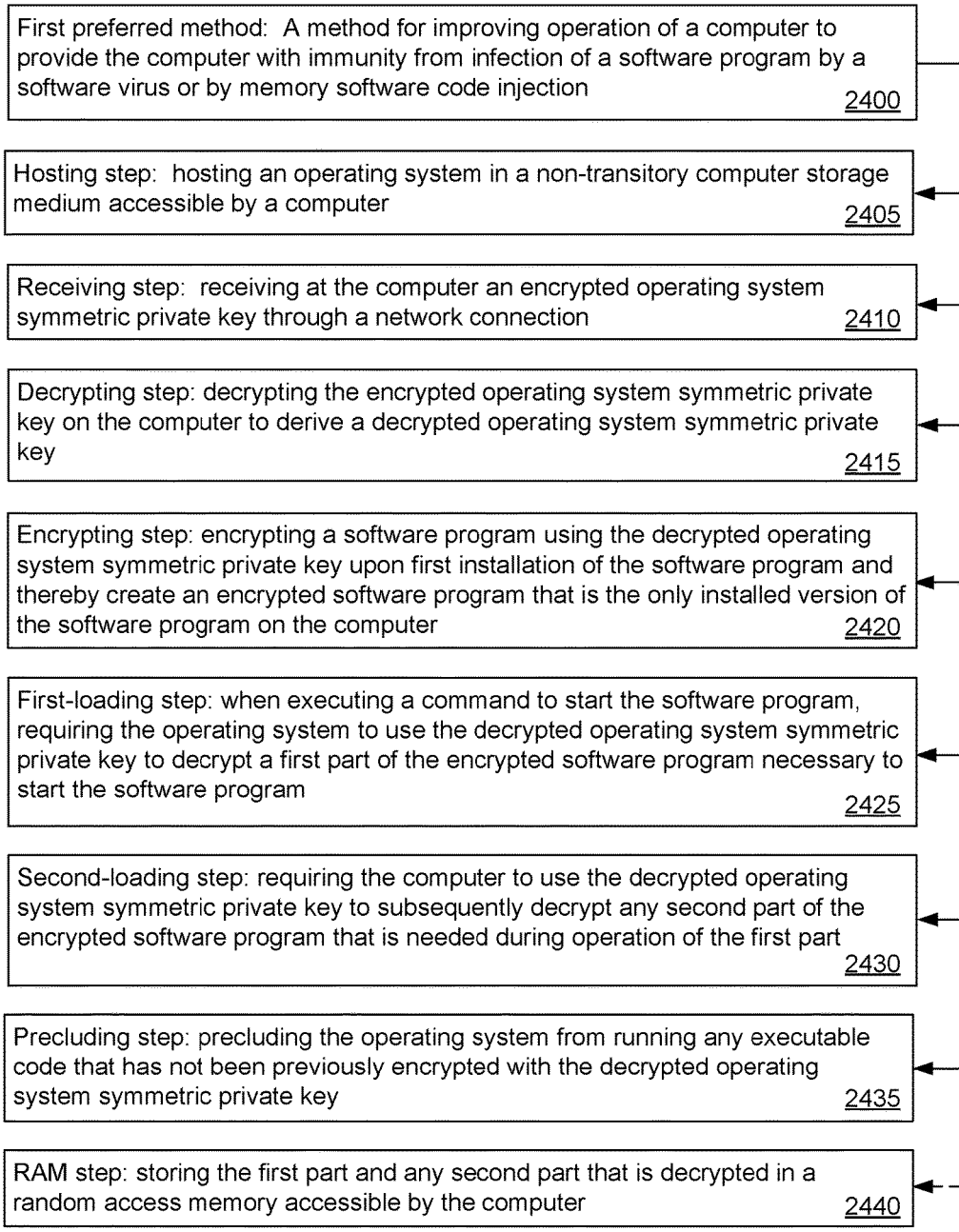
FIG. 24 diagrams a preferred embodiment of the method for preventing a hacker code from infecting an application program on a computer.
Figure 27:
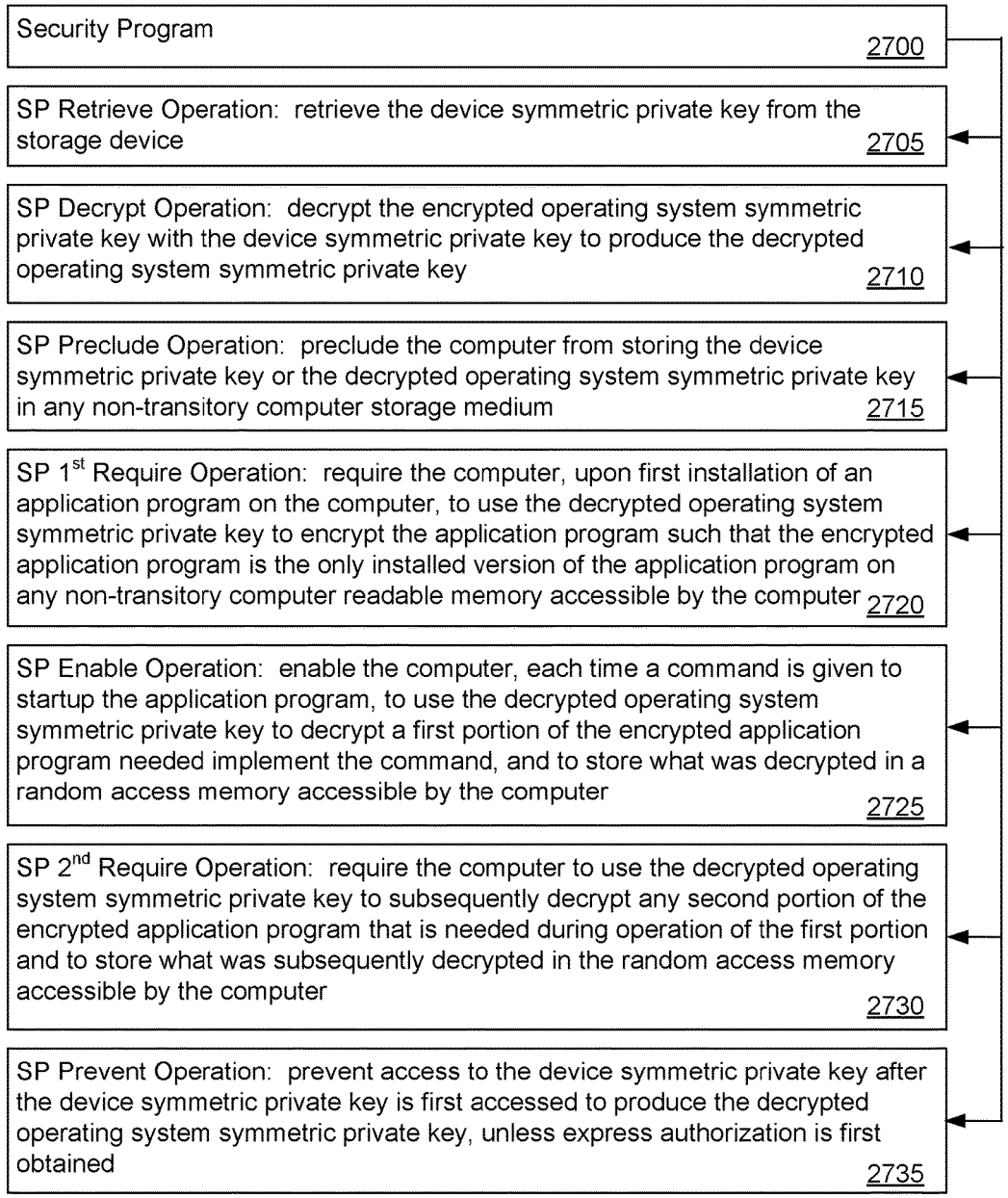
FIG. 27 diagrams preferred operations in a security program.

A First preferred method (2400), illustrated in FIG. 24, is disclosed for preventing hacker code from infecting an application program on a first computer (130). A Second preferred method (2500), illustrated in FIG. 25, discloses an embodiment encrypting a computer operating system, which is also considered an application program.

The terms "application program," "software application," "software application program," "software/driver," "non-encoded software (310)," and "computer software file" mean and include the same thing and are used interchangeably herein. These terms are defined to include any program designed to perform a specific function directly for the user or, in some cases, for another application program. An application program uses the services of the computer's operating system and other supporting programs.

A Third preferred method (2600), illustrated in FIG. 26, uses the components of a computer to implement the improvement preventing a virus infection to software programs. A Fourth preferred method has all of the same steps in the Third preferred method (2600) except that an optional step is the 3M storing step (2635) and the 3M precluding step (2640) is not optional.

Devices and Functions

A preferred device that implements the methods disclosed herein is a storage device in the sense that it is a first-non-transitory computer storage medium (104) storing an encryption/decryption key (103), which may be referred to herein as an EDK. The storage device may be referred to herein as a DEDK or a device-with-encryption-decryption-key (100).

The device-with-encryption-decryption-key (100) may be in the form of any peripheral or built in device, including as examples, an electronic microchip, a first computer (130), a computer board/blade, a removable storage medium, a universal serial bus device, a circuit within the computer's central processing unit, a server computer (1000) in communication with the first computer (130), or a mobile device connectible via BLUETOOTH, etc.

The purpose of the device-with-encryption-decryption-key (100) is to improve the functioning and operation of the first computer (130) by working in conjunction with the decrypted operating system symmetric private key (1007) providing the first computer (130) with the means to block operability of a hacker's code (1550) that would otherwise be operable once injected into software program, i.e. once injected into the digital-DNA (300), installed on the first computer (130). The device-with-encryption-decryption-key (100) working in conjunction with the decrypted operating system symmetric private key (1007) provide immunity from an otherwise operable software viral infection after the first installation of the software program (330) on the first computer (130). Use of the device-with-encryption-decryption-key (100) in conjunction with the decrypted operating system symmetric private key (1007) prevents operability on the first computer (130) of any memory software code injection subsequent to first installation of the software program (330).

The encryption/decryption key (103) is a symmetric private key usable for decryption of an encrypted operating system private key (1007-E) deriving the decrypted operating system symmetric private key (1007) and using the decrypted operating system symmetric private key (1007) for the encryption/decryption of a software program (330). This symmetric private key, namely the encryption/decryption key (103), is stored on the second-non-transitory computer storage medium (350), which for purposes of distinguishing it from other memory is referred to as a first-non-transitory computer storage medium (104) that is installed within a unit (also referred to as a housing) that is separate from components necessary for the operation of the first computer (130). The first-non-transitory computer storage medium (104) is a component part of the DEDK. The first-non-transitory computer storage medium (104) is not necessary for the operation of the first computer (130).

The first computer (130) includes a second-non-transitory computer storage medium (350). This second-non-transitory computer storage medium (350), unlike the first-non-transitory computer storage medium (104), is necessary for operation of the first computer (130). The second-non-transitory computer storage medium (350) is used for storing the encrypted operating system private key (1007-E) and for storing computer code operable to accomplish at least 5 tasks:

A first task is to enable the first computer (130) to which the unit is connected to use the device symmetric private key, namely the encryption/decryption key (103), to decrypt the encrypted operating system symmetric private key (1007-E) producing the decrypted operating system symmetric private key (1007), Then, using the decrypted operating system symmetric private key (1007) to encrypt a software program (330) upon first installation of the software program (330) and thereby create a first-encrypted software program, termed and referred to herein as the Digital-DNA (300).

Figure 3:
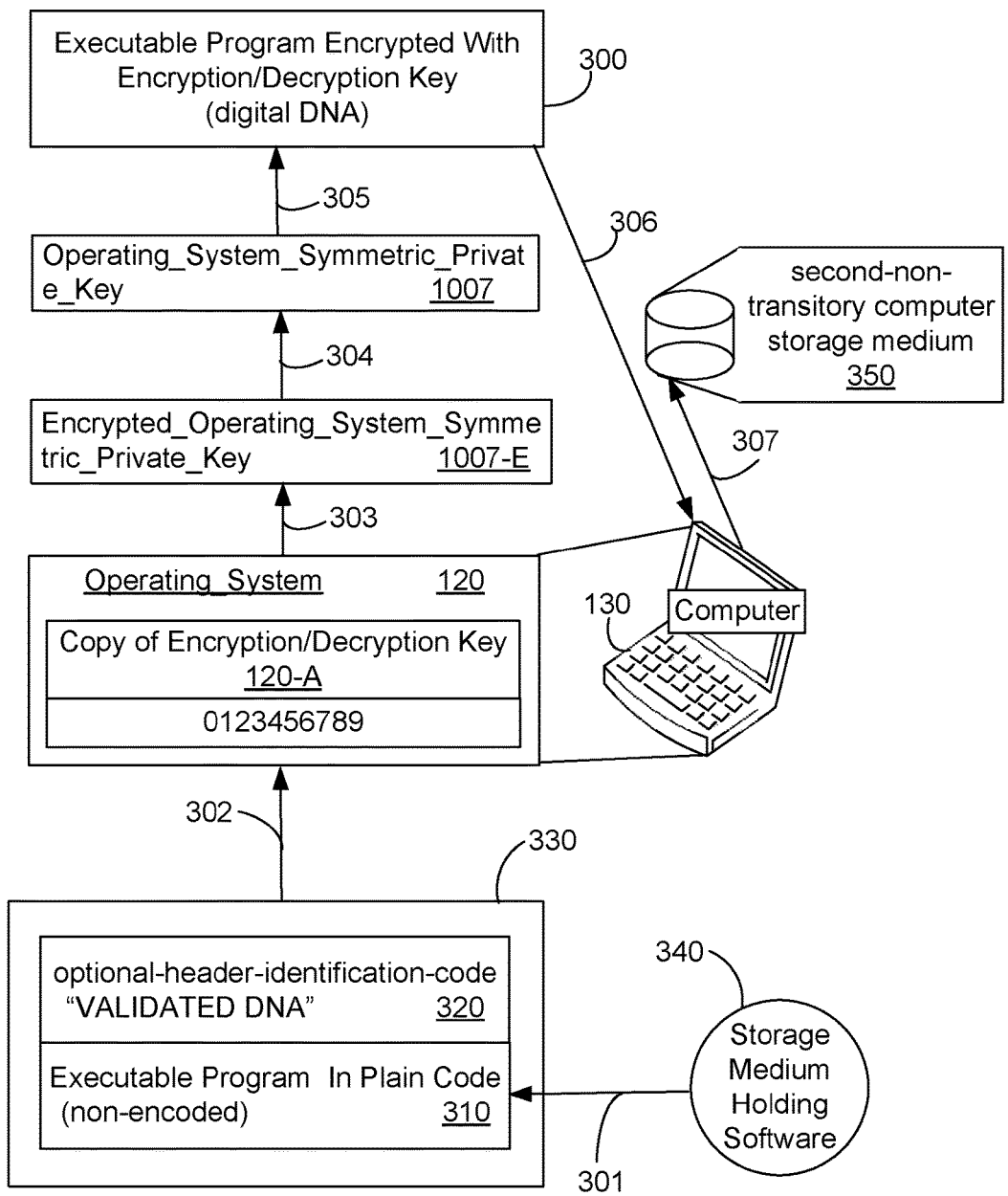
FIG. 3 illustrates the operating system using the encryption/decryption key to encrypt a non-encode program code producing the digital-DNA, then storing it on the computer's non-transitory computer storage medium.

FIG. 8A relates to FIG. 3, and illustrates an example of a preferred embodiment where the encrypted software file stored in the storage medium, the second-non-transitory computer storage medium (350) shown in FIG. 3, of the first computer (130). The operating system (120) holds a copy of the encryption/decryption value of "0123456789" (in memory location (120-A)), which is used to decrypt the encrypted operating system symmetric private key (1007-E) deriving the decrypted operating system symmetric private key (1007). Then, the operating system using the decrypted operating system symmetric private key (1007) to encrypt the software program (330) which includes the optional-header-identification-code (320) and the non-encoded software (310). The executable program, i.e. the non-encoded software (310), may be referred to as the good executable software and the non-encoded software (310). Encryption of the software program (330) produces the digital-DNA (300), then saving the digital-DNA (300) into the second-non-transitory computer storage medium (350), shown in FIG. 3, of the first computer (130).

If optional-header-identification-code (320) is used and it is not present or is not valid, at any moment the operating system (120) loads the non-encoded software (310) in the random access memory (925) of the first computer (130), or, the operating system (120) loads the digital-DNA (300) in the random access memory (925) of the first computer (130), the operating system (120) will halt the loading, and optionally, generate an error.

A second task is to require the first computer (130) to use the device symmetric private key, namely the encryption/decryption key (103), upon each startup of the first-encrypted software program, namely the digital-DNA (300), to decrypt the encrypted operating system symmetric private key (1007-E) deriving the decrypted operating system symmetric private key (1007). Then, the operating system (120) using the decrypted operating system symmetric private key (1007) to decrypt the digital-DNA (300) (i.e., the first-encrypted software program), to produce a first-decrypted software program, which is the same as non-encoded software (310) and the optional-header-identification-code (320) that is decrypted.

Figure 4:
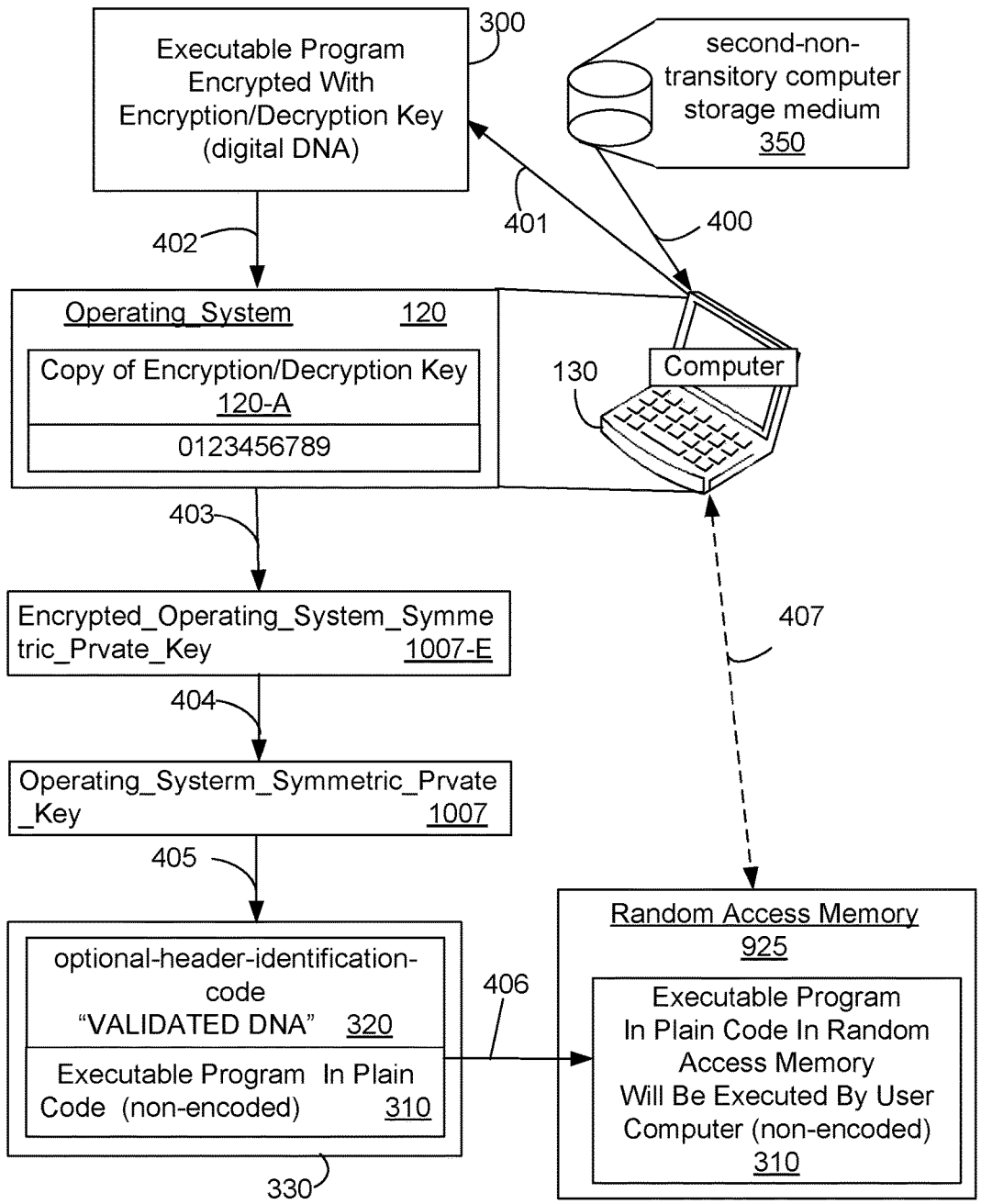
FIG. 4 illustrates the operating system using the encryption/decryption key to decrypt digital-DNA from FIG. 3.
Figure 8B:
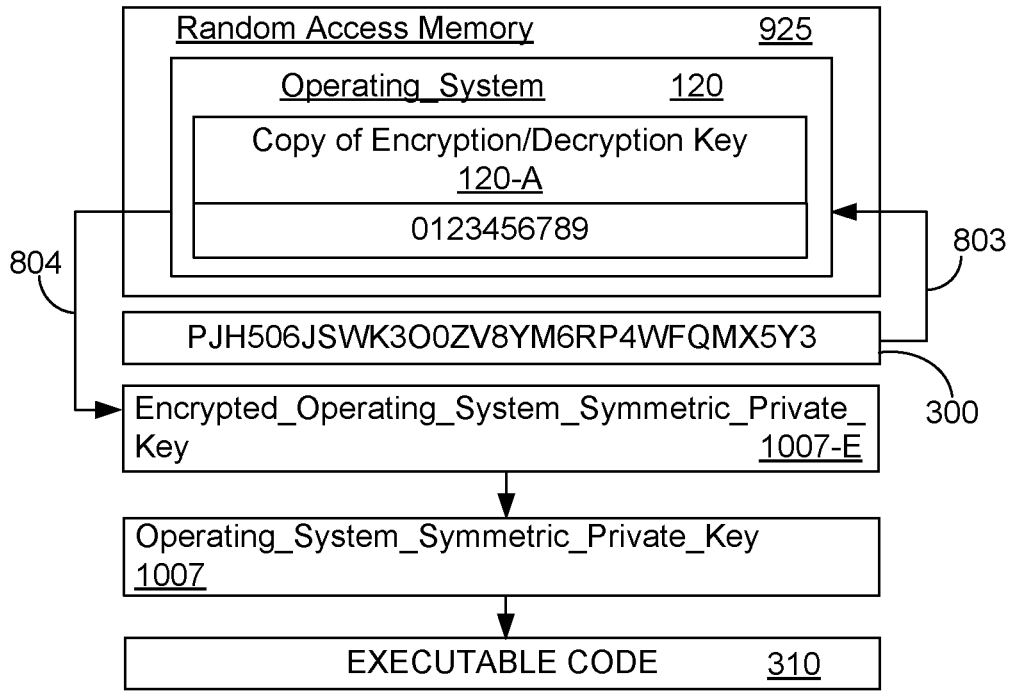
FIG. 8B illustrates the decryption of digital-DNA before it is executed by the central processing unit.

FIG. 8B relates to FIG. 4, and is an example of the second task, which is essentially the reversal of the first task shown in FIG. 8A. After the operating system (120) loads the digital-DNA (300), the operating system (120) using the value in memory location (120-A) of the encryption/decryption key (103) to the encrypted operating system symmetric private key (1007-E) deriving the decrypted operating system symmetric private key (1007). Then, the operating system (120) using the decrypted operating system symmetric private key (1007) decrypts the digital-DNA (300) to derive the original software code, namely the non-encoded software (310). Then, the central processing unit (905) executes (also referred to as runs) the non-encoded software (310) in the random access memory (925) of the first computer (130). And the central processing unit (905) of the first computer (130), fetches the byte of the non-encoded software (310)), one at a time, for processing/execution.

A third task is to execute the first-decrypted software program on the first computer (130).

The first three tasks can be summarized as the operating system (120) encrypting at installation time of a software program to produce the first-encrypted software program, i.e. the digital-DNA (300) or the encrypted software program. The operating system then saving the digital-DNA (300) (i.e., the first-encrypted software program, as shown in (see FIG. 8A)). Then, the operating system at runtime of the software program decrypts the digital-DNA (300) reproducing the non-encoded software (310) that the operating system/central processing unit understands, and then executes the non-encoded software (310) (see FIG. 8B).

A fourth task is to prevent access to the device symmetric private key (unless express authorization is first obtained) after the device symmetric private key is first accessed to produce the first of the decrypted operating system symmetric private key (1007), then the operating system (120) uses the decrypted operating system symmetric private key (1007) to decrypt software program.

This fourth task prevents software of any kind having a direct access to the device-with-encryption-decryption-key (100). Access prevention eliminates the possibility that a hacker's code (1550) could be written with the specific purpose to read the encryption/decryption key (103) on the device-with-encryption-decryption-key (100), or to use the encryption/decryption key (103) to decrypt the encrypted operating system symmetric private key (1007-E) deriving the decrypted operating system symmetric private key (1007), then using the decrypted operating system symmetric private key (1007) to encrypt software code to run in the first computer (130), i.e. hacker's code (1550).

A fifth task is to preclude running on the first computer (130) any software program that has not been encrypted with the decrypted operating system symmetric private key (1007). This task assures that only encrypted application software is executable on the first computer (130).

In some preferred embodiments, the first-non-transitory computer storage medium (104) incorporated into a component selected from the group consisting of an electronic chip, a computer board, a wireless communication device, i.e. the mobile device (1430), an encrypted encryption/decryption key (which may be the encrypted operating system symmetric private key (1007-E)) stored in the first computer (130) in the second-non-transitory computer storage medium (350), a central processing unit (905), a random access memory auxiliary (952), a server computer (1000) in communication with the first computer (130), and a universal serial bus device (also referred to as a dongle).

In one preferred embodiment, the device-with-encryption-decryption-key (100), aka the storage device, aka the DEDK, may be an electronic chip incorporating the unit. In this embodiment, it is also preferable to include timer/trigger (105A), which is itself electronic, in the electronic chip that is configured to activate the electronic tristate switch (105B) to prevent transfer of the device symmetric private key from the first-non-transitory computer storage medium (104) a second time to the latch memory (111) of the device-with-encryption-decryption-key (100) while the electronic chip is powered-up.

Latch memory, also called flip-flops, is a non-transitory electronic storage medium (also known as a memory device) which can store one bit of data for as long as the device is powered. A latch memory has a set/reset line which controls the setting of, or resetting of, the memory's content, a high or a low signal. While latch memory (111) is used as an example herein, it is intended that any type of non-transitory storage memory that will hold a value and enable the value to be cleared, is an acceptable substitute. Since each latch memory (111) stores one bit of data, eight of the latch memory (111) are required for each byte of the encryption/decryption key (103). For example, key_a (110A) requires eight of the latch memory (111) and the same applies to key_b (110B), key_c (110C), and key_z (110D).

Figure 1:
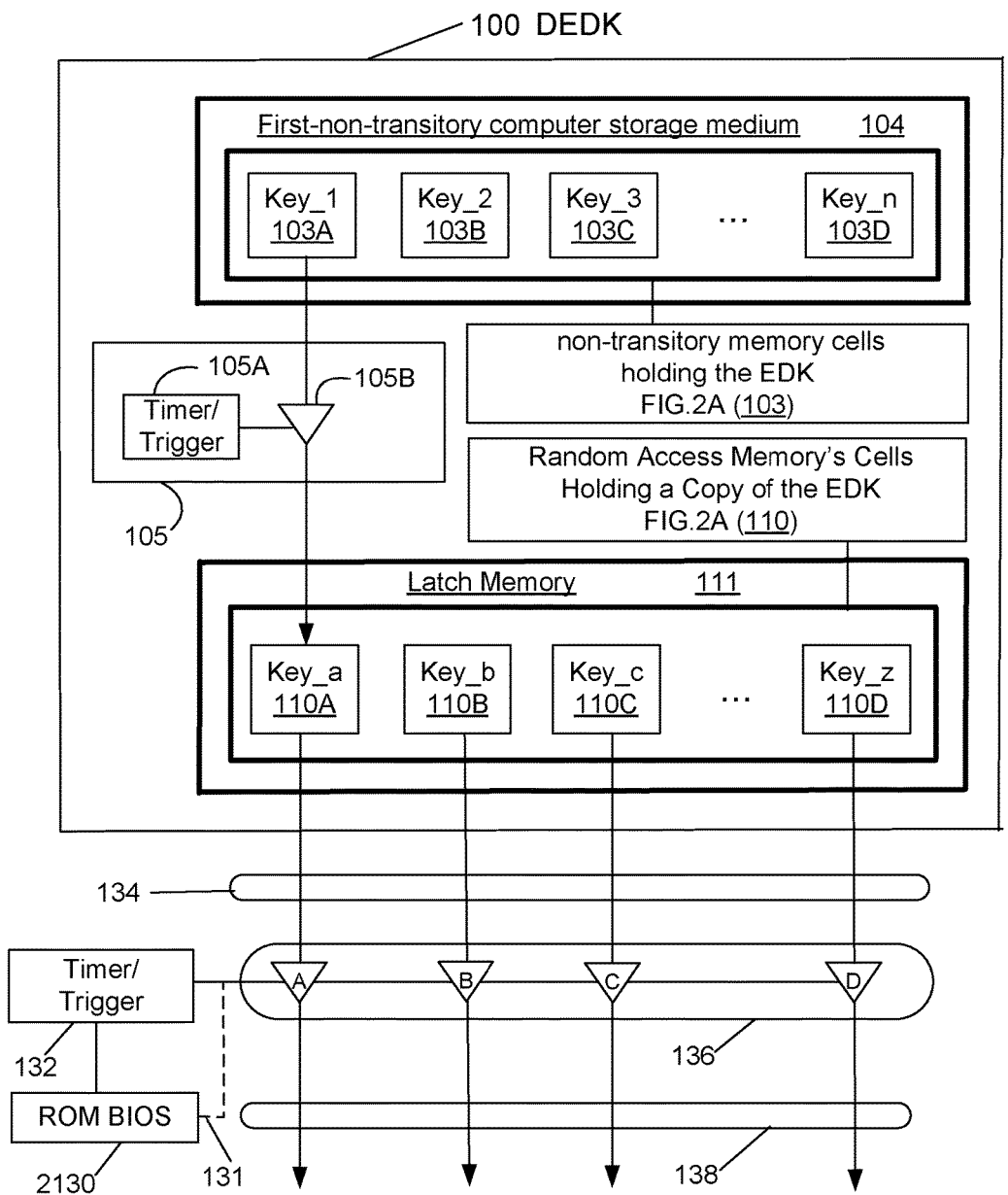
FIG. 1 illustrates the circuitry of the device-with-encryption-decryption-key.

An example of this is in FIG. 1 where gate control circuitry (105) comprises a timer/trigger (105A). An electronic tristate switch (105B) acts like any gate in a physical world where it will be closed or open. The electronic tristate switch (105B) acts like a light bulb switch which once closed, it lets electricity through the wires lighting the light bulb, and when opened, it turns off the light bulb. Similarly, the electronic tristate switch (105B) controls the flow of an electronic signal going in one direction when it is closed, and disables the flow of the electronic signal when it is open. The timer/trigger (105A) is an electronic circuitry used to fire a signal once something happens, in this particular example, a certain amount of time after the computer is turned on or reset—for instance, after a few milliseconds, or perhaps after a few seconds, or longer.

In an alternative embodiment, a storage device, i.e. a device for storing a secure key which is used as input to a program running in the first computer (130) which the device-with-encryption-decryption-key (100) is connected to. The term "secure key" means any value and includes as an example the encryption/decryption key (103).

The device-with-encryption-decryption-key (100) includes a first-non-transitory computer storage medium (104) installed within a unit that can be operationally connected to the first computer (130). When used herein, "non-transitory computer storage medium" means and includes any computer readable medium that is formed of non-transitory tangible media and does not include transitory propagating signals. The unit is separate from components necessary for operation of the first computer (130). Operation of the first computer (130) means being able to turn on the computer, being able to manipulate a mouse on a computer screen, and being able to make selections with the mouse or a keyboard. The unit being separate from components necessary for operation of the first computer (130) means that the first computer (130) will be able to start up without having to access the unit.

In a preferred embodiment, the secure key usable as input data to computer code running on the first computer (130) to which the storage device is connected, the secure key stored on the first-non-transitory computer storage medium (104). In this embodiment, code for operation of the first computer (130) is operable to: read a copy of secure key, that is the encryption/decryption key (103) from the latch memory (111) of the device-with-encryption-decryption-key (100) and; use the copied encryption/decryption key (110) as input data; and prevent access to the encryption/decryption key (103) a second time after the encryption/decryption key (103) is first accessed by the first computer (130) to run any program.

Optionally, the non-transitory computer storage medium is incorporated into a component selected from the group consisting of an electronic chip, a computer board, a central processing unit (905), a wireless communication device, i.e. the mobile device (1430), a random access memory auxiliary (952), a server computer (1000) communicating with the first computer (130), and a universal serial bus device. This alternative embodiment may also optionally include an electronic chip incorporating the storage device and an electronic tristate switch (105B) in the electronic chip that is configured to prevent access to the secure key a second time. In another alternative embodiment, a storage device is configured to decrypt software code stored in a random access memory (925) of the first computer (130). The storage device is further configured to prevent the hacker's code (1550) from being injected into a running process (1545) in a server (1510). The storage device includes non-transitory computer storage medium, random access memory, a central processing unit, a data bus, and an address bus. The non-transitory computer storage medium includes a key usable for decrypting the encrypted operating system key (1007-E) deriving the decrypted operating system symmetric private key (1007). Then, the operating system (120) using the decrypted operating system symmetric private key (1007) to decrypt program code stored in the random access memory. The central processing unit can be the same one needed for the operation of the server (1510) and not necessarily an independent unit only used by the storage device. The key includes a plurality of bytes wherein each byte in the plurality of bytes has a byte value. The central processing unit is connected to random access memory through the data bus and the address bus. The central processing unit is programmed to: identify a designated location in the random access memory addressed by a value at the address bus; fetch an encrypted byte from the designated location stored in the random access memory of the computer; perform a modulus operand between the random access memory location value at the address bus and a length of the decrypted operating system symmetric private key to derive a remainder value; then adding the value of one to the derived remainder value, fetch the byte value of the byte in the plurality of bytes of the decrypted operating system symmetric private key; use the byte value that is fetched to decrypt the encrypted byte fetched from the designated location at the read-access memory producing a decrypted byte; and, use the decrypted byte.

The term 'operating system private key' is used, it is to be broadly interpreted to include: decrypted operating system symmetric private key. If the term 'decrypted operating system private key' is used, it is to be broadly interpreted to include: decrypted operating system symmetric private key.

If the term 'private key' is used alone, it is to be broadly interpreted to include: 'symmetric private key'.

DETAILED DISCLOSURE

Throughout the examples of the methods and devices disclosed herein, a preferred common limitation is that only the operating system and/or a driver is able to access an encryption/decryption key, referred to hereinafter as encryption/decryption key (103) and use it. The term "operating system" is intended to have a broad scope and be interpreted to include the operating system and any authorized program like: a driver program, an installer program, login programs, etc. In this context, it is intended that reference to the "operating system" performing an action involving fetching and using of the encryption/decryption key (103) to mean and include action, by the authorized program operating within the operating system, to alone or in combination with the operating system do the fetching and using of the encryption/decryption key (103).

In preferred embodiments, the central processing unit (905) does the decryption. Use of the term 'central processing unit' is intended to include any software like the operating system (120) and/or the software driver (935) and hardware like the random access memory auxiliary (952) or any hardware and/or software which will work in conjunction with the central processing unit (905) to realize the encryption/decryption of software in the first computer (130) or the server (1510).

Figure 9:
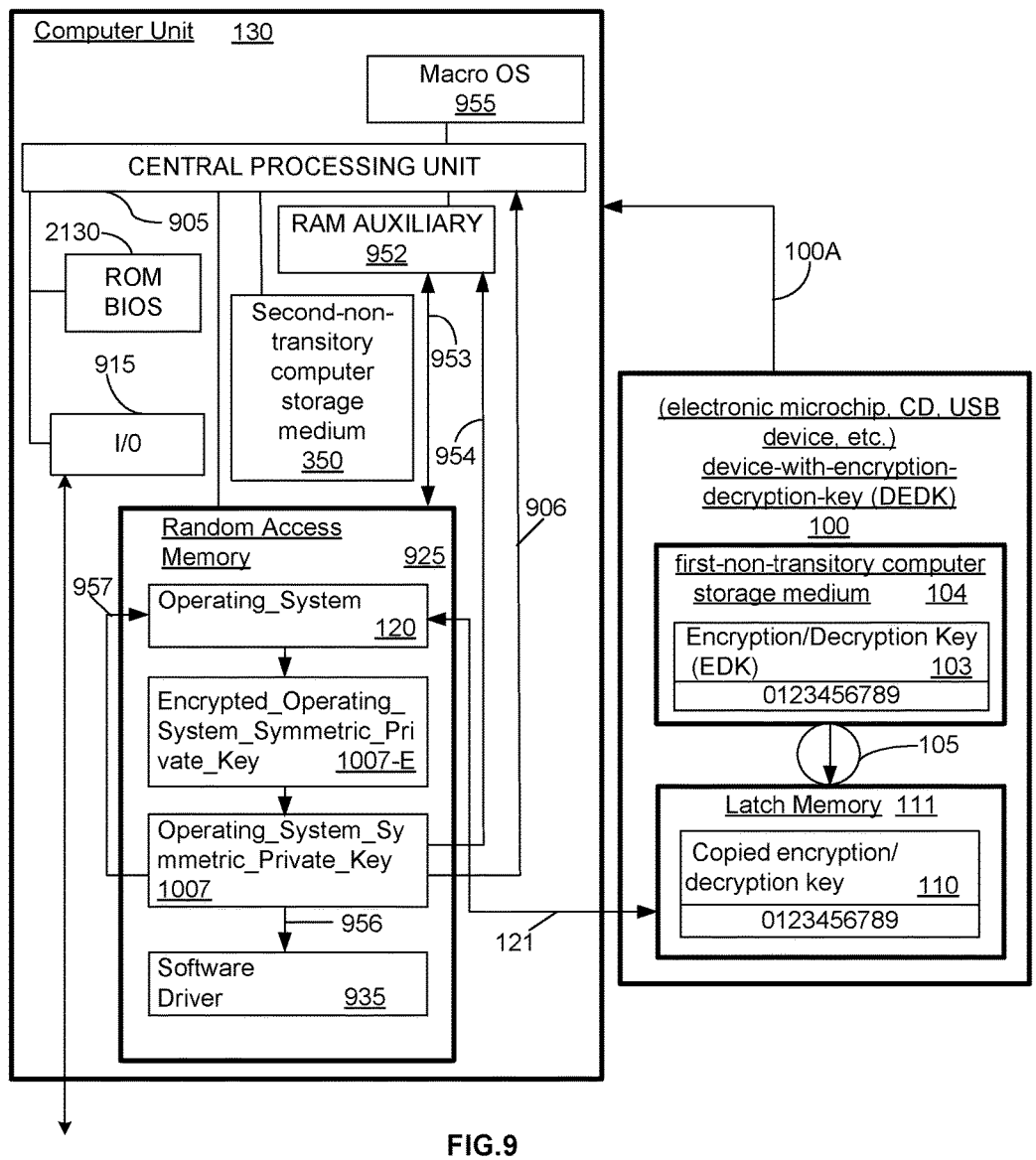
FIG. 9 illustrates a computer circuitry implementing the disclosed devices and methods.

Further, at times it will be mentioned the server (1510), and at other times the first computer (130). But if the server (1510) is mentioned, it is to be broadly interpreted to include the first computer (130). If the first computer (130) is mentioned, it is to be broadly interpreted to include the server (1510). The teachings of FIG. 9 is to be broadly interpreted to include the server (1510), the first computer (130), or any computing device having a central processing unit (905) executing any kind of program code. The use of the device-with-encryption-decryption-key (100) is to be broadly interpreted to be used in the server (1510), to be used in the first computer (130), to be used in any computing device having a central processing unit executing any kind of program code.

If specified herein that a step of encryption or decryption is performed with the encryption/decryption key (103), then this step is intended to be broadly interpreted to include performance using the encryption/decryption key (103), or using the copy of encryption/decryption key (120-A), or using the decrypted operating system symmetric private key (1007). Also, if specified that the process of encryption or decryption is performed with the encryption/decryption key (110), then this process is intended to include its performance using the encryption/decryption key (103), or using the copy of the encryption/decryption key (120-A), or using the decrypted operating system symmetric private key (1007).

In preferred embodiments, each first computer (130) has an encryption/decryption key (103) of its own. The encryption/decryption key (103) may only be accessed from the first computer (130) with the device-with-encryption-decryption-key (100) by the operating system (120) of the first computer (130) at the computer's power up or the reset of the first computer (130). Once the operating system (120) accesses the encryption/decryption key (103), the operating system (120) clears the copy of the encryption/decryption key from the latch memory (111) of the device-with-encryption-decryption-key (100), so as to prevent any further program access to the device-with-encryption-decryption-key (100) and, thus, any second or subsequent reading of the encryption/decryption key (103). Also, each the operating system (120) will have an encrypted operating system symmetric private key (1007-E) which the operating system (120) using the encryption/decryption key (103), decrypts deriving a decrypted operating system symmetric private key (1007), then the operating system (120) uses the decrypted operating system symmetric private key (1007) to encrypt/decrypt the software program (330).

Preferably, the electronic device-with-encryption-decryption-key (100) holding an encryption/decryption key (103) comprises a mechanism to enable it to make the encryption/decryption key (103) available to be read only once by the operating system and any other authorized program, including programs like: a driver or drivers and others that interface between the operating system and the device-with-encryption-decryption-key (100). Preferably, this will prevent any subsequent read performed by the operating system (120) of the first computer (130), and a read by a combination of the operating system (120), driver(s), central processing unit (905), or basic input/output system (2130). The rules for subsequent reads of the encryption/decryption key (103), preferably apply relative to a driver's operation, to authorized program(s) and to the operating system. If the electronic device-with-encryption-decryption-key (100) holding an encryption/decryption key (103) is implemented within the central processing unit (905) or under a complete control of the central processing unit (905), then the disabling of the electronic device-with-encryption-decryption-key (100) is not necessary.

In some embodiments, a software driver (935) may gain access to the copied encryption/decryption key (110) instead of the operating system (120), or in addition to the operating system (120). And the software driver (935) may do all the decryption of the encrypted operating system symmetric private key (1007-E) then using the derived decrypted operating system symmetric private key (1007), to encrypt software program (330), then passing the final end result to the operating system (120) for saving on the second-non-transitory computer storage medium (350) or to be executed by the central processing unit (905). The software driver (935) may fetch the copied encryption/decryption key (110) from the device-with-encryption-decryption-key (100) latch memory (111) and be responsible for clearing the copied encryption/decryption key (110) from the latch memory (111). Once the software driver (935) has read the copied encryption/decryption key (110), as requested by the operating system (120), then the software driver (935) can read encrypted operating system symmetric private key (1007-E) from the second-non-transitory computer storage medium (350), then read the digital-DNA (300) from the second-non-transitory computer storage medium (350) of the first computer (130). The software driver (935) using the decrypted operating system symmetric private key (1007) can then decrypt the digital-DNA (300) and make the decrypted software program accessible to the operating system (120) as executable code (i.e. the non-encoded software (310))). Also, at installation time, the software driver (935) can use the decrypted operating system symmetric private key (1007) to encrypt software code producing an encrypted code (1710), namely, the digital-DNA (300), then passing the digital-DNA (300) to the operating system (120), then the operating system (120) stores the encrypted code (1710) and the software program (330) in a file in the second-non-transitory computer storage medium (350) in the first computer (130), or in the first computer (130) random access memory (925).

The operation of reading the copy of encryption/decryption key (103) from the latch memory (111) of the device-with-encryption-decryption-key (100) is preferably done only once by the first computer (130) at the computer's power up, or at the computer's reset, or a program resetting the first computer (130). After the first reading of the copied encryption/decryption key (110), whether by a program, or by the computer, the ability to transfer the encryption/decryption key (103) to the latch memory (111) for a second time is disabled. Such disabling precludes any other program from reading the copied encryption/decryption key (110) from the device-with-encryption-decryption-key (100), except at the computer's reset, or at the computer's power up, or a program's reset. After the copied encryption/decryption key (110) is read a first time from the latch memory (111), then the copied encryption/decryption key (110) is deleted from the latch memory (111). This deletion or clearing of the copied encryption/decryption key (110) from the latch memory (111) prevents a second copying from the device-with-encryption-decryption-key (100), thus preventing a hacker's code (1550) access to the copied encryption/decryption key (110). Such deletion and prevention may be accomplished automatically by the device-with-encryption-decryption-key (100) or by the component accessing the device-with-encryption-decryption-key (100). Preferably, such deletion and prevention is accomplished right after the software driver (935) and/or operating system (120) reads it from the latch memory (111). Upon reading of the copied encryption/decryption key (110) from the latch memory (111) by the operating system (120) or the software driver (935), the read encryption/decryption key value becomes the copied encryption/decryption key (120-A) under the control of the operating system (120) or the software driver (935), or both—once the term "operating system" is mentioned, it is to be broadly interpreted to include the software driver (935) or an authorized program as well. The term "software driver (935)" is intended to be broadly interpreted to include the operating system (120) or an authorized program when the context so permits.

After reading the copied encryption/decryption key (110) from the device-with-encryption-decryption-key (100), the process of encrypting and decrypting is preferably performed without any user intervention and without requiring a user to supply user's credentials like user's identification and password before the encryption/decryption initiation.

The operating system (120) preferably uses the copied encryption/decryption key (120-A) to decrypt the encrypted operating system symmetric private key (1007-E) deriving the decrypted operating system symmetric private key (1007), then using the decrypted operating system symmetric private key (1007) to encrypt a non-encoded software (310) so as to produce an encrypted program, namely the digital-DNA (300). The operating system (120) then stores the digital-DNA (300) in the second-non-transitory computer storage medium (350) of the first computer (130). The operating system (120) then uses the decrypted operating system symmetric private key (1007) to decrypt the digital-DNA (300) to produce a non-encoded software (310). Then the central processing unit (905) fetches the non-encoded software (310) from the random access memory (925) of the computer and uses it.

In another embodiment, the operating system (120) fetches the digital-DNA (300) from the first computer (130) second-non-transitory computer storage medium (350) and stores it in the first computer (130) random access memory (925). And once the central processing unit (905) requests a byte of the Digital-DNA (300) from the random access memory (925) of the computer, the requested byte is decrypted and returned to the central processing unit (905) for use.

In an embodiment, once a user buys a device-with-encryption-decryption-key (100) that is detachable and it contains the encryption/decryption key (103). Then the user attaches the device-with-encryption-decryption-key (100) to the first computer (130) operated by the user, and from the first computer (130), the user registers the device-with-encryption-decryption-key (100) with the server computer (1000) of the manufacturer. At the registration time, the database table (1000A) of the server computer (1000) of the manufacturer already contains the optional software driver (1001); the serial-number (1002) of the device-with-encryption-decryption-key (100); the device-with-encryption-decryption-key-ID (1003) of the device-with-encryption-decryption-key (100), and the encryption/decryption key (103) which is a copy of the encryption/decryption key (103) of the device-with-encryption-decryption-key (100).

The user then provides to the operating system (120) of the first computer (130) the user's identification, the user's password and the device-with-encryption-decryption-key-ID (1003) of the device-with-encryption-decryption-key (100).

Next: the operating system (120) sends through the first secure link (1010), the user provided information to the server computer (1000). Once the server computer (1000) matches the received device-with-encryption-decryption-key-ID of the device-with-encryption-decryption-key_ID with the device-with-encryption-decryption-key-ID (1003) stored in the server computer (1000) database table (1000A), the server computer (1000) then creates the decrypted operating system symmetric private key (1007) and adds to the already existing table, the received user's ID (1005), the user's password (1006) and the decrypted operating system symmetric private key (1007) to the server computer (1000) database table (1000A), completing the registration.

After registration, the server computer (1000), using the encryption/decryption key (103), encrypts the decrypted operating system symmetric private key (1007) to derive the encrypted operating system symmetric private key. Then, the server computer (1000), through the first secure link (1010), sends the optional software driver (1001) to the first computer (130), which is connected to the device-with-encryption-decryption-key (100).

The server computer (1000) further sends the encrypted operating system symmetric private key (1007-E) to the operating system (120) of the device-with-encryption-decryption-key-ID (1003): After receiving them, the operating system (120) of the device-with-encryption-decryption-key-ID (1003) then stores the received encrypted operating system symmetric private key (1007-E) in the second-non-transitory computer storage medium (350) of FIG. 3.

Exemplary Circuitry for the Device-With-Encryption-Decryption-Key

FIG. 1 is related to FIG. 2A, FIG. 2B, FIG. 9, FIG. 10A, FIG. 11A, and FIG. 12A. FIG. 1 illustrates an example of preferred components of the device-with-encryption-decryption-key (100). The device-with-encryption-decryption-key (100) stores the encryption/decryption key (103). The storage means is preferably a non-transitory computer storage medium, a read only memory, a flash memory, and/or an electrical programmable read only memory.

The device-with-encryption-decryption-key (100) preferably includes a gate control circuitry (105), which controls signal flow between the first-non-transitory computer storage medium (104) and the latch memory (111). The first-non-transitory computer storage medium (104) of the device-with-encryption-decryption-key (100) preferably has non-transitory memory cells ((103A), (103B), (103C), and (103C)). The non-transitory memory cells hold values of the encryption/decryption key (103). The latch memory (111) preferably includes non-transitory latch memory cells (110A), (110B), (110C), and (110D) holding individual copies of bytes of the encryption/decryption key (103).

Preferably, the gate control circuitry (105) includes a timer/trigger (105A). The timer/trigger (105A) is an electronic circuitry used to fire a signal once something happens, in this particular case, a certain amount of time after the computer is turned on or reset—for instance, a few milliseconds, or a few seconds, or longer.

When the timer/trigger (105A) is present, the gate control circuitry (105) further includes an electronic tristate switch (105B) which operates like a wall switch to light bulb. When the wall switch is closed, electricity flows through the wires lighting the light bulb. When open, the wall switch stops the flow of electricity and turns off the light bulb. Thus, when closed, the electronic tristate switch (105B) permits the flow of an electronic signal. When open, the electronic tristate switch (105B) disables the flow of the electronic signal.

The timer/trigger (105A) is an example, but there are many other ways of designing the device-with-encryption-decryption-key (100) to achieve the same end result as in the explanation herein. Therefore, the explanation given is not intended to be limited as the only way, it is but one way for the device to be operating with the device-with-encryption-decryption-key (100).

After the computer is turned on or reset, the output line of the timer/trigger (105A), which is connected to the electronic tristate switch (105B), will be high, that is, having a value of "1". And with a high state signal, the electronic tristate switch (105B) automatically closes (see FIG. 2A gate control circuitry (105)). In a closed state, the values of the bytes of each of the non-transitory memory cells (103A), (103B), (103C), and (103D) holding the encryption/decryption key (103) will be transferred to the non-transitory latch memory cells (110A), (110B), (110C), and (110D) of the latch memory (111). Key_1 (103A) will be transferred to the memory location Key_a (110A). Key_2 (103B) will be transferred to the memory location Key_b (110B). Key_3 (103C) will be transferred to the memory location Key_b (110C). And, Key_n (103D) will be transferred to the memory location Key_z (110D).

Figure 2B:
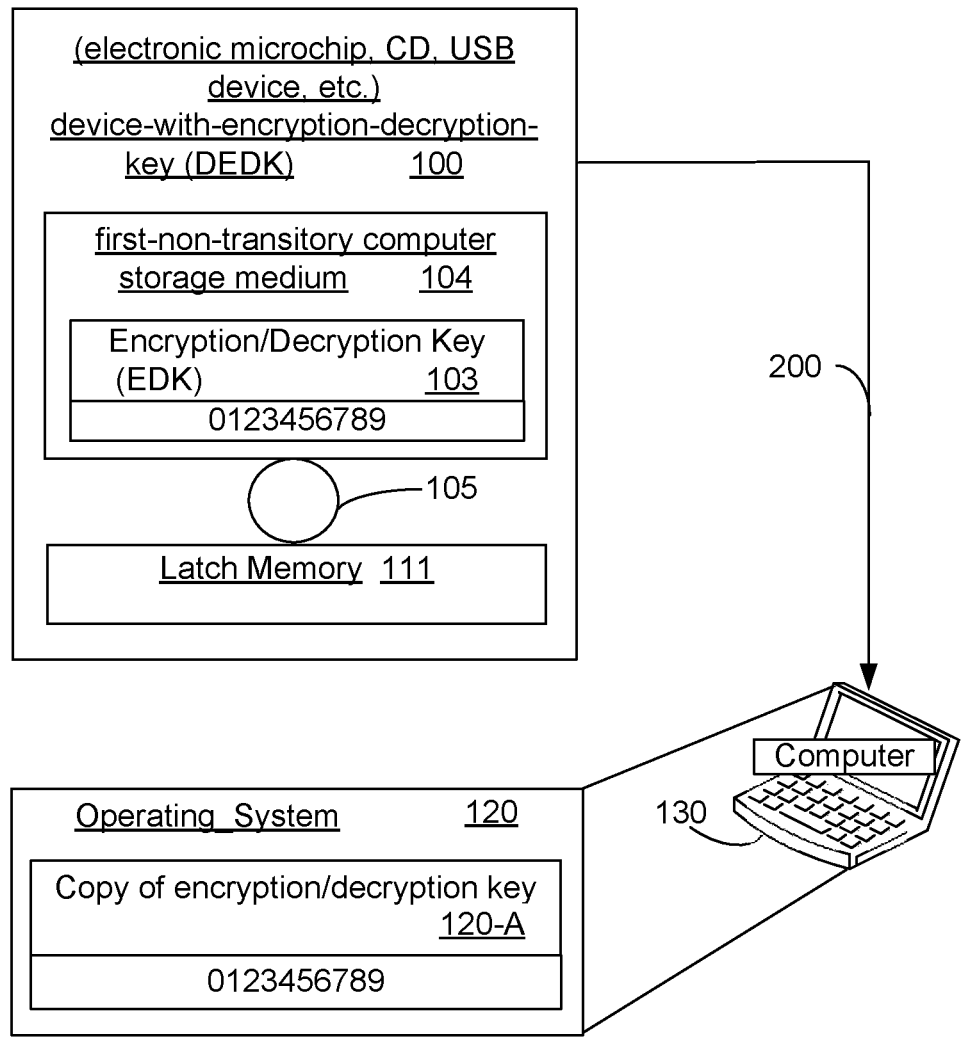
FIG. 2B illustrates a further embodiment of FIG. 2A after operating system has read the encryption/decryption key from the device-with-encryption-decryption-key at power up then disabling the device-with-encryption-decryption-key so as not to allow it to read by any other program.

After a specified time-threshold has elapsed, the timer/trigger (105A) changes from high "1" (i.e., a positive) to low "0". Once this happens, the output of the electronic tristate switch (105B) turns into high-impedance, which means that the device-with-encryption-decryption-key (100) is disconnected from the rest of the circuitry of the first computer (130) as illustrated at FIG. 2B gate control circuitry (105).

The signal value from the encryption/decryption key (103) will only go through the electronic tristate switch (105B) at the high state (namely, the positive) of the timer/trigger (105A), before the timer/trigger (105A) activates by turning from positive state "1" to low "0". After it activates, the electronic tristate switch (105B) shuts off and no signal goes through it again, except if the computer ((130) FIG. 2A) goes through a power-down and power-up, or reset.

Only one gate control circuitry (105) is illustrated between Key_1 (103A) and Key_a (110A), but preferably, each key (103B), (103C), and (103D) will have one, linking each to its cell in the latch memory (111) holding a copy of the encryption/decryption key (103). Preferably, there is one gate between (103B) and (110B), one gate between (103C) and (110C), and one gate between (103D) and (110D).

For the purpose of simplicity and for the sake of clear and concise explanation of most embodiments, just the encryption/decryption key (103) is referred to. This should be understood to include a copy of the encryption/decryption key (103) and also the copy (120-A) stored in random access memory (925) under the control of the operating system (120), both are defined as the encryption/decryption key (103).

In the device-with-encryption-decryption-key (100), a tristate bank (136) may also be present for the computer's protection in case the basic input/output system (2130) stored in read only memory, namely the ROM BIOS shown in FIG. 9, needs to access the device-with-encryption-decryption-key (100) and inhibit a program from reading of the stored encryption/decryption key (103). If this becomes necessary, the ROM BIOS, to wit, the basic input/output system (2130), issues a signal to the timer/trigger (132). Once the timer/trigger (132) activates with a low signal "0", the tristate bank (136) is set to high-impedance state, thus disabling the signal flow (134) leaving the latch memory (111) from reaching the output (138). And the output of the stored encryption/decryption key (103) will not be read by any program in the first computer (130). The timer/trigger (132) may also be designed to activate or fire after a lapse of time. If done this way, then the ROM BIOS, to wit, the basic input/output system (2130), may not be needed because the timer/trigger (132) can be designed to fire within a short time which will not enable programs, from a plugged device, enough time to read the output (138) from the device-with-encryption-decryption-key (100) via the tristate bank (136).

This may happen when a bootable compact disk or any bootable device is plugged to the first computer (130). Such action would enable the basic input/output system (2130), also referred to as the ROM BIOS, to wit, the basic input/output system (2130), to read the operating system from the external device, instead of from the operating system (120) that is the actual authorized operating system on the first computer (130). Were this to happen, then a program executed through an external operating system would be able to easily read the stored encryption/decryption key (103) and send it to hackers, who would then be able to write a virus and encrypt it using the stolen encryption/decryption key (103), producing the computer's digital-DNA, then injecting and storing virus on the first computer (130). Should that happen, the operating system (120) of the first computer (130) would not be able to distinguish the virus from validly encrypted programs, thus defeating the security implemented using the device-with-encryption-decryption-key (100).

Alternatively, the timer/trigger (132) may not be needed, if the basic input/output system (2130) connects directly (see the first dashed line (131)) to the tristate bank (136) or through another kind of electronic gate/circuitry, so as to enable the same functionality as is done with the use of the timer/trigger (132).

The circuitry for the device-with-encryption-decryption-key (100) may be much more complex than discussed above. The discussion above is presented for simplicity and not in any way trying to obscure preferred embodiments. This circuitry may be designed differently, such as for example, when gate control circuitry (105) is not present, then the means for gate mechanism for turning off the device-withencryption-decryption-key (100) may be integrated elsewhere. No matter the location, some kind of gate, similar logic, or action is preferably present. If no gate or similar action is present, then the user could simply remove or disable the device-with-encryption-decryption-key (100) from the first computer (130), such as for example, when it is installed via a computer port, such as a universal serial bus port. If the device-with-encryption-decryption-key (100) is part of a compact disk in a compact disk reader, then the compact disk could be ejected from the reader.

Exemplary Computer Circuitry

FIG. 9 illustrates preferred hardware for the first computer (130) and second computer (130A) (FIG. 12A and FIG. 13B) and server computer (1000), which includes a central processing unit (905) responsible for operation of the first computer (130). Once the first computer (130) is powered up or reset, the central processing unit (905) initiates program code stored in the basic input/output system (2130), shown in FIG. 9 and FIGS. 21-22. The ROM BIOS, i.e. the basic input/output system, has the software code that once executed, instructs the central processing unit (905) to load the operating system (120) from a second-non-transitory computer storage medium (350) shown in FIGS. 3-4, FIG. 9, and FIGS. 21-22, into the random access memory (925).

After the operating system (120) is loaded into random access memory (925), the instruction code of the basic input/output system (2130) transfers control to the first byte of the operating system (120), and the operating system (120) takes over the operation of the first computer (130). The operating system (120) then accesses the second-non-transitory computer storage medium (350) and loads the software driver (935) into the random access memory (925). The software driver (935) works in conjunction with the operating system (120). At the moment that the first computer (130) powers up or resets, the device-with-encryption-decryption-key (100), which, preferably is a separate unit attached (see the first single-headed arrow line (200)) to the first computer (130) or soldered to the first computer (130) mother board, initiates the transfer of its encryption/decryption key (103) to the latch memory (111) through the tristate switch, i.e. the gate control circuitry (105), if present. Thereafter, the operating system (120) reads (see first double-headed arrow line (121)) the copy of the encryption/decryption key (110). After the copy of the encryption/decryption key (103) is read, the tristate switch, which is the gate control circuitry (105), gets turned off, if it isn't already. After reading the copy of the encryption/decryption key (110), the operating system (120) clears the copy of the encryption/decryption key (110) from the latch memory (111). The read copy of the encryption/decryption key (110) becomes the copy of the encryption/decryption key (120-A) (see FIG. 2B) under the control of the operating system (120).

Next, the operating system (120) using the copy of the encryption/decryption key (120-A) decrypts the encrypted operating system symmetric private key (1007-E) deriving the decrypted operating system symmetric private key (1007). The operating system (120) then using (see the twentieth-fifth single-headed arrow line (957)) encrypts the software program (330) deriving its digital-DNA (300) and installing the digital-DNA (300) on the first computer (130) in the second-non-transitory computer storage medium (350) as the only installed software version (see FIG. 3). Also, the operating system (120) decrypts (see the twentieth-fifth single-headed arrow line (957)) digital-DNA (300) producing its un-encrypted software, namely the software program (330), at the runtime (see FIG. 4).

As needed, just like the operating system (120), the software driver (935) uses (see the twentieth-fourth single-headed arrow line (956)) the decrypted operating system symmetric private key (1007) to encrypt the software program (330) deriving its digital-DNA (300) and installing the digital-DNA (300) on the first computer (130) in the second-non-transitory computer storage medium (350) as the only installed software version (see FIG. 3). Also, the software driver (935) (see the twentieth-fifth single-headed arrow line (957)) decrypts digital-DNA (300) producing its un-encrypted software, namely, the software program (330) at the runtime (see FIG. 4).

An embodiment may be implemented with the use of the random access memory auxiliary (952) working in conjunction with the central processing unit (905). Or, an embodiment may dispense with the use of the random access memory auxiliary (952) by employing the central processing unit (905) working in conjunction with the operating system (120), the software driver (935), the read only memory, to wit, the basic input/output system (2130) and an embedded macro operating system (955) (or any other form of program to perform encryption/decryption for the central processing unit (905)). If implemented this way, the encryption/decryption key (103) will be integral part of the central processing unit (905) and used by the embedded macro operating system (955) to perform encryption/decryption, alone, or in conjunction with the central processing unit (905). If implemented this way, the operating system (120) and/or the software driver (935) sends program executable code and/or data to be encrypted/decrypted to the central processing unit (905) and the central processing unit (905) passes the program executable code and/or data to the embedded macro operating system (955) for encryption of non-encoded software (310), or for decryption of digital-DNA (300). Or, for encryption of non-encoded software (310) before storing in the random access memory (925) of the first computer (130), or for decryption of digital-DNA (300) stored in the random access memory (925) of the first computer (130).

It is important to notice that the use of the macro operating system (955) is optional since the same functionality can be implemented by the operating system (120) and/or the software driver (935) working in conjunction with the central processing unit (905) and the random access memory auxiliary (952). The use of the embedded macro operating system (955), while optional, will free the central processing unit (905) increasing the encryption/decryption speed. If the embedded macro operating system (955) is used, then the operating system (120) and/or the software driver (935) can pass one or more byte (whether encrypted or not) to the embedded macro operating system (955) for encryption/decryption. The embedded macro operating system (955), if used, will perform the modulus operation the central processing unit (905), as will be explained in the teachings of FIG. 18.

To prevent code injection into the random access memory (925), the random access memory auxiliary (952), which is optional, accesses (see the second single-headed arrow line (954)) the decrypted operating system symmetric private key (1007) to encrypt/decrypt software loaded in the random access memory (925) of the first computer (130). Some embodiments can be implemented where the random access memory auxiliary (952), if present, through (see the second single-headed arrow line (954)) and/or the central processing unit (905) through (see the twentieth-third single-headed arrow line (906)) accesses the decrypted operating system symmetric private key (1007) the using it for encryption/ decryption of software code stored in the random access memory (925) of the first computer (130).

As the first computer (130) proceeds with its operations, it may from time-to-time, request and or receive outside data through, for example, I/O port (915). Such outside data might be data from a wireless connection, e.g. the Bluetooth connection (1450), or from the server computer (1000). The hardware described herein do not describe a complete computer package of hardware. The basics disclosed are not intended to obscure the preferred embodiments, since it is well known to those skilled in the art that many other of the usual components are not discussed like: mouse, keyboard, screen, etc.

Also, the arrangement shown in FIG. 9 may be a computer board installed inside another computer capable of all the specified functionalities, like: encryption and decryption, instead of the operating system (120). If the arrangement is implemented as computer board, then the device-with-encryption-decryption-key (100) may be integral part of the computer board.

Device for Stopping Virus Infection in a Computer

FIG. 2A supplements FIG. 1, and it illustrates a preferred embodiment. FIG. 2A depicts a device-with-encryption-decryption-key (100) connected (see the first single-headed arrow line (200)) to the first computer (130). The device-with-encryption-decryption-key (100) has the first-non-transitory computer storage medium (104) holding a permanent copy of the encryption/decryption key (103) and latch memory (111) that holds a copy of the encryption/decryption key (103). The latch memory (111) may be integral part of the device-with-encryption-decryption-key (100) or it may be somewhere else—not part of the device-with-encryption-decryption-key (100).

The device-with-encryption-decryption-key (100) may be an electronic device (e.g., a microchip), a compact disk in a compact disk reader, a universal serial bus device, a pluggable computer card/blade, a mobile device (1430), a computer (e.g., a server or any other computer) in communication with the first computer (130), or any device which will allow the encryption/decryption key (103) to be transferred to the latch memory (111), and from latch memory (111) to the random access memory (925) of the first computer (130) and used at the first computer (130) for the purpose of working in conjunction with the decrypted operating system symmetric private key (1007) for producing the digital-DNA of the first computer (130). The term microchip is to be interpreted broadly to include the device-with-encryption-decryption-key (100) implemented inside a central processing unit (905), part of the basic input/output system (2130) or stored, or programmed in an electronic microchip, or be part of the random access memory auxiliary (952), or the macro operating system (955).

If a compact disk in a compact disk reader, or a mobile device (1430), or a computer (e.g., a server or any other computer) in communication with the first computer (130) is used, then some preferred embodiments will be implemented without the need of hardware dispensing the complete circuitry of the device-with-encryption-decryption-key (100). This mechanism will be explained shortly.

The device-with-encryption-decryption-key (100) preferably includes computer readable memory, i.e. a physical component that stores the encryption/decryption key (103), and it may be a read only memory which is written only once, or it may the flash memory which can be written multiple times, or any kind of non-transitory computer storage medium.

The gate control circuitry (105) is optional since other means can be used to provide the same functionality, like a flag which may be set by the operating system (120), or by the device-with-encryption-decryption-key (100) to indicate that the encryption/decryption key (103) has been provided.

At power up of the first computer (130), the device-with-encryption-decryption-key (100) activates, and if the gate control circuitry (105), while optional, is in use, it will enable transfer of the encryption/decryption key (103) of the device-with-encryption-decryption-key (100) from the first-non-transitory computer storage medium (104) to the latch memory (111). Next, the ROM BIOS, to wit, the basic input/output system (2130), is activated and it in turn loads the operating system (120) into random access memory (925). Once the operating system (120) becomes operational, it will read the encryption/decryption key (103) which is stored in the latch memory (111) of the device-with-encryption-decryption-key (100). The operating system (120) then stores (see the first double-headed arrow line (121)) the encryption/decryption key (103) in the random access memory (925) of the first computer (130). Thereafter, the operating system (120) proceeds and clears from the latch memory (111) the copy of encryption/decryption key (103), as illustrated at FIG. 2B.

The device-with-encryption-decryption-key (100) may be configured to preclude a second transfer of the encryption/decryption key (103). Once the device-with-encryption-decryption-key (100) transfers the encryption/decryption key (103) to the latch memory (111) of the device-with-encryption-decryption-key (100) through gate control circuitry (105), then the device-with-encryption-decryption-key (100) raises a flag or turns off the gate control circuitry (105) as to indicate that the encryption/decryption key (103) has been transferred for a first time, therefore preventing a second transfer. For instance, at the first computer (130) power up, a register of the device-with-encryption-decryption-key (100) may have a flag-value of "0" to indicate that the encryption/decryption key (103) has not been transferred yet. Then, after the encryption/decryption key (103) has been transferred to the latch memory (111), it will set the flag-value in the register to "1". Thereafter, any subsequent requests will be ignored because the flag-value is set to "1". And, if flag schema is used, the gate control circuitry (105) would not be needed.

The hardware may be controlled by a step wherein the encryption/decryption key (103) is read from the device-with-encryption-decryption-key (100) by the operating system (120) or any authorized program, only once. Alternatively, it may be controlled by a step wherein the encryption/decryption key (103) is read multiple times as long as in reading it more than once, this will not cause the security of the first computer (130) to be compromised.

The device-with-encryption-decryption-key (100) may be a smart cell phone or another computer with software that communicates with the computer through its wireless (also known as Wi-Fi) or Bluetooth connection or a network connection. This method is more fully explained in the disclosure relating to FIG. 13B and FIG. 14.

FIG. 2B illustrates a further overview of FIG. 2A. After the encryption/decryption key (103) is transferred to the latch memory (111) of the device-with-encryption-decryption-key (100), the gate control circuitry (105) is opened, illustrated as lacking the arrow in the circle (see the gate control circuitry (105)). After the operating system (120) or the software driver (935) or both (which from now on is referred as the operating system (120)), reads the copy of the encryption/decryption key (103) from the latch memory (111), then the operating system (120) proceeds and clears the latch memory (111) so as not be available to the operating system (120) for a second time. When so cleared, this denotes that the operating system (120) no longer has any connection with the device-with-encryption-decryption-key (100)—the first double-headed arrow line (121) is missing, the gate control circuitry (105) is open and the latch memory (111) is lacking the value "0123456789". The operating system (120) has available the copied encryption/decryption key (120-A). And as illustrated, the device-with-encryption-decryption-key (100) is still connected/plugged (see FIG. 2B and the first single-headed arrow line (200)) into the first computer (130), but for all effects, it is technically disconnected from the electronic circuitry of the first computer (130).

FIG. 3, which is a further embodiment of FIG. 2A and FIG. 2B, depicts the process of installing a software program (330) on the first computer (130). The software program is a software program without any encoding (also called the non-encoded software (310))), the same kind of software which is commonly used in today's prior art, and which can be installed in any computer running the operating system for which the program was designed. Examples include an accounting software or word processor, or a spreadsheet software, website code file, JavaScript code file, a driver, batch code file, script code file, etc.

Proceeding with FIG. 3. It depicts an embodiment being used in the process of installing a non-encoded software (310) on the first computer (130). Reminding again, the non-encoded software (310) is a regular software without any encoding, it is the exactly the same software of the prior art which is currently available and that can run (i.e., can be executed) in any computer having the Operating System for which the non-encoded software (310) was programmed to be executed thereon.

The storage medium holding software (340) may be in the form of compact disk or downloaded (indicated by the third single-headed arrow line (301)) from an online trusted source. The storage medium holding software (340) holds the non-encoded software (310)) which will be executed by central processing unit (905) in the first computer (130). Also taking part in the installation process of the non-encoded software (310) is an optional-header-identification-code (320). The operating system (120) generates the optional-header-identification-code (320). The optional-header-identification-code (320) may have any string's value e.g. "VALIDATED DNA" or any kind of value inserted by the operating system (120), and which the operating system (120) will use later to identify if the software has been tampered with after it was converted into its digital-DNA format. If mentioned that operating system (120) is executing the software code, this is to be broadly interpreted to mean that the central processing unit (905) is the one doing the execution of the software code and the operating system (120) is doing the managing of the hardware and software and working in conjunction with the central processing unit (905).

FIG. 3 illustrates receiving the non-encoded software (310) through a network connection (indicated by the third single-headed arrow line (301)). Then the software program (330) becomes the non-encoded software (310) which is made available through a computer connection (see the fourth single-headed arrow line (302)) to the operating system (120). The operating system (120) may add the optional-header-identification-code (320) to the non-encoded software (310) forming a software program (330) before its conversion to the first computer (130) digital-DNA (300) using the copied encryption/decryption key (120-A) which is under the control of the operating system (120).

Then the operating system (120) uses the copied encryption/decryption key (120-A) and decrypts (see the fifth single-headed arrow line (303)) the received encrypted operating system symmetric private key (1007-E) deriving the decrypted operating system symmetric private key (1007) (see the sixth single-headed arrow line (304)), the operating system (120) then using the decrypted operating system symmetric private key (1007) encrypts the software program (330), producing (see the seventh single-headed arrow line (305)) the first-encrypted software program, the Digital-DNA (300) which is unique to first computer (130). Then the operating system (120) sends (see the eighth single-headed arrow line (306)) the digital-DNA (300) to the first computer (130) and the first computer (130) saves (see the ninth single-headed arrow line (307)) the digital-DNA (300) in the second-non-transitory computer storage medium (350), shown in FIG. 3.

The digital-DNA (300) is now encoded/encrypted and cannot be executed as is without first being decrypted, since the central processing unit (905) of the first computer (130) can only execute/use the non-encoded software (310)). But the digital-DNA (300) is encoded, and if the central processing unit (905) tries to execute it as is, the digital-DNA (300) will not be in a format which is understood by the central processing unit (905).

The optional-header-identification-code (320) may be separated from the non-encoded software (310). Both may reside in two distinct files with the same name and a distinct file extension, both may be in a single file or the optional-header-identification-code (320). Both, the optional-header-identification-code (320) and the non-encoded software (310) would be encrypted with the encryption/decryption key (103). It may be implemented where the optional-header-identification-code (320) is not encrypted.

FIG. 4 illustrates the opposite process of FIG. 3, which involves the decryption of the digital-DNA (300). FIG. 4 illustrates converting the digital-DNA (300) back to the non-encoded software (310). Once the execution of the digital-DNA (300) is requested by a user, or by the operating system (120), or by another program in the first computer (130), the operating system (120) communicates with the first computer (130) and requests from first computer (130) the digital-DNA (300) stored in the second-non-transitory computer storage medium (350). Next, the first computer (130) accesses the second-non-transitory computer storage medium (350) via connection (see the tenth single-headed arrow line (400)) and makes available (via link A (see the eleventh single-headed arrow line (401)) and link B (see the twelfth single-headed arrow line (402))) the digital-DNA (300) to the requesting operating system (120).

The operating system (120) uses the copied encryption/decryption key (120-A) and decrypts (if not already decrypted) the encrypted operating system symmetric private key (1007-E) (see the thirteenth single-headed arrow line (403)) deriving the decrypted operating system symmetric private key (1007) (see the fourteenth single-headed arrow line (404)). Then the operating system (120) using the decrypted operating system symmetric private key (1007) decrypts (see the fifteenth single-headed arrow line (405)) the digital-DNA (300) producing the non-encoded software (310) and the optional-header-identification-code (320), which is the software program (330) as originally encrypted. Next, the operating system (120) the optional-header-identification-code (320), and if contains the phrase "VALI- DATED DNA", then the operating system (120) knows that the digital-DNA (300) has not been tampered with. Finally, the operating system (120) loads (see the sixteenth single-headed arrow line (406)) the non-encoded software (310)) in the random access memory (925) of the first computer (130) (see the first dashed double-headed arrow line (407)) passing the starting location of the non-encoded software (310)) to the central processing unit (905) and the central processing unit (905) executes the non-encoded software (310) fetching instructions of the non-encoded software (310) from random access memory (925), as needed. If the optional-header-identification-code (320) is not present or if it doesn't contain the phrase "VALIDATED DNA", the operating system (120) may disable the loading of the executable program, i.e., the non-encoded software (310), by not loading it into the random access memory (925), thus disabling it before execution.

The optional-header-identification-code (320) may also include a validation code, such as the number of bytes (i.e., the length) of the non-encoded software (310) or any other means to validate the file, like a checksum (a checksum is a small-sized datum derived from a block of digital data for the purpose of detecting errors which may have been introduced during its transmission or storage) of the non-encoded software (310) content before its encryption. If a validation code is included, then the operating system (120) performs a check sum of the non-encoded software (310) and check with the checksum of the optional-header-identification-code (320) to verify if the file is still the software program (330) as originally encrypted. The optional-header-identification-code (320) may also include other information like the maker of the software, the software serial number, the software version, etc.

Basic Encryption Example

Explaining a basic encryption process to derive the digital-DNA (300). Assuming that the schema for encrypting is a multiplication of the encryption key value by the value to be encrypted, and the decryption is the division of the value to be decrypted by the encryption key value. If it is assumed that the non-encoded software (310) is the code value "9" that can be executed by the central processing unit (905). But once the non-encoded software (310) is encrypted with the encryption/decryption key (103), and assuming that the value of the encryption/decryption key (103) is "7". Then, after this value of "7" is multiplied by the non-encoded software (310) which is the value of "9", then the end-result will become "63" (which is the digital-DNA (300)). Once the central processing unit (905) reads the digital-DNA (300) (the value of ("63")) it will not understand it because it has been encrypted, and therefore, it will not be able to process and execute it.

However, since the operating system (120) has the copied encryption/decryption key (120-A) with the value of "7", all of what the operating system (120) will have do is use the value of "7" do perform the decryption, which is just the opposite of the encryption, and since the encryption involved the multiplication of "7" with "9" to obtain the value "63", the operating system (120) or the central processing unit (905) will take the value "63" and divide it by the value of "7" (which is the encryption/decryption key (103)) and retrieves the actual value of "9" (which is the non-encoded software). Once the value of "9" is obtained, which the central processing unit understands, the value of "9" is loaded it into the random access memory (925) and the central processing unit (905) executes it.

When a request to run software is made on first computer (130) where the digital-DNA software is installed, the operating system (120) first unencrypts the digital-DNA software, then the central processing unit executes it.

A computer infection with a virus typically occurs without user's knowledge and without any indication to the operating system. However, the virus present in the computer employing the device or method disclosed herein would be un-encoded and if a request to execute the un-encoded virus is performed on the first computer (130), two things will happen: 1) since the operating system (120) decrypts a digital-DNA code before its execution, and, 2) since a decryption is the opposite of an encryption. Therefore, once a request for execution of the un-encoded virus code is initiated, the operating system (120) or the central processing unit (905) will first decrypt it before its execution, but once the un-encoded code is decrypted, it will become encoded, that is, it will become encrypted and transformed into the first computer (130) digital-DNA then stored into the first computer (130) random access memory (925) prior to its execution. But the central processing unit (905) only executes non-encoded software program code, once the central processing unit (905) tries to execute the virus-digital-DNA, the central processing unit (905) will not understand it, halting the operation of the virus-digital-DNA. Once the term the operating system (120) is mentioned doing the encryption/decryption, it is to be broadly interpreted to include the central processing unit (905) and/or the macro operating system (955) as well. Also, once the term the central processing unit (905) is mentioned doing the encryption/decryption, it is to be broadly interpreted to include the operating system (120) and/or the macro operating system (955) as well.

Virus Invalidation Example

Assuming the un-encoded virus installed on the first computer (130) has a value of "70", also, as explained before, assuming that the encryption involves a multiplication of the value to encrypt and the encryption/decryption key value and the decryption involves the division of the encrypted value by the encryption/decryption key value. Once the operating system (120) is commanded to initiate the execution of an un-encoded virus, since the central processing unit (905)—FIG. 9, will only execute instructions which is decrypted, then the operating system (120) decrypts the un-encoded virus using the copied encryption/decryption key (120-A), which in this example has a value of "7". The operating system (120) divides the value "70" of the virus code by "7", which produces the value of "10" (which is the virus digital-DNA) then loading the virus digital-DNA into the random access memory (925). Once the central processing unit (905) tries to execute the value of "10", execution fails because the central processing unit (905) only understands un-encoded instruction values.

Encryption/Decryption Computer Logic Algorithm

The virus invalidation example above is a very basic encryption/decryption algorithm. A preferable computer algorithm would use a more sophisticated mathematical formula with very large values in the hundreds of numbers in length, or computer logic with very large encryption key. Preferably, encryption would produce a value using the computer logic XOR (eXclusive OR).

Computers only understand electronic signals and they are represented in the form of low-signal which is a zero "0" and high-signal which is a one "1". Therefore, anything which an English speaking human readily understands is meaningless to a computer. For instance, before the letter "a" can be understood by a computer, two steps need to be applied to it: first, be converted into a numeric table which represents the letter "a"; then the numeric value is converted into a value represented by zeros and ones, which is a value the computer understands. The "a" is first converted into its numerical value of "97". Then, in the following step, the value of "97" is converted into the binary value of "01100001", which the computer understands.

The binary value of "01100001" (each "0" or "1" is called a bit) represents the value of "97". The very first value starting from the right represents the value of "1" and each subsequent value going to the left of the byte, represents the prior value times "2" (which is the binary value representation, since computers only understands "0" and "1" (which are binary)). Finally, all the values which is under the binary value representation with a value of "1", is added together. Let's see how it works.

| 128 | 64 | 32 | 16 | 8 | 4 | 2 | 1 | binary value representation |
|---|---|---|---|---|---|---|---|---|
| 0 | 1 | 1 | 0 | 0 | 0 | 0 | 1 | the byte value for the letter "a" |
| 0 | 64 | 32 | 0 | 0 | 0 | 0 | 1 | the resulting conversion values |

64 + 32 + 1 = 97 - once converted back it represents the letter "a"

Since, if a binary value of "0" doesn't get added in the final conversion, then if a number is of low value it may be represented just by the first half of the byte value (i.e., the four rightmost bits), and this is what is shown in the next example: The use of only half of a byte for simplicity.

FIG. 5 illustrates two half-byte values being XOR-ed by the computer's electronic circuitry. The second row from top (510), far right value of "9" is XOR-ed with the third row from top (520), far right value of "7". The XOR operation uses the binary representation of the values that it will process, that is, XOR. In an XOR operation once two binary values are XOR-ed, bit-by-bit, if two bits are the same, that is, if both bits are "0" or both bits are "1" then the resulting value is "1", on the other hand, if any of the two values are different, that is, if one is "0" and the other is "1", then the resulting value is "0".

For instance, the value of "9", shown at in the second row from top (510) at the right end, is represented by the byte value of "00001001" and the value of "7" is "00000111". For these examples, the four leftmost bit values are ignored since our examples uses small values, we're using half-byte value. XOR is the most used method in encryption/decryption since the resultant value has the same length of the two values being XOR-ed and computers easily complete XOR operations because it involves comparisons, something computers are very fast at.

Once two values are XOR-ed and the XOR result is applied to either of the original values in a second XOR operation, the operation result will produce the missing value—the value not taking part of the XOR operation.

Top row (500) of FIG. 5 illustrates the reference value for each bit under it. For instance, the value is "9", shown at in the second row from top (510) at the right end, has four bits. And, if we analyze the top row (500) and the second row from top (510) has a bit value of "1" under "1" and "1" under "8", and it represents the value of "9" (8+1=9). The value of "9" (510) represents the program page (see FIG. 3 non-encoded software (310)) and the next value is "7" in the third row from top (520) is derived from the sum (4+2+1=7), which represents the encryption/decryption key (103)). Once the value of "9" is XOR-ed with the value of "7", the result is "14" in the fourth row from top (530). The value of "14" is derived from the sum (8+4+2=14). The value of "14" is the digital-DNA (300)). This process illustrates how a computer encrypts two values using its electronic logic.

FIG. 6 has the first row (600), which is the same as the top row (500) of FIG. 5. The result "14" at the far right in the second row (610) represents the digital-DNA (300). The result "14" is XOR-ed with the value of "7" at the far right in the third row (620), which is the encryption/decryption key (103). The result of XORing the value "14" with the value "7" derives the value of '9' in the fourth row (630), which represents the non-encoded software (310), in a format which the central processing unit (905) understands.

If a computer virus has a value of "70", it would be converted to a binary format, as follows:

| 128 | 64 | 32 | 16 | 8 | 4 | 2 | 1 | binary value representation |
|---|---|---|---|---|---|---|---|---|
| 0 | 1 | 0 | 0 | 0 | 1 | 1 | 0 | the virus binary representing the value of "70" |
| 0 | 64 | 0 | 0 | 0 | 4 | 2 | 0 | the resulting conversion values |

64 + 4 + 2 = 70 - virus code

If the virus "01000110" is present in the first computer (130), it may only be executed if the operating system (120) or the central processing unit (905) first decrypts the virus with the value of encryption/decryption key (103), which is "7", binary "00000111". This operation is—

| 128 | 64 | 32 | 16 | 8 | 4 | 2 | 1 | binary value representation |
|---|---|---|---|---|---|---|---|---|
| 0 | 1 | 0 | 0 | 0 | 1 | 1 | 0 | the virus binary representing the value of "70" |
| 0 | 0 | 0 | 0 | 0 | 1 | 1 | 1 | the encryption/decryption key (103) representing the value of "7" |
| 1 | 0 | 1 | 1 | 1 | 1 | 1 | 0 | the XOR of resulting conversion values between "70" and "7" |
| 128 | 0 | 32 | 16 | 8 | 4 | 2 | 0 | Resulting decimal value of the XOR operation |

128 + 32 + 16 + 8 + 4 + 2 = 190 - virus digital-DNA

Once the virus is converted to the digital-DNA value of "190", the central processing unit (905) will not be able to execute it because the central processing unit (905) only understands the virus original value of "70", not its digital-DNA value of "190", therefore the virus has been disabled without having caused any harm to the first computer (130). Decryption is also an encryption, more like, an encryption in reverse.

Computer Virus Basics

For a computer virus to succeed and proliferate, it needs to have two abilities: first, it needs to be able to execute itself in any computer running the operating system for which it was programmed; and second, it needs to be able to infect a software program, and/or replicate itself on other computers. Once the prior art computer is running a prior art software program that contains the computer virus, the prior art computer will also run the virus. This is because the virus is part of the prior art software program, i.e. the good code—this process is called "infection." If the virus is able to replicate itself, then it will wait for the appropriate time to deliver its payload, and most of the time, it is malicious.

If the intended good code is "9" and the virus code is "70", the computer virus will insert itself into the good code "9" like "709"—usually in the beginning of the software file (the computer virus "70" is located prior to the good software code "9"). Once the operating system of the prior art comes to the infected file, it proceeds to process the complete file containing the computer virus "70" and the good software code "9". It will first read "70", loading the virus code into random access memory, then the central processing unit executing it, then, it will load and execute the actual good code "9". The operating system and central processing unit of the prior art will not differentiate the computer virus "70" from the actual good computer software code "9" because both: the good code "9" and the bad virus code "70" are in the same kind of code-format for the operating system. The just described process may happen in a file, or in a process running in the computer's random access memory.

The above examples illustrate the process using a short value to represent a segment of good code and a short value to designate the bad virus code, but usually both programs, the good software code and the virus code, will be many bytes long, sometimes in the thousands or millions of bytes.

Computer Virus of the Prior Art

FIG. 7 illustrates in the operation of the prior art computer system that is infected with a computer virus. In FIG. 7, the computer virus (710) is positioned at the beginning of the infected computer software file (700) before the good software code (720). Once the infected computer software file (700) is loaded by the operating system of the prior art, the central processing unit will first execute the computer virus (710), and as the prior art central processing unit proceeds, it will execute the good software code (720). Once the infected computer software file (700) execution is requested, the operating system of the prior art would read both: the bad software code, the code for the computer virus (710), and the good software code (720). Then the prior art operating system will load both into the computer's random access memory; then finally, the central processing unit would execute both, and each would perform the activities that each was programmed to perform. The good software code (720) doing its intended good actions, and the computer virus (710) doing its intended evil actions. This only happens because both: the executable code for the computer virus (710) and the executable code, the good software code (720), is in the same understandable compiled code, which the prior art's central processing unit understands.

Installation of Software Code

FIG. 8A relates to FIG. 3, and illustrates the process wherein the operating system (120) of the first computer (130) saves the digital-DNA (300) for a software program (i.e., the non-encoded software (310))) in the second-non-transitory computer storage medium (350) of the first computer (130). The device-with-encryption-decryption-key (100) holds at its first-non-transitory computer storage medium an encryption/decryption key (103) having a value of "0123456789". A copy of the value "0123456789" is held in the memory location (120-A) in the random access memory (925) of the first computer (130) under the control of and used by the operating system (120). The operating system (120) reads (see the seventeenth single-headed arrow line (801)) the non-encoded software (310)) from the second-non-transitory computer storage medium (350) and using the copied encryption/decryption key (120-A) decrypts (see the eighteenth single-headed arrow line (802)) the encrypted operating system symmetric private key (1007-E) deriving the decrypted operating system symmetric private key (1007), then the operating system (120) using the decrypted operating system symmetric private key (1007) encrypts the non-encoded software (310)) producing the digital-DNA (300) (i.e., the good executable software). Then saving the digital-DNA (300) in the second-non-second-non-transitory computer storage medium (350) of the first computer (130).

Execution of Software Code Using Disclosed Methods and Devices

FIG. 8B relates to FIG. 4, and illustrates the decryption process reversing the encryption process of FIG. 8A. In this example, at the moment that the operating system (120) loads the digital-DNA (300) for execution (see the nineteenth single-headed arrow line (803)). The operating system (120), using a copy of the encryption/decryption key (103) which is stored in the memory location (120-A) decrypts (see the twentieth single-headed arrow line (804)) the encrypted operating system symmetric private key (1007-E) deriving the decrypted operating system symmetric private key (1007). Then the operating system (120) using the decrypted operating system symmetric private key (1007) decrypts the digital-DNA (300) deriving the executable code of the non-encoded software (310)). Then, the central processing unit (905) executes the non-encoded software (310) which is stored in the random access memory (925) of the first computer (130).

Two primary encryption/decryption steps of the process used by the operating system (120) or the central processing unit (905) preferably include: 1) at installation time, the operating system (120) encrypts the non-encoded software (310) producing the Digital-DNA (300), then saves it (see FIG. 8A); and 2) at runtime, the operating system (120) decrypts the digital-DNA (300) producing the non-encoded software (310)) that the operating system/central processing unit understands, then executes it (see FIG. 86).

Stopping Computer Virus

Figure 8C:
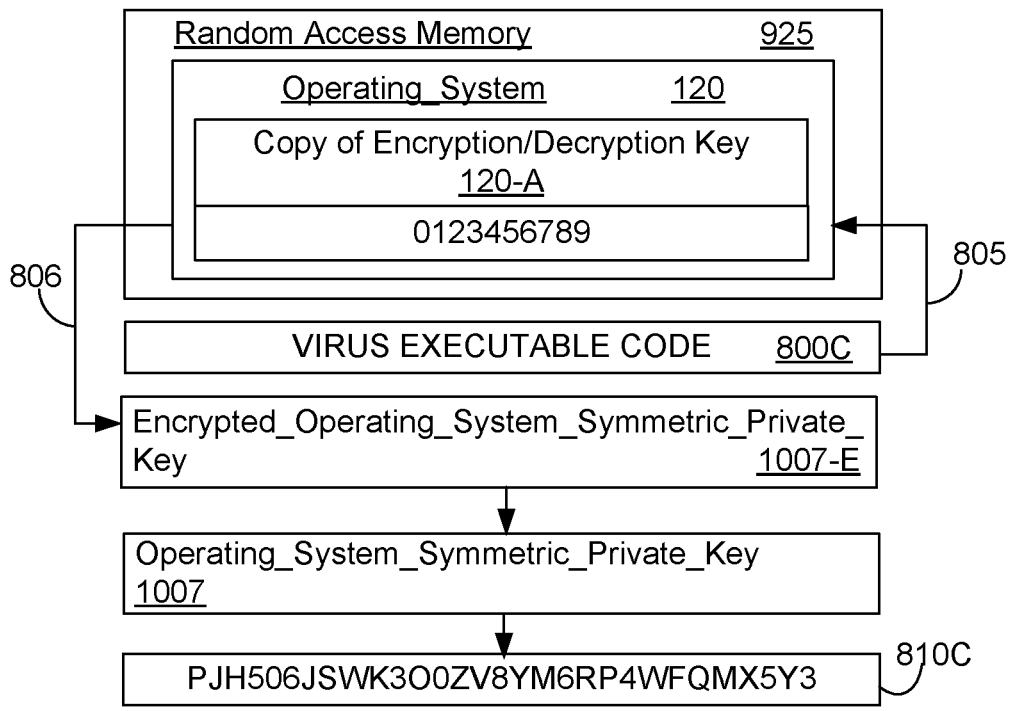
FIG. 8C illustrates stopping the computer virus using the disclosed devices and methods.

FIG. 8C illustrates the introduction of a virus or worm (800C) into the first computer (130). Once the operating system (120) receives a request to execute the code of the virus or worm (800C) the operating system (120) loads (see the twentieth-first single-headed arrow line (805)) the executable code of the virus or worm (800C) and using the copy of the encryption/decryption key (120-A) decrypts (see the twentieth-second single-headed arrow line (806)) the encrypted operating system symmetric private key (1007-E) deriving the decrypted operating system symmetric private key (1007). Then the operating system (120) using the decrypted operating system symmetric private key (1007) proceeds to decrypt the virus or worm (800C). And once decrypted, the decrypted virus code (810C) becomes unusable, and once the central processing unit (905) tries to execute it, the central processing unit (905) recognizes that the code is not in an understandable format, and therefore proceeds to ignore the encrypted code, or kill the process, since it is not in the proper format for the operating system (120) or for the central processing unit (905). The virus is, thus, destroyed.

Assuming that a virus is a worm. A worm is virus that after infecting one computer in a network then it migrates to other computers infecting them all. Also, assuming that it was introduced in one connected computer in the network while installing an infected software in the computer of the prior art, or after the computer of the prior art was hacked. After the virus worm is executed by the computer of the prior art, it will migrate to other connected computer in the network, but once it arrives in another computer hosting the digital-DNA, it will have a problem, before the worm is executed in the new computer hosting the digital-DNA, the operating system (120) of the new computer will first decrypt the worm with its own device with the value of the encryption decryption key—which is another form of encryption—, and the worm will have its code changed (see FIG. 8C and the decrypted virus code (810C)), and once the central processing unit (905) tries to execute the new encrypted worm's code, it will not work and an error will ensure.

If a virus or worm (800C) is sent to an unsuspected user in an e-mail in the form of a link which once clicked will redirect the user to a malicious website, or, in the form of an infected e-mail attachment. After the user clicks on the link or on the infected attachment launching the worm, again, before the worm is executed, the operating system (120) of the first computer (130) will first decrypt the virus worm with the encryption/decryption key (103) and in turn, the virus worm has its code changed to gibberish (see FIG. 8C and the decrypted virus code (810C)) and once the central processing unit (905) tries to execute it, the central processing unit will know that it is an un-authorized code and produces an error, or simply destroy it. Just as in a network, the virus worm will be killed before it can be executed/processed in the computer, therefore preventing infection and/or damage.

The encryption/decryption processes disclosed in FIG. 8A and FIG. 8B are for explanatory purposes only and not an actual result of an encryption/decryption. For instance, the digital-DNA (300) is not an actual XOR (or encryption of any form) between executable code, namely non-encoded software (310) and the decrypted operating system symmetric private key (1007). Similarly, in FIG. 8C, there is no actual encryption between the virus or worm (800C) and the decrypted operating system symmetric private key (1007). Since, there are many encryption algorithms available and many ways to perform an encryption that, even if an actual encryption had been performed, the results would have varied.

Furthermore, the art of encryption is well established and since there are many state of the art encryption/decryption methods that may be used for purposes of carrying out the methods disclosed herein.

Overview of a Preferred Embodiment

In some preferred embodiments, three sequences are present:

1) The operating system (120) used at the installation time of non-encoded software (310) encrypts the executable code, i.e. encrypts the non-encoded software (310), producing the digital-DNA (300), shown in FIG. 8A. The operating system (120) then saves the digital-DNA (300) on the second-non-transitory computer storage medium (350) of the first computer (130). And, 2) Before the central processing unit (905) executes the digital-DNA (300), the central processing unit (905) or the operating system (120) decrypts the digital-DNA (300) producing an unencrypted executable code (the non-encoded software (310)), which the central processing unit (905) understands, then the central processing unit (905) executes it (the executable code also referred to as the non-encoded software (310) of FIG. 8B).

3) If the operating system (120) is requested to load a virus executable code which is unencrypted (800C), the operating system (120) decrypts it (the operating system's behavior as controlled and described herein is to first decrypt an encrypted executable code before the central processing unit executes it) converting the virus code into the computer's digital-DNA (see FIG. 8C and the decrypted virus code (810C)), and once the central processing unit (905) tries to execute the decrypted virus code (810C), the virus becomes gobbledygook that is un-executable because the central processing unit (905) only executes unencrypted code.

In other preferred embodiments, three sequences are also present:

1) The operating system (120) at the installation time of executable code (i.e. the non-encoded software (310)) encrypts the executable code producing the digital-DNA (300), shown in FIG. 8A. The operating system (120) then saves the digital-DNA (300) in the second-non-transitory computer storage medium (350) of the computer.

2) Before the central processing unit executes the digital-DNA (300), the operating system (120) stores the encrypted version in random access memory (925), and decrypts the encrypted version from random access memory (925), as requested by the central processing unit (905). Then, the central processing unit (905) executes the digital-DNA (300) as decrypted executable code. This digital-DNA (300) is also referred to as the non-encoded software (310) of FIG. 8B.

3) If the central processing unit (905) is requested to execute an executable code of a virus or worm (800C) stored in the random access memory (925), which would be unencrypted because it had to have been downloaded after startup, the operating system (120) will first decrypt the virus or worm (800C). The operating system's behavior using preferred methods disclosed herein is to first decrypt an encrypted executable code before it is executed. This decryption action converts the code of the virus or worm (800C) into gobbledygook, namely the decrypted virus code (810C), as illustrated in FIG. 8C. Once the central processing unit (905) execute the digital-DNA (300) that is infected with the decrypted virus code (810C), the virus gets disabled because the central processing unit (905) unit only executes code that it first decrypts. While the operating system (120) is described as performing the decryption of the digital-DNA (300), this is intended to include a decryption performed by central processing unit (905), or by the macro operating system (955), or a combination of the macro operating system (955) and the central processing unit (905).

If an optional-header-identification-code (320) of FIG. 3 and FIG. 4 is present and valid, then once a file execution is requested, the operating system (120) proceeds as follows: Once the operating system (120) decrypts the Digital-DNA (300), the operating system (120) will retrieve the optional-header-identification-code (320) from the non-encoded software (310) and verify that it is present and valid. If it is present and valid, the operating system places the encrypted version of the non-encoded software (310)) in the random access memory (925) of the first computer (130) for execution by the central processing unit (905) of the first computer (130). If the header identification code is not there or not valid, the request to execute the software file is disregarded and an error generated. If the software happens to be a virus, then once the virus is decrypted, the operating system (120) will not be able to locate the optional-header-identification-code (320) and the virus is disabled.

The device-with-encryption-decryption-key (100) may be used by the operating system (120) of the first computer (130) for other purposes, such as for saving sensitive information that has to be available to the operating system (120) of the first computer (130).

Also, the device-with-encryption-decryption-key (100) may be used by the operating system (120) to encrypt any kind of file and not limited to a software file. For instance, the encryption/decryption key (103) may be used by the operating system to encrypt a database file containing sensitive data like user's e-mail and other personal data.

Further, if the device-with-encryption-decryption-key (100) is implemented as an independent computer board, it may be a complete computer (see FIG. 9) on the board (the first computer (130) and the device-with-encryption-decryption-key (100)), and the board installed into a computer.

If the device-with-encryption-decryption-key (100) is used to encrypt data, then a software library may be developed at the operating system level and integrated with developed software, thus enabling a software to call a function code in the library passing the data to be encrypted, and the operating system (120) using the encryption/decryption key (103) to encrypt the received data producing an encrypted data, then passing the encrypted data back to the software, and the software saving it into the database or file. The same will work for decrypting, the software passes an encrypted data to the operating system (120), and the operating system (120) returns decrypted data to the software.

By software it is meant to be interpreted broadly and not to apply to compiled code only, it may be batch files, script files, system files, interpreted code files, compiled code files, etc. It is any kind of file that the operating system, or the central processing unit, or an interpreter program will interpret or execute in terms to be able to perform their functions.

Installation of a Device-With-Encryption-Decryption-Key

In one of the preferred embodiments, a secondary symmetric encryption decryption key is used to encrypt non-encoded software program before installation producing digital-DNA then installing the digital-DNA as the only installed software program and decryption of digital-DNA before the digital-DNA execution. In the preferred embodiment, the encryption/decryption key (103) is used to encrypt the secondary symmetric private key (1070). The secondary symmetric private key can be a single encryption decryption key used by an operating system (the decrypted operating system symmetric private key (1007)) or a unique encryption decryption key used by a software program (which becomes the program symmetric private key (1075)). The operating system symmetric private key is also called the decrypted operating system symmetric private key (1007). The program symmetric private key (1075) is also called the decrypted program symmetric private key (1075).

If the secondary symmetric private key (1070) is assigned to an operating system (the decrypted operating system symmetric private key (1007)). The operating system will use the operating system symmetric private key, which is the same as the decrypted operating system symmetric private key (1007), for the encryption and decryption of all software programs under the operating system's control.

If the secondary symmetric encryption decryption key is assigned to a software program (then becoming the program symmetric private key (1075)), then the program symmetric private key (1075) will be used by the operating system controlling the software program for the encryption and decryption of the software program to which the program symmetric private key (1075) is assigned to.

The operating system then uses the encryption/decryption key (103) to encrypt and decrypt the operating system symmetric private key. if the secondary symmetric private key (1070) is assigned to the operating system.

If the secondary symmetric private key (1070) is assigned to the software program (to become the program symmetric private key (1075)), the operating system, can proceed in one of two ways: (1) the operating system can encrypt and decrypt the program symmetric private key (1075) using the encryption/decryption key (103); or (2) the operating system can encrypt and decrypt the program symmetric private key (1075) using the operating system symmetric private key, which is the same as the decrypted operating system symmetric private key (1007).

Once the secondary symmetric private key (1070) as the operating system symmetric private key or the program symmetric private key (1075) is encrypted, the secondary symmetric private key (1070) is stored in the second-non-transitory computer storage medium (350) of the first computer (130).

The use of the secondary symmetric private key (1070) will enable flexibility for the porting (transfer) of the operating system and/or software programs from a first computer (130) to a second computer (130A), without compromising security and without constraining the digital-DNA (300) to a single computer, e.g. first computer (130).

The terms: software program (330), software code, or application program, or non-encoded software program, or non-encoded software, or non-encoded application program, or executable program, or executable software, or executable application, or program, or application, or software, or interpreted software, or interpreted program—means the same thing herein. Each of these is defined to include an executable program under the control of an operating system and to be executed by the central processing unit of the computer.

Figure 10A:
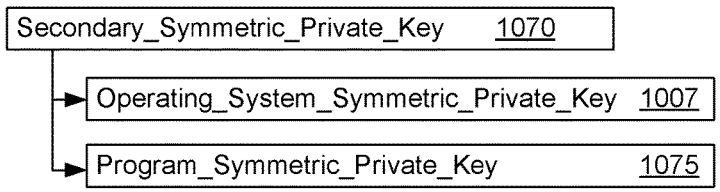
FIG. 10A illustrates the secondary symmetric encryption key which is used by the computer's operating system as the operating system symmetric private key or used by an application program as program symmetric private key.

FIG. 10A illustrates the preferred embodiment. The secondary symmetric private key (1070) can be assigned to the operating system (120) as the operating system symmetric private key. Also, the secondary symmetric private key (1070) can be assigned to a software program (330) as program symmetric private key (1075).

Further, the secondary symmetric private key (1070) can at the same time be assigned to the operating system (120) as the operating system symmetric private key, and to a software program (330) under the control of the operating system (120) as the program symmetric private key (1075).

If the secondary symmetric private key (1070) is assigned to both (the operating system (120) and to a software program (330)), there will be two encryption decryption keys. The first one, the operating system symmetric private key, which is global and used by the operating system (120) to encrypt and decrypt software program (330) under the control of the operating system (120), and/or to encrypt decrypt one or more program symmetric private key (1075) assigned to one or more software programs under the control of the operating system (120). The second one, the program symmetric private key (1075) which is unique to each software program (330) under the control of the operating system (120).

It is still possible that the secondary symmetric private key (1070) be assigned only to software program (330). And if implemented this way, then each software program (330) would have a program symmetric private key (1075) that is unique to each software program (330) under the control of the operating system (120). The operating system (120) would not have the decrypted operating system symmetric private key (1007). The operating system (120) would use the encryption/decryption key (103) to encrypt and decrypt the program symmetric private key (1075) of each software program (330).

Figure 10B:
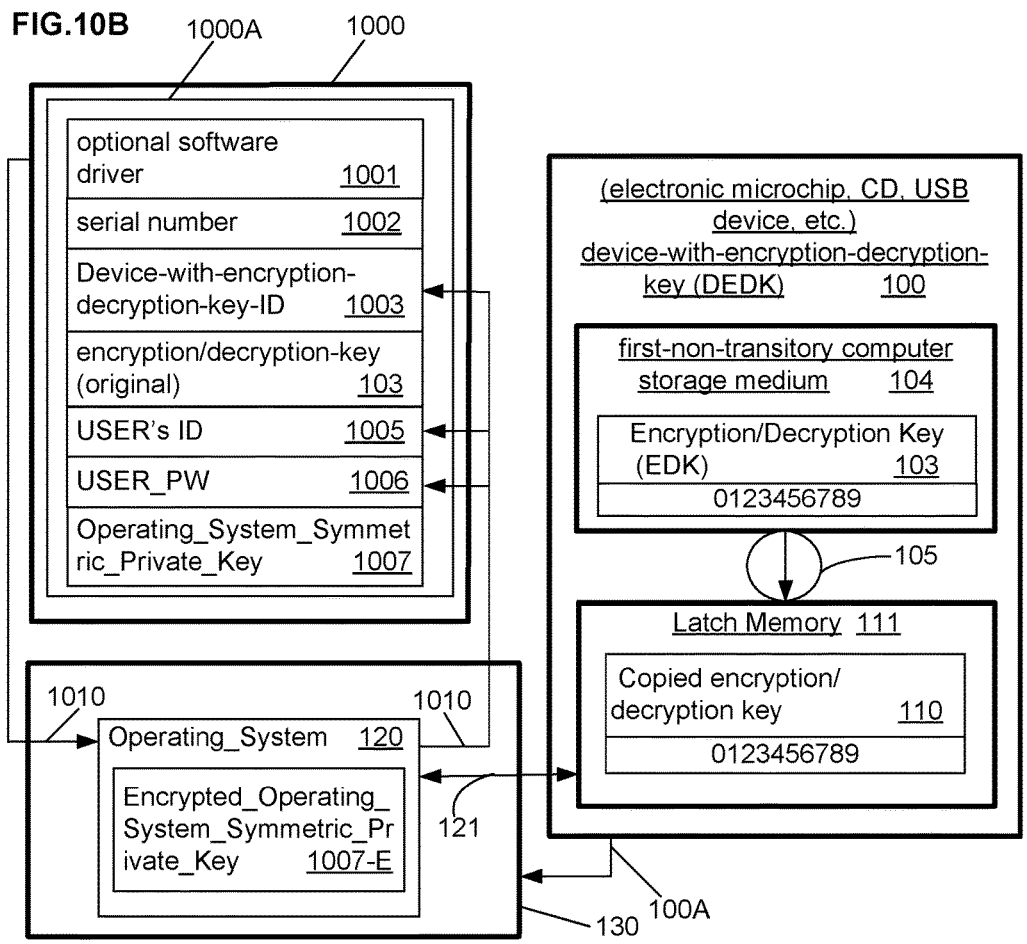
FIG. 10B illustrates the installation process of a new device-with-encryption-decryption-key and the creation of the computer private key.

FIG. 10B illustrates the installation process using a device-with-encryption-decryption-key (100) for the first time in the first computer (130). The server computer (1000) has a database table (1000A) for every device-with-encryption-decryption-key (100) that is manufactured. The table containing the serial-number (1002) of the sold device-with-encryption-decryption-key (100) which is associated with the device-with-encryption-decryption-key-ID (1003) and with the encryption/decryption key (103), plus at least the optional software driver (1001). The optional software driver (1001) is not required since the encryption/decryption of software is done at the first computer (130) and may be done exclusively by the operating system (120). Also, if the optional software driver (1001) is used, it is preferably available on a compact disk, or it may be downloaded from server computer (1000) or provided on another peripheral device.

The user begins by plugging in (see the first single-headed arrow line (200)) the device-with-encryption-decryption-key (100) into the first computer (130) (if the computer doesn't have one part of its circuitry). This initiates a registration process. The user signs up on the server computer (1000) and provides through the operating system (120) or an installation driver, the user's ID (1005), the user's password (1006) and the device-with-encryption-decryption-key-ID (1003). The operating system (120) then sends the entered information through a first secure link (1010) to the server computer (1000).

The server computer (1000) then uses the device-with-encryption-decryption-key-ID (1003) that is received as a key to enable it to fetch the database table (1000A). The entered information (e.g., the user's ID (1005) and user's password (1006)) is saved in the database table (1000A) of the server computer (1000). Next, the server computer (1000) creates the secondary symmetric private key (1070) which, in this case, is assigned to the operating system (120) as the decrypted operating system symmetric private key (1007). The server computer (1000) encrypts the decrypted operating system symmetric private key (1007) deriving the encrypted operating system symmetric private key (1007-E). The server computer (1000) fetches the optional software driver (1001), then returns via the first secure link (1010) to the operating system (120) of the first computer (130) the optional software driver (1001) and the encrypted operating system symmetric private key.

Once the operating system (120) receives the transmission from the server computer (1000), then the operating system (120) retrieves (see the first double-headed arrow line (121)) from the latch memory (111), the encryption/decryption key (110) which becomes the copied encryption/decryption key (120-A) stored in the random access memory (925) of the first computer (130) and under the control of the operating system (120)—FIG. 2B, FIGS. 3-4, FIG. 8A, FIG. 8B, and FIG. 8C. The operating system (120) then clears the encryption/decryption key from the latch memory (111) thereafter. The operating system (120) then saves the software driver and the encrypted operating system symmetric private key as encrypted operating system symmetric private key (1007-E) in the first computer (130) and in the second-non-transitory computer storage medium (350). As needed, the operating system using the encryption/decryption key (120-A) decrypts the encrypted operating system symmetric private key (1007-E) deriving a decrypted operating system symmetric private key (1007), then the operating system (120) uses the decrypted operating system symmetric private key (1007) for encryption and decryption.

Multiple Virtual Machines Implementation of Some Preferred Embodiments

In an alternative embodiment, is a method to achieve the implementation of some preferred embodiments in a virtual machine environment (to wit, a single computer hosting multiple operating system of one or more vendors (e.g. MICROSOFT WINDOWS, LINUX, APPLE OS, UNIX, etc.) using a program to virtualize the machine/computer and each operating system having full control of the computer's hardware) where each operating system having its own private encryption/decryption key, and each operating system being registered with the server computer (1000).

In the multiple operating systems environment, there is the master operating system and it hosts one or more operating system as virtual operating system/s. A program called 'virtual machine' is hosted by the master operating system, and the virtual machine program in turn hosts the virtual operating system. Each virtual machine is under the control of the master operating system and each virtual machine in turn controls the virtual operating system it hosts.

As it is common for operating systems to be ported from the residing computer to another one, it is important that the encryption/decryption key be independent of the computer at which it is currently residing. With the arrangement of FIG. 11A, FIG. 12A and FIG. 13B, if one or more, or all the operating systems are ported to a different computer, then all that will need is for the ported operating system to communicate with the server computer (1000) informing of the new computer which the operating system is being ported to, and the server computer (1000) encrypts the operating system symmetric private key with the encryption/decryption key of the new computer to where the operating system has been ported to and then the server computer (1000) sends to the communicating operating system the operating system encrypted symmetric private key. Therefore, this preferred embodiment enables the encrypting/decrypting of data and software program being independent of the computer which the operating system is residing.

Figure 11A:
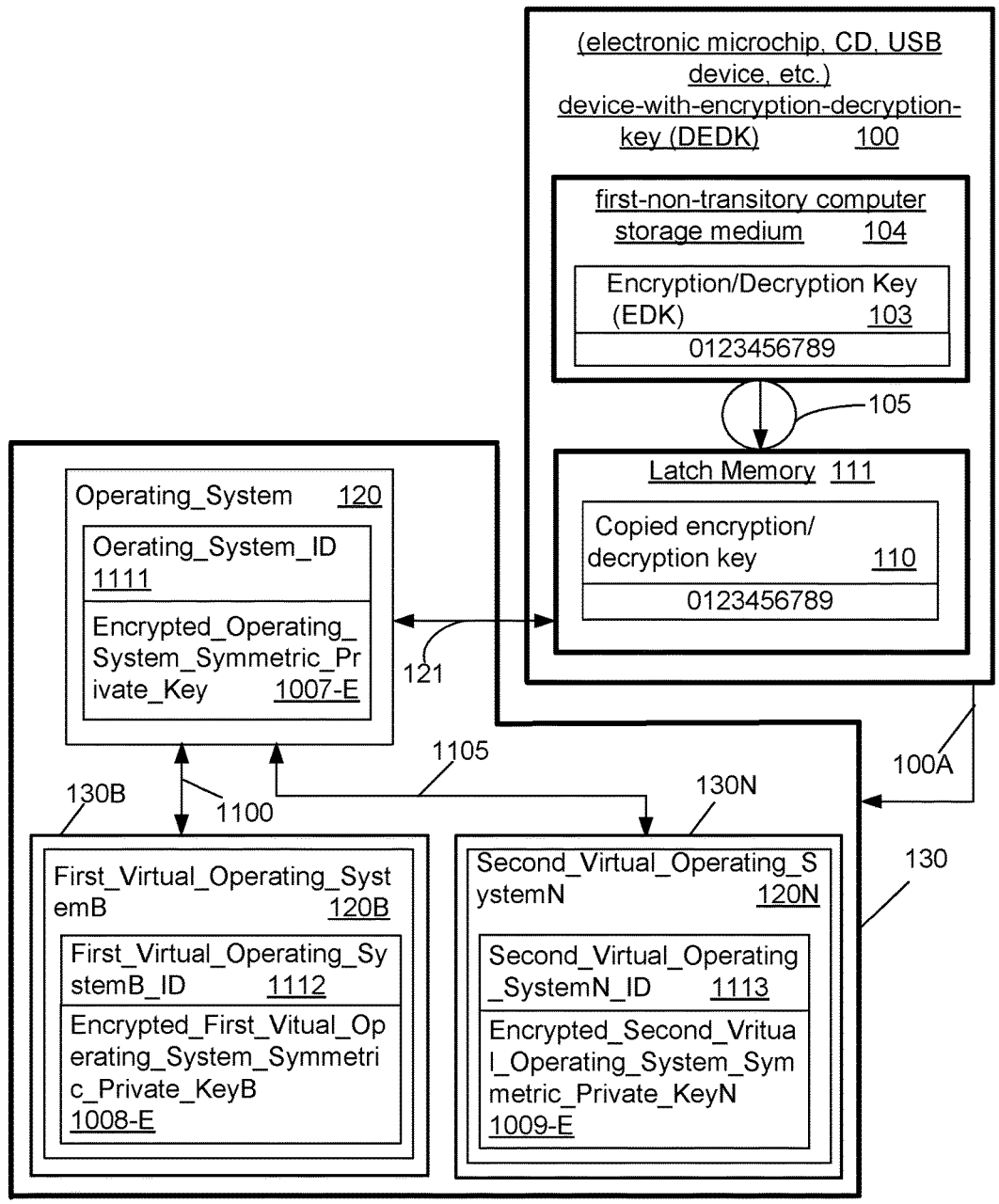
FIG. 11A illustrates multiple virtual machines using private keys in a single computer.

FIG. 11A illustrates the first computer (130) hosting three operating systems: the operating system (120) which is the master operating system; the first virtual operating systemB (120B) under the control of the first virtual machine (130B); and second virtual operating systemN (120N) under the control of second virtual machine (130N). The first virtual machine (130B), and second virtual machine (130N) are under the control of the master operating system, e.g. operating system (120).

Figure 11B:
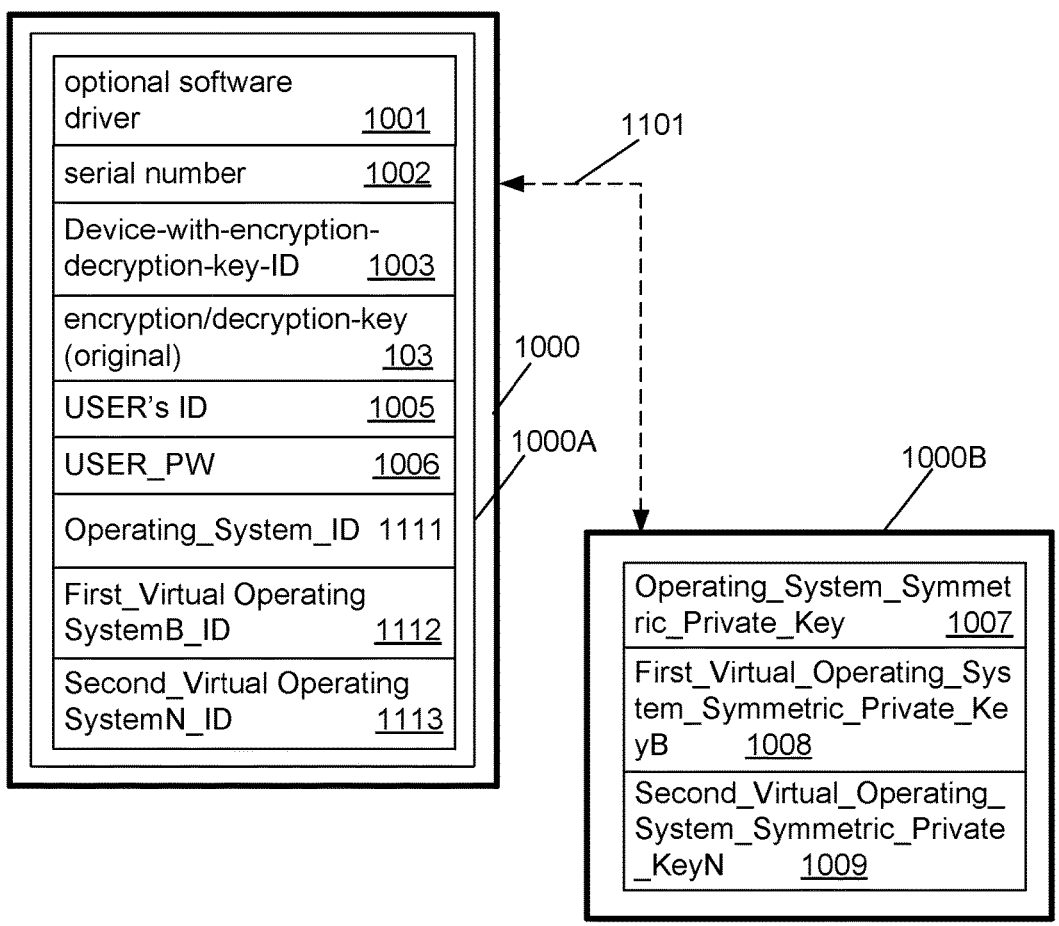
FIG. 11B is a further embodiment of FIG. 11A illustrating the database table at the server computer.

FIG. 11B illustrates the database table (1000A) for the arrangement in the first computer (130) shown in FIG. 11A. The database table (1000A) has the user's ID (1005), the user's password (1006), and the serial-number (1002) associated with the computer where the virtual machines currently resides (the first computer (130)). Three additional fields are found in the database table (1000A), and they are the identification for each operating system: the operating system_ID (1111), which identifies the operating system (120) of FIG. 11A; the first virtual operating systemB_ID (1112), which identifies the first virtual operating system B (120B) of FIG. 11A; the second virtual operating system N_ID (1113), which identifies the second virtual operating systemN (120N) of FIG. 11A.

FIG. 11B further illustrates the database table (1000B) that is additional and it is associated (see the second dashed double-headed arrow line (1101)) with the database table (1000A) through each operating system identification (to wit, the operating system_ID (1111), first virtual operating system_ID (1112), and the second virtual operating system-N_ID (1113)). The decrypted operating system symmetric private key (1007) is associated with the operating system_ID (1111). A decrypted first virtual operating system symmetric private keyB (1008) is associated with the first virtual operating systemB_ID (1112). The second virtual operating system private keyN (1009) is associated with the second virtual operating systemN_ID (1113).

FIG. 11A is related to FIG. 11B and both are connected through a secure connection, namely the first secure link (1010) as illustrated at FIG. 10A. For the sake of clarity, the first secure link (1010) is not present at FIG. 11A or FIG. 11B.

Another explanatory example utilizes the operating system (120), but the same explanation applies to the first virtual operating system B (120B) and to the second virtual operating system N (120N). At the registration time of the operating system (120) at the first computer (130) of FIG. 11A, the operating system (120) sends through the first secure link (1010), shown in FIG. 10A, to the server computer (1000) the user's ID (1005), the user's password (1006) and the device-with-encryption-decryption-key-ID (1003). After the server computer (1000) receives the operating system (120) sent information, the server computer (1000) saves as required in the database table (1000A), already explained while explain FIG. 10A.

Then the server computer (1000) creates the operating system_ID (1111) and the decrypted operating system symmetric private key (1007) and then creates a relationship (see the second dashed double-headed arrow line (1101) between the two tables (the database table (1000A) and the database table (1000B)). Next, the server computer (1000) using the encryption/decryption key (103) encrypts the decrypted operating system symmetric private key (1007) deriving an encrypted operating system symmetric private key. Finally, the server computer (1000) through the first secure link (1010) returns to the operating system (120) the operating system_ID (1111) and the encrypted operating system symmetric key. Once the operating system (120) receives both, the operating system (120) saves on the second-non-transitory computer storage medium (350) of the first computer (130) the operating system_ID (1111) and the encrypted operating system symmetric key as the encrypted operating system symmetric private keyE7 (1007-EA).

Figure 12A:
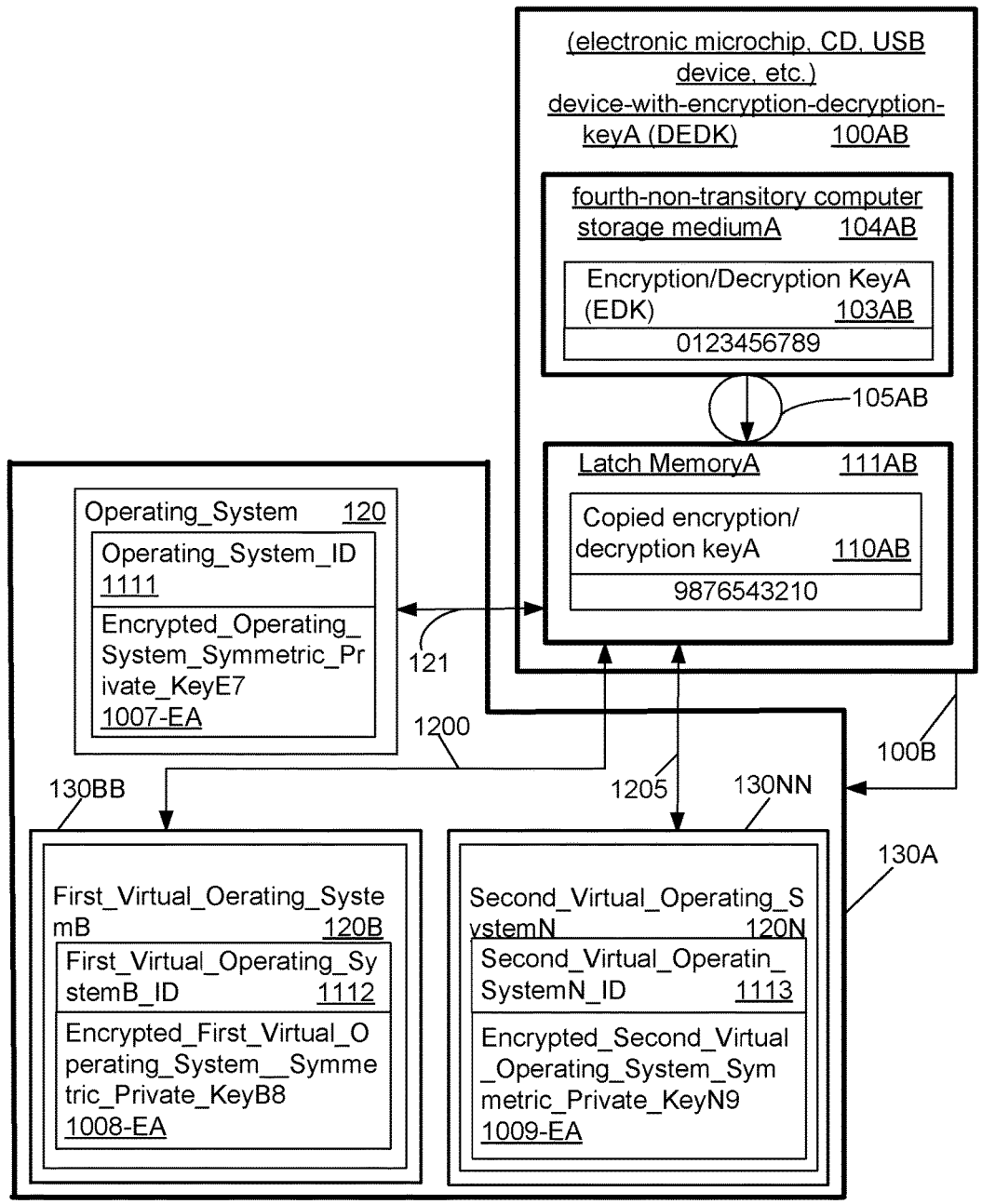
FIG. 12A illustrates multiple virtual machines using private keys in a single dongle/computer board (also referred to as the DEDK).
Figure 13A:
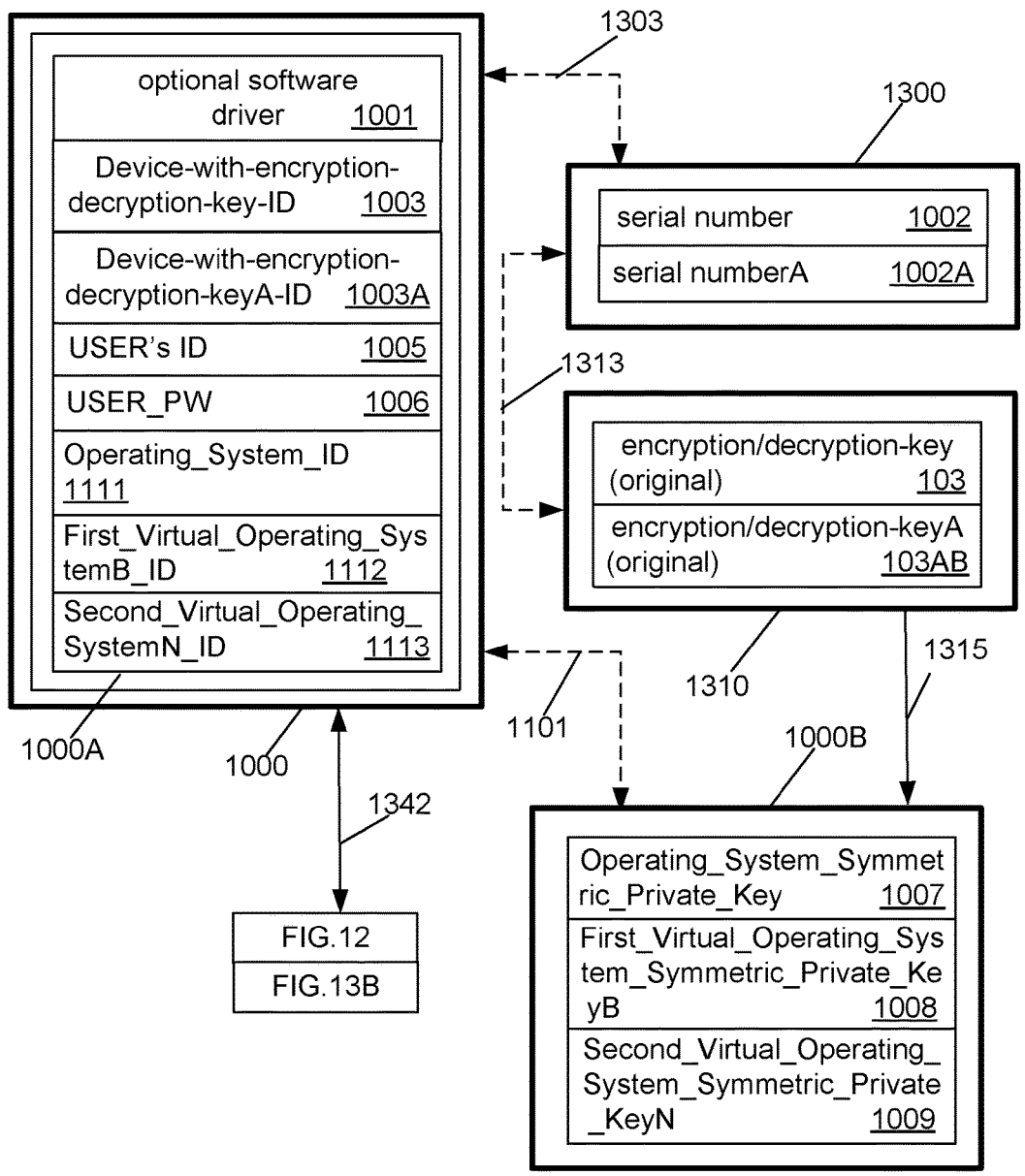
FIG. 13A illustrates a database table at the server computer for the multiple virtual machines private keys ported to a new computer.
Figure 13B:
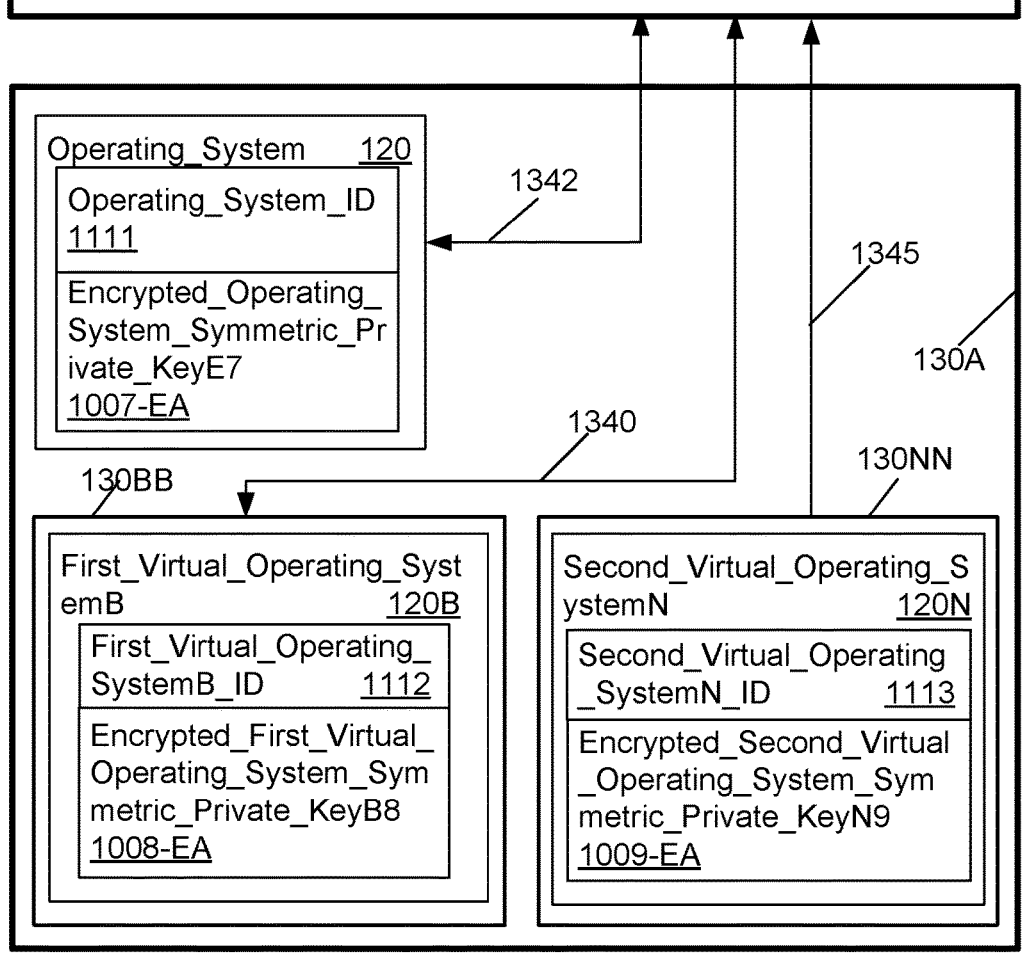
FIG. 13B illustrates the server computer using the database table of FIG. 13A and providing security without requiring the use of the DEDK.

FIG. 13B is an equivalent to FIG. 12A. The arrangement of FIG. 12A illustrates each operating system accessing the copy of the encryption/decryption keyA (110AB) from the latch memoryA (111AB) of the second computer (130A) directly. The arrangement of FIG. 13B illustrates each operating system access the server computer (1000) to obtain the encrypted operating system symmetric private key, and therefore, the second computer (130A) not having device-with-encryption-decryption-keyA (100AB).

FIG. 13A is a further embodiment of database table (1000A) of FIG. 11B. Also, FIG. 13A is related to FIG. 12A and FIG. 13B. FIG. 13A illustrates the new database table arrangements at the server computer (1000) accommodating the prior first computer (130) and the second computer (130A) newly restored and hosting the ported operating systems. Database table (1000A) has been split into database table (1300) and database table (1310).

Database table (1000A) has a relationship (see the third dashed double-headed arrow line (1303)) with database table (1300) through the device-with-encryption-decryption-keyA-ID and the serial number: the serial-number (1002) has a relationship with the device-with-encryption-decryption-keyA-ID (1003); and the serial numberA (1002A) has a relationship with the device-with-encryption-decryption-keyA-ID (1003A).

Database table (1300) has a relationship (see the fourth dashed double-headed arrow line (1313)) with database table (1310) through the serial number and the encryption/decryption key: the encryption/decryption key (103) is related to the serial-number (1002); and the encryption/decryption keyA (103AB) is related with the serial numberA (1002A).

Database table (1000A) also has a relationship (see the second dashed double-headed arrow line (1101)) with the database table (1000B) that is additional through the operating system private key and the operating system identification: the decrypted operating system symmetric private key (1007) is related with the operating system_ID (1111); the decrypted first virtual operating system symmetric private keyB (1008) is related with the first virtual operating system B_ID (1112); and the second virtual operating system private keyN (1009) is related with the second virtual operating systemN_ID (1113).

Continuing with the operating system (120) as an example. After the operating system (120) is ported from the first computer (130) to the second computer (130A), the registration to the second computer (130A) begins. The operating system (120) contacts the server computer (1000) through the fifth secure connection (1342), supplying to the server computer (1000): the user's ID (1005); the user's password (1006); the device-with-encryption-decryption-keyA-ID (1003A) for the second computer (130A); and the operating system_ID (1111).

Once the server computer (1000) receives them, the server computer (1000) does the following: (a) using the relationship (see the third dashed double-headed arrow line (1303)) between database tables (1000A) and database table (1300); using the relationship (see the fourth dashed double-headed arrow line (1313)) between database tables (1300) and database table (1310); also using relationship (see the second dashed double-headed arrow line (1101)) between database tables (1000A) and database table (1000B); (b) using the received device-with-encryption-decryption-keyA-ID (1003A) fetches the serial numberA (1002A) for the second computer (130A) which in turns fetches the encryption/decryption keyA (103AB) for the second computer (130A); (c) the server computer (1000) using the received operating system_ID (1111) fetches the decrypted operating system symmetric private key (1007) for the operating system (120); (d) the server computer (1000) using the fetched encryption/decryption keyA (103AB) encrypts the decrypted operating system symmetric private key (1007) that was fetched to then derive the encrypted operating system private key, (e) the server computer (1000) then returns through the fifth secure connection (1342) to the operating system (120) at the second computer (130A) the encrypted operating system private key; (f) the operating system (120) then saves the received encrypted operating system private key as the encrypted operating system symmetric private keyE7 (1007-EA). The above explanation for the operating system (120) applies to the first virtual operating systemB (120B) and to the second virtual operating systemN (120N) as well.

The arrangement of FIG. 13A can be used by the second computer (130A) in the arrangements of FIG. 13A and FIG. 13B. If used the arrangement of FIG. 12A, as required for encryption and decryption, the operating system (120) retrieves the copy of the encryption/decryption keyA (110AB) from the device-with-the-encryption-decryption-keyA (100AB) to decrypt the encrypted operating system symmetric private keyE7 (1007-EA) deriving the decrypted operating system symmetric private key (1007), then using the decrypted operating system symmetric private key (1007) to encrypt the software program (330) deriving the digital-DNA (300) and saving the digital-DNA (300) in the fifth non-transitory computer storage medium (1230) of the second computer (130A) as the only software version, and decrypting digital-DNA (300) deriving the software program (330) and storing the software executable code, namely the non-encoded software (310) in the random access memory (925) of the second computer (130A) to be executed by the central processing unit (905) of the second computer (130A). If the arrangement of FIG. 13A is used with the second computer (130A) of FIG. 13B, then the use of the device-with-the-encryption-decryption-keyA (100AB) is not required, and it will be explained shortly.

It is important to notice that the hardware of FIG. 9 applies to all computing devices including the first computer (130), the second computer (130A), the server computer (1000), etc. Also, the encryption and decryption for the teachings of FIG. 3 and FIG. 4 applies to the teachings of FIG. 12A and FIG. 13B as well.

Figure 10C:
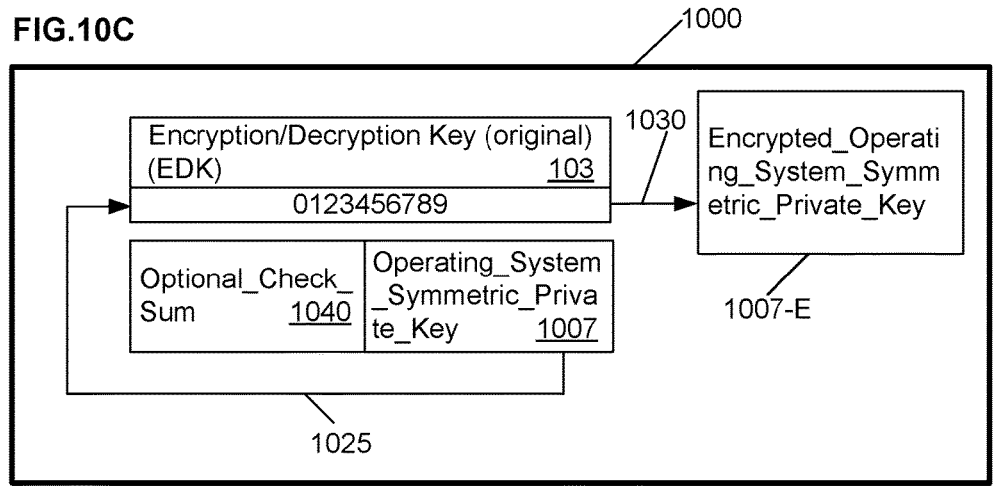
FIG. 10C illustrates the encryption of the computer's operating system encrypted symmetric private key.

FIG. 10C illustrates the process at the server computer (1000) of creating and encrypting the operating system symmetric private key. The server computer (1000) creates the operating system symmetric private key, which is the same as the decrypted operating system symmetric private key (1007), then produces an optional check sum (1040), which is optional, of the operating system symmetric private key, which is the same as the decrypted operating system symmetric private key (1007). The optional check sum (1040) will enable the operating system (120) at the first computer (130) to identify if the decrypted operating system symmetric private key (1007) was tempered while encrypted. The server computer (1000) using the encryption/decryption key (103) encrypts (see the twentieth-sixth single-headed arrow line (1025)) the operating system symmetric private key and the optional check sum (1040) deriving (see the twentieth-seventh single-headed arrow line (1030)) the encrypted operating system symmetric private key (1007-E). The server computer (1000) then transmits encrypted operating system symmetric private key (1007-E) through the first secure link (1010) to the operating system (120) of the first computer (130).

Figure 10D:
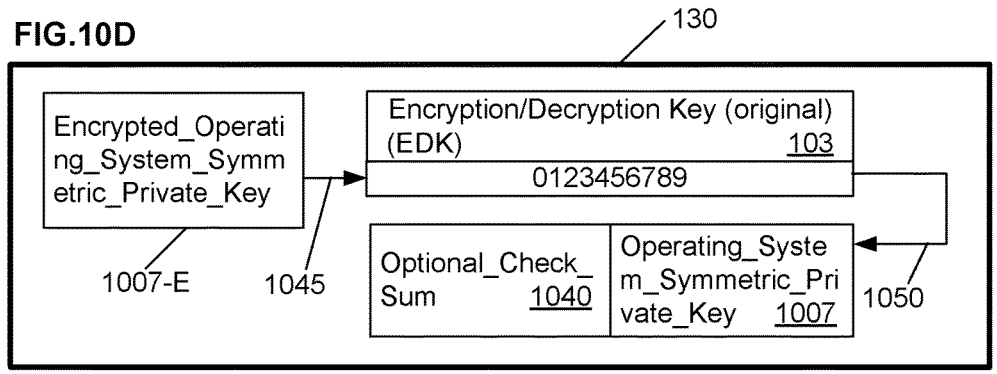
FIG. 10D illustrates the decryption of the computer's operating system symmetric private key which was encrypted in FIG. 10C.

FIG. 10D illustrates the process at the first computer (130). After the operating system (120) of the first computer (130) receives the encrypted operating system symmetric private key (1007-E), the operating system (120) stores the encrypted operating system symmetric private key (1007-E) on the second-non-transitory computer storage medium (350) of the first computer (130) for later use. FIG. 10C illustrates the encryption of the operating system symmetric private key performed at the server computer (1000) and FIG. 10D illustrates the decryption of the encrypted operating system symmetric private key performed at the first computer (130), but, both: the encryption and decryption— can be performed at the server computer (1000) or both be performed at the first computer (130).

Then, when needed, the operating system (120) at the first computer (130) using the using encryption/decryption key (103) (which was fetched from the device-with-encryption-decryption-key (100), or received from a mobile device (1430) (see FIG. 14), or from the server computer (1000) (see FIG. 13C)) decrypts (see the twentieth-eighth single-headed arrow line (1045)) the encrypted operating system symmetric private key (1007-E) deriving (see the twentieth-ninth single-headed arrow line (1050)) the decrypted operating system symmetric private key (1007) and the optional check sum (1040). The operating system (120) produces a check sum with the decrypted operating system symmetric private key (1007) deriving a check-sum value and using the derived check-sum value, verifies if the derived check-sum value matches the decrypted optional check sum (1040). If there is a match, then the decrypted operating system symmetric private key (1007) hasn't been tampered, and the operating system (120) proceeds using the decrypted operating system symmetric private key (1007) to encrypt software code at the installation time, or to decrypt software code as needed by the central processing unit (905) at runtime.

FIG. 11A is related to FIG. 11B. As illustrated in FIG. 11A, each virtual operating system communicates through secure connection (e.g., on a network or on the Internet) with the main, master operating system of the first computer (130). For or exemplary explanation, for the master operating system we'll be using the operating system (120), for the virtual machine we'll be using the first virtual machine (130B) and for the virtual operating system we'll be using the first virtual operating system B (120B). The same explanation applies for the second virtual machine (130N) and for the second virtual operating system N (120N). And the method can be implemented in one of the following two ways:

(1) as the first virtual machine (130B) is initiated, the first virtual operating systemB (120B) or a driver running in the first virtual machine (130B) under the control of the first virtual operating system B (120B) connects through a second secure connection (1100) with the operating system (120) and requests the copy of the encryption/decryption key (120-A) under control of the operating system (120). The operating system (120) then returns the copy of the encryption/decryption key (120-A) to the first virtual operating systemB (120B) running in the first virtual machine (130B). After the first virtual operating systemB (120B) receives the requested copy of the encryption/decryption key (120-A), the first virtual operating system B (120B) decrypts the encrypted first virtual operating system symmetric private keyB (1008-E) to derive or produce the decrypted first virtual operating system symmetric private keyB (1008). Then, the first virtual operating systemB (120B) uses the decrypted first virtual operating system symmetric private keyB (1008) to encrypt the software program (330) before installation deriving the digital-DNA (300) of the program and saving the digital-DNA (300) as the only version of the software program (330) installed on the first computer (130) or stored in the second-non-transitory computer storage medium (350) of the first computer (130). Also, the first virtual operating systemB (120B) uses the decrypted first virtual operating system symmetric private keyB (1008) to decrypt the digital-DNA (300) as needed at runtime of the software program (330).

(2) as the first virtual machine (130B) is initiated, the first virtual operating systemB (120B) or a driver running in the first virtual machine (130B) under the control of the first virtual operating system B (120B) connects through the second secure connection (1100) with the operating system (120) and transmits to the operating system (120) the encrypted first virtual operating system symmetric private keyB (1008-E). After the operating system (120) receives the encrypted first virtual operating system symmetric private keyB (1008-E), the operating system (120) uses the copy of the encryption/decryption key (120-A) to decrypt the encrypted first virtual operating system symmetric private keyB (1008-E) deriving or producing the decrypted first virtual operating system symmetric private keyB (1008). Then, the operating system (120) returns the decrypted first virtual operating system symmetric private keyB (1008) to the first virtual operating system B (120B). Then, the first virtual operating systemB (120B) uses the decrypted first virtual operating system symmetric private keyB (1008) to encrypt the software program (330) upon installation deriving the digital-DNA (300) of the software program (330). Then, the first virtual operating system B (120B) saves the digital-DNA (300), which is the only installed version of the software program (330), in the second-non-transitory computer storage medium (350) of the first computer (130). The first virtual operating system B (120B) would then use the decrypted first virtual operating system symmetric private keyB (1008) to decrypt the digital-DNA (300) as needed at runtime of the software program (330).

The same explanation for the first virtual machine (130B) and the first virtual operating systemB (120B) applies to the second virtual machine (130N) and to the second virtual operating system N (120N). Except, the second virtual operating system N (120N) communicates with the operating system (120) through a third secure connection (1105).

FIG. 12A illustrates another preferred embodiment where the three operating systems have been ported to a new computer, a second computer (130A). A new/second device-with-encryption-decryption-keyA (100AB) with a fourth-non-transitory computer storage mediumA (104AB) holding the encryption/decryption keyA (103AB) that is new with the value of '9876543210' is attached (see the thirtieth single-headed solid arrow line (100B)) to the second computer (130A). The same explanation for the first device-with-encryption-decryption-key (100) applies to the second device-with-encryption-decryption-keyA (100AB) and it will not be explained again in order to avoid repetition.

FIG. 12A further illustrates the first virtual operating systemB (120B) hosted by the first virtual machine (130BB) and the second virtual operating systemN (120N) hosted by the second virtual machine (130NN) and both virtual machines are under the control of the master operating system (e.g. operating system (120)) of the second computer (130A).

Each operating system accesses the latch memoryA (111AB) and obtains the copy of the encryption/decryption keyA (110AB) directly. The operating system (120) accesses the latch memoryA (111AB) and obtains the copy of the encryption/decryption keyA (110AB) through connection (see the first double-headed arrow line (121)) and uses the copy of the encryption/decryption keyA (110AB) to decrypt the encrypted operating system symmetric private keyE7 (1007-EA). The first virtual operating system B (120B) accesses the latch memoryA (111AB) and obtains the copy of the encryption/decryption keyA (110AB) through connection (1200) (see the third double-headed arrow line) and uses the encryption/decryption keyA (110AB) to decrypt the encrypted first virtual operating system symmetric private keyB8 (1008-EA). The second virtual operating systemN (120N) access the latch memoryA (111AB) and obtains the copy of the encryption/decryption keyA (110AB) through connection (1205) (see the fourth double-headed arrow line) and uses the encryption/decryption keyA (110AB) to decrypt the encrypted second virtual operating system symmetric private keyN9 (1009-EA).

In this arrangement it is possible that each operating system accessing the latch memoryA (111AB) has a key-value (not shown) that has been registered prior with the device-with-encryption-decryption-keyA (100AB) and once, at the power-up or reset of the second computer (130A) or the initiation of the operating system, the operating system passes the key-value to the device-with-encryption-decryption-keyA (100AB), and after the device-with-encryption-decryption-keyA (100AB) matches with its stored key-value, the device-with-encryption-decryption-keyA (100AB) then releases the copy of the encryption/decryption keyA (110AB) to the requesting operating system. If implemented this way, then the clearing of the encryption-decryption-keyA (100AB) may not be necessary.

It is important to notice that every time the mentioning of operating system/s private key is to be interpreted to be a symmetric private key that is: the same key (single key) is used for both encryption and decryption. Also, all the operating systems along with their respective operating system identification and their respective encrypted operating system symmetric private key illustrated at FIG. 12A and FIG. 13B are permanently stored in the second computer (130A) fifth non-transitory computer storage medium (1230) as illustrated at FIG. 12B and FIG. 12C.

Figure 12B:
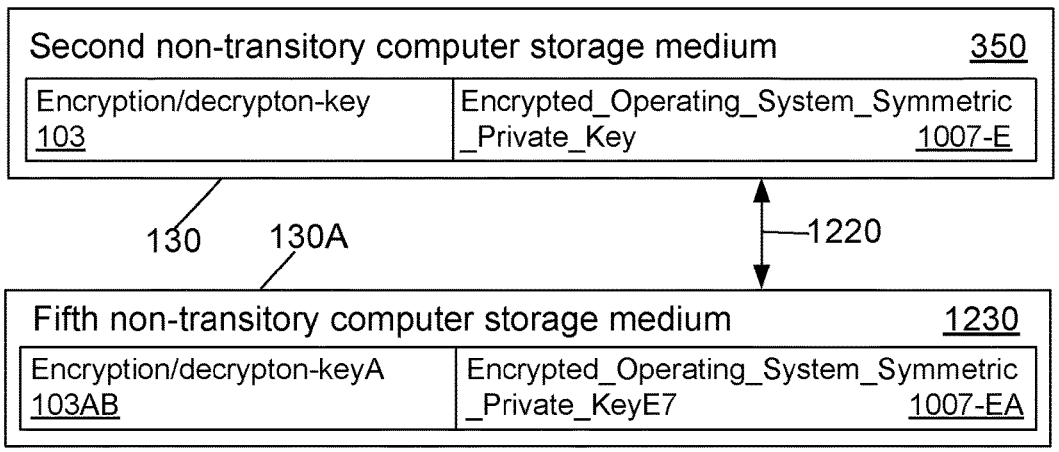
FIG. 12B illustrates a first computer receiving the operating system symmetric private key from a second computer.
Figure 12C:
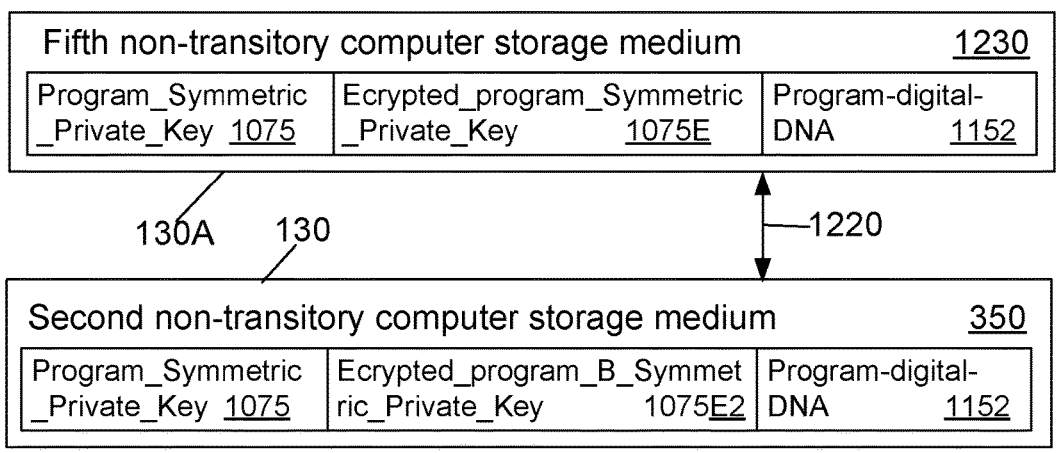
FIG. 12C illustrates the first computer receiving the operating system program symmetric private key from the second computer.

FIG. 12B illustrates an alternative embodiment, where two computers are involved: The first computer (130) creates the operating system symmetric private key instead of the server computer (1000). In this embodiment, when the operating system (120) is installed, the operating system (120) on the first computer (130) creates the operating system symmetric private key, which is the same as the decrypted operating system symmetric private key (1007), and uses the encryption/decryption key (103) to encrypt the operating system symmetric private key, deriving the encrypted operating system symmetric private key (1007-E). Then, once the operating system (120) on the first computer is ported (also referred to as sent or transferred) to the second computer (130A) and stored in the fifth non-transitory computer storage medium (1230) of the second computer (130A), the operating system (120) of the second computer (130A) proceeds in one of two ways:

(1) the operating system (120) of the second computer (130A) communicates via a fourth secure connection (1220) with the first computer (130) and the first computer (130) using the encryption/decryption key (103) decrypts the encrypted operating symmetric system private key (1007-E) deriving the decrypted operating system symmetric private key (1007). Then, the first computer (130) sends via the fourth secure connection (1220) the decrypted operating system symmetric private key (1007) to the second computer (130A). Then the operating system (120) of the second computer (130A) using the encryption/decryption keyA (103AB) of the second computer (130A) encrypts the operating system symmetric private key deriving the encrypted operating system symmetric private keyE7 (1007-EA). Finally, the operating system (120) stores the encrypted operating system symmetric private keyE7 (1007-EA) in the fifth non-transitory computer storage medium (1230) of the second computer (130A).

(2) the operating system (120) of the second computer (130A) communicates via a fourth secure connection (1220) with the first computer (130) and the first computer (130) via the fourth secure connection (1220) sends to the second computer (130A) the encrypted operating system symmetric private key (1007-E). The operating system (120) of the second computer (130A) using the encryption/decryption keyA (103AB) of the second computer (130A) encrypts the encrypted operating system symmetric private key (1007-E) deriving a twice encrypted operating system symmetric private key. Then the operating system (120) communicates through the fourth secure connection (1220) with the first computer (130) and sends the twice encrypted operating system symmetric private key to the first computer (130). Then the first computer (130) using the encryption/decryption key (103) decrypts the twice encrypted operating system symmetric private key, deriving the encrypted operating system symmetric private keyE7 (1007-EA), then the first computer (130) via the fourth secure connection (1220)

returns to the operating system (120) of the second computer (130A) the encrypted operating system symmetric private keyE7 (1007-EA). Finally, the operating system (120) stores the encrypted operating system symmetric private keyE7 (1007-EA) in the fifth non-transitory computer storage medium (1230) of the second computer (130A). The encryption process used at the step (b) can be performed using XOR operation (as was explained, supra, in connection with the explanation of FIG. 5 and FIG. 6) or using any other encryption methodology which will make the steps possible. Also, the fourth secure connection (1220) is mentioned for step (b) but it is possible to be implemented using a non-secure connection because at no moment data being transmitted is in un-encrypted format.

Reviewing what happens at step (b): while the operating system (120) is residing at the first computer (130), the decrypted operating system symmetric private key (1007) is encrypted with the encryption/decryption key (103) of the first computer (130) which is the encrypted operating system symmetric private key (1007-E). Once the operating system (120) is ported to the second computer (130A) and the operating system (120) of the second computer (130A) encrypts the already encrypted operating system symmetric key (1007-E), the second encryption process derives a twice encrypted operating system symmetric private key. The twice encrypted operating system symmetric private key is encrypted with two encryption/decryption keys: the encryption/decryption key (103) of the first computer (130) and the encryption/decryption keyA (103AB) of the second computer (130A). Once the first computer (130) decrypts the twice encrypted operating system symmetric private key with the encryption/decryption key (103), the first computer (130) simply removes its encryption/decryption key (103) from the twice encrypted operating system symmetric private key, leaving the encrypted operating system symmetric private keyE7 (1007-EA).

Once the operating system (120) is ported from the first computer (130) to the second computer (130A) and the decrypted operating system symmetric private key (1007) is received at the second computer (130A), then a new software program can be installed in the second computer (130A). If the operating system (120) has receive an encrypted operating system symmetric private keyE7 (1007-EA), then the operating system (120) proceeds and decrypts the encrypted operating system symmetric private keyE7 (1007-EA) deriving the decrypted operating system symmetric private key (1007). The operating system (120) using the decrypted operating system symmetric private key (1007), encrypts the software program deriving the digital-DNA (300). And, the operating system (120) storing the digital-DNA (300) in the fifth non-transitory computer storage medium (1230) of the second computer (130A) as the only installed version of the software program.

In an alternative embodiment, each program installed in the computer will have a unique symmetric private key. At the installation time of the program, the operating system creates the unique program symmetric private key for the program being installed. The operating system then uses the unique program symmetric private key to encrypt the program deriving the digital-DNA which is unique for the program (i.e., unique program-digital-DNA), then installing the unique program-digital-DNA as the only installed copy of the program in the non-transitory computer storage medium of the computer.

The operating system then using the encryption/decryption key of the computer encrypts the unique program symmetric private key deriving an encrypted unique program symmetric private key. The operating system then associates the encrypted unique program symmetric private key with the program and saves the encrypted unique program symmetric private key in the non-transitory computer storage medium of the computer. The encrypted unique program symmetric private key is preferably saved in the optional-header-identification-code (320) associate with the non-encoded software (310) that is installed. In an optional embodiment, the operating system can encrypted and decrypt the program symmetric private key using its operating system symmetric private.

As the operating system receives a request for the execution of the program's unique program-digital-DNA, the operating system using the encryption/decryption key of the computer decrypts the encrypted unique program symmetric private key deriving a decrypted unique program symmetric private key. The operating system then using the decrypted unique program symmetric private key, decrypts the unique program-digital-DNA deriving the program code for execution. The same explanation used for the explanation of the operating system symmetric private key, applies to the unique program symmetric private key, as well.

This embodiment is important and of great use to accomplish security once the program is used in a cloud environment where one computer (i.e., a second computer) hosts the program but the request for the program's execution arrives at another computer (i.e., a first computer) of the cloud. And by each program having its unique program symmetric private key, once a request for the execution of the program arrives at the first computer, and the first computer request and receives the program and the unique program symmetric private key from the second computer, then the first computer will be able to decrypt the encrypted program's digital-DNA and executes the program's digital-DNA without compromising security.

FIG. 12C illustrates the just described alternate embodiment. At the installation time of the program A (not shown) at the second computer (130A). The second computer (130A) creates the program symmetric private key (1075). The second computer (130A) then using the program symmetric private key (1075) (which is symmetrical and unique to the program A (not shown)) encrypts the program A (not shown) deriving the program-digital-DNA (1152).

The second computer (130A) using the encryption/decryption keyA (103AB) encrypts the program symmetric private key (1075) deriving the encrypted program symmetric private key (1075E). The second computer (130A) then saves on its the fifth non-transitory computer storage medium (1230) the program-digital-DNA (1152) and the encrypted program symmetric private key (1075E).

As a request to execute the program-digital-DNA (1152) arrives at the operating system (120) of first computer (130), the first computer (130) through the fourth secure connection (1220) request the program-digital-DNA (1152) from the second computer (130A). The second computer (130A) then returns through the fourth secure connection (1220) the program symmetric private key (1075) and the program-digital-DNA (1152) to the first computer (130). Once the operating system (120) of the first computer (130) receives the program symmetric private key (1075) and the program-digital-DNA (1152), the operating system (120) of the first computer (130) using its encryption/decryption key (103) encrypts program symmetric private key (1075) deriving the encrypted_program_B_symmetric_private_key (1075E2). The operating system (120) then saves the encrypted_program_B_symmetric_private_key (1075E2) and the program-digital-DNA (1152) in the first computer (130) secondnon-transitory computer storage medium (350). The operating system (120) of the first computer (130) proceeds and uses the program_symmetric_private_key (1075) to decrypt the program-digital-DNA (1152) as needed at the runtime of the program-digital-DNA (1152).

In a further embodiment, once the operating system (120) of the first computer (130) requests from the second computer (130A) the program-digital-DNA (1152), the second computer (130A) via the fourth secure connection (1220) returns to the operating system (120) of the first computer (130) the program-digital-DNA (1152) and the encrypted_program_symmetric_private_key (1075E). Once the operating system (120) of the first computer (130) receives from the second computer (130A) the program-digital-DNA (1152) and the encrypted_program_symmetric_private_key (1075E), then the operating system (120) of the first computer (130) encrypts the encrypted_program_symmetric_private_key (1075E) with the encryption/decryption key (103) of the first computer (130) deriving a twice encrypted program symmetric private key. And the operating system (120) of the first computer (130) sends via the fourth secure connection (1220) the twice encrypted program symmetric private key to the second computer (130A). Once the second computer (130A) receives the twice encrypted encrypted program symmetric private key from the first computer (130), the second computer (130A) using its encryption/decryption keyA (103AB) decrypts the twice encrypted program symmetric private key deriving the encrypted program symmetric private key (1075E2). The second computer (130A) then sends via the fourth secure connection (1220) the encrypted program symmetric private key (1075E2) to the first computer (130). Once the operating system (120) of the first computer (130) receives the encrypted program symmetric private key (1075E2), the operating system (120) saves the encrypted program symmetric private key (1075E2) and the program-digital-DNA (1152) it in the second-non-transitory computer storage medium (350) of the first computer (130).

It has been mentioned the second computer (130A) without mentioning an operating system, but it is well known that without an operating system, the second computer (130A) won't function. Furthermore, it has been mentioned that the teachings of FIG. 9 covers the second computer (130A) and any computing device, and the teachings of FIG. 9 illustrates the operating system (120). If this alternate embodiment is implemented where the second computer (130A) transmits the encrypted program symmetric private key (1075E) along with the program-digital-DNA (1152), then the fourth secure connection (1220) doesn't necessarily need to be a secure one because all transmissions between the first computer (130) and the second computer (130A) will be of encrypted data without any possibility that, if the transmission is intercepted, be decrypted.

Any time it is mentioned 'the operating system symmetric private key' it is to be broadly interpreted to include the 'the program symmetric private key' as well. Also, any time that 'the program symmetric private key' is used, it is to be broadly interpreted to include 'the operating system symmetric private key' as well. As already explained, both are derived from the secondary symmetric encryption decryption key, thus, they both are functionally alike. Since the mechanism used for both involves the same encryption/decryption steps, and the only change is the how the symmetric private key is used. The operating system symmetric private key is used by the operating system for all program under the control of the operating system. While, the program symmetric private key is unique to the program, and each program has a unique key which is only good for the program's encryption/decryption.

By each program having its own symmetric private will enable programs to be moved around computers in a cloud environment without ever exposing the operating system symmetric private key. It is also conceivable that each program has a symmetric private key and the operating system hosting the program also having its own operating system symmetric private key. And if implemented this way, the operating system using its operating system symmetric private encrypts each program symmetric private key under the operating system's control.

Software Only Implementation of Some Preferred Embodiments

The software arrangement is a good fit for protecting server computers, laptop computers or any kind of transportable mobile device without requiring the purchasing of a physical device with an encryption/decryption key. In this arrangement, the device-with-encryption-decryption-key is replaced by software implemented in the mobile device or the non-mobile computer (e.g., a server computer). Thus saving time in acquiring and installing the device with encryption/decryption key and at the same time saving money in manufacturing, transportation and distribution. For simplicity of the discussion, applicant refers to the mobile device (1430) for the embodiment of FIG. 14 and server computer (1000) for the embodiment of FIG. 13B and intends that the discussion should be interpreted to apply also to mobile and non-mobile device, as may be appropriate.

The preferred embodiment of FIG. 13B further illustrates the use of some embodiments in an environment where the device-with-encryption-decryption-keyA (100AB), also called the DEDK, is not necessary at the second computer (130A) or the first computer (130)—software implementation only, instead of hardware and software. The server computer (1000) has the same purpose as the device-with-the-encryption-decryption-key (100) for the first computer (130) and the device-with-the-encryption-decryption-keyA (100AB) for the second computer (130A).

In this preferred embodiment, at the power up or reset of the second computer (130A), the operating system (120), or at the initiation of each of the virtual operating system by their respective virtual machine (i.e., the first virtual operating systemB (120B) initiated by the first virtual machine (130BB) and the second virtual operating systemN (120N) initiated by the second virtual machineN (120NN)), the initiated operating system initiates a communication with the server computer (1000) through its respective secure connection: (e.g., the operating system (120) through the fifth secure connection (1342); the first virtual operating systemB (120B) through the sixth secure connection (1340); and the second virtual operating systemN (120N) through the seventh secure connection (1345)).

The server computer (1000) then returns to the requesting operating system through the same secure connection the encryption/decryption keyA (103AB) to the requesting operating system. And once the requesting operating system receives the encryption/decryption keyA (103AB), the receiving operating system decrypts its encrypted operating system symmetric private key deriving its respective decrypted operating system private key: namely, the operating system (120) decrypts its encrypted operating system symmetric private key (1007-EA) deriving its decrypted operating system symmetric private key (1007); the first virtual operating systemB (120B) decrypts its encrypted first virtual operating system symmetric private keyB (1008-EA)

deriving its decrypted first virtual operating system symmetric private keyB (1008); and, the second virtual operating systemN (120N) decrypts its encrypted second virtual operating system symmetric private keyN (1009-EA) deriving its second virtual operating system private keyN (1009). Then each operating system uses its decrypted operating system symmetric private key to encrypt the software program (330) upon installation and decrypts this software code at runtime.

In this embodiment of the software only implementation of a preferred embodiment, the server computer (1000) becomes the device-with-encryption-decryption-keyA (100AB); and the serial numberA (1002A) represents the second computer (130A).

Figure 14:
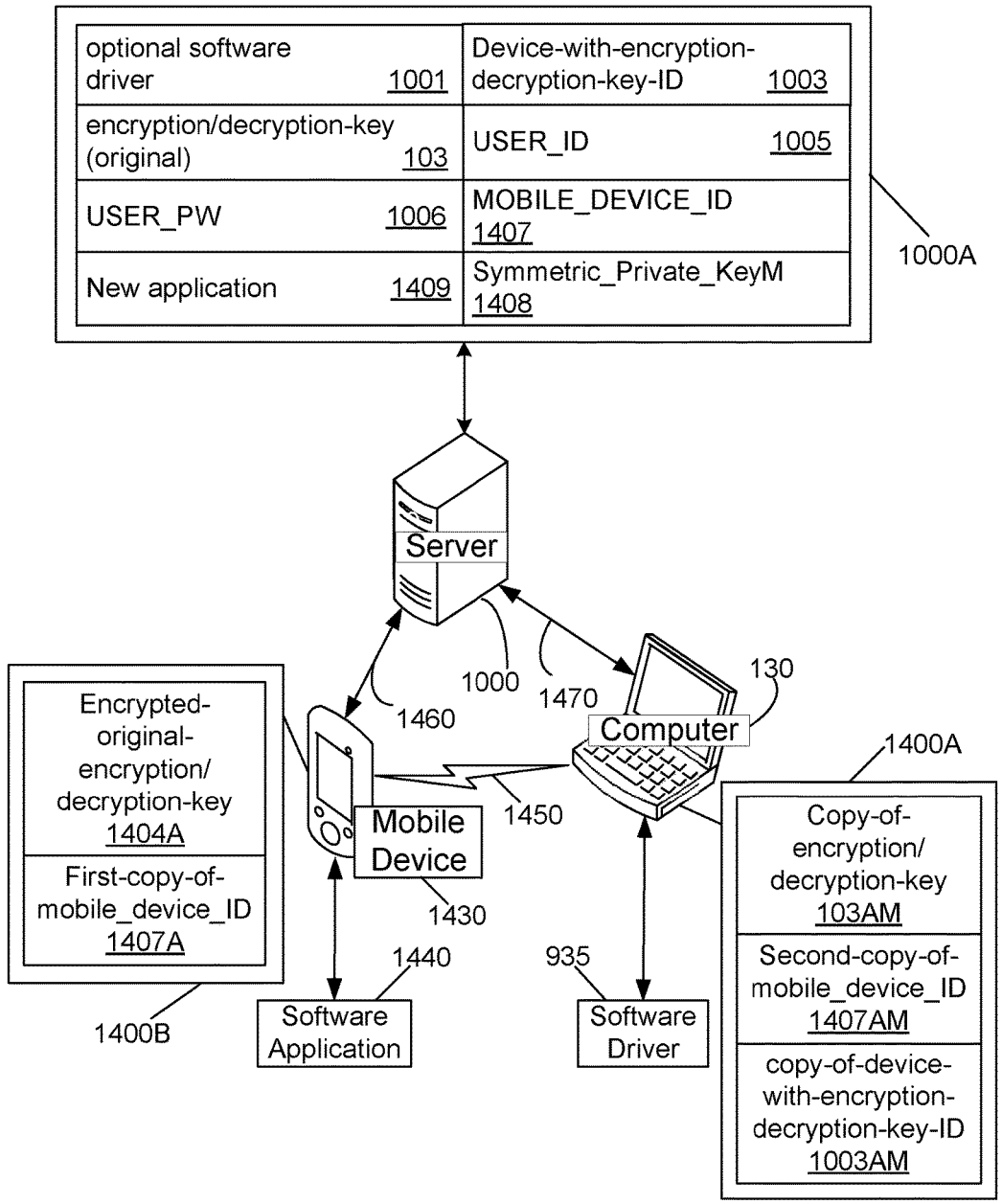
FIG. 14 illustrates an embodiment implementing the improved and virus-free computer operability using software alone.

FIG. 14 likewise FIG. 13B illustrates an alternative embodiment, the method to achieve the same virus protection is implemented with the use of software only, instead of a combination of software and hardware. In this arrangement, either a mobile computer or a non-mobile computer holds a software application and the computer to be protected (to wit, the client computer) also holds a software application. The software application in the first computer (130) preferably performs encryption of executable codes therein, and therefore functions as the software driver (935).

FIG. 14 is consistent with FIG. 2A, FIG. 9, FIG. 10B, FIG. 11A, FIG. 12A, and FIG. 13B, and it illustrates another embodiment that enables the same virus protection to be implemented with the use of software only, that is, without the use of a physical hardware device (e.g., the device-with-encryption-decryption-key (100)). The mobile device (1430) of the user becomes the device-with-encryption-decryption-key (100). A server computer (1000) through eighth secure connection, communicates (1460) with a mobile device (1430). The server computer (1000) also communicates through ninth secure connection (1470) with the first computer (130) of the user. The mobile device (1430) communicates with the first computer (130) through a wireless connection, such as a Bluetooth connection (1450).

A user accesses the server computer (1000) and obtains through eighth secure connection (1460) a new application (1409) from the database table (1000A) of the server computer (1000), which becomes a software application (1440) in the mobile device (1430). The user also downloads an optional software driver (1001) from the database table (1000A) on the server computer (1000) into the first computer (130) and it becomes software driver (935) at the first computer (130). The database table (1000A) is the same to the database table (1000A) in the server computer (1000) of the manufacturer while discussing FIG. 10A, with some new items/fields added to it. The serial-number (1002) is missing since there is not a physical device in the software only implementation of this embodiment. Instead of the serial-number (1002), the mobile device's ID, e.g., the mobile device_ID (1407) is present and it is used for the same purpose to identify the device acting as the device-with-encryption-decryption-key (100), in this embodiment, the mobile device (1430).

The user registers the software application (1440) with the server computer (1000), providing to the server computer (1000) a user's ID (1005) and user's password (1006). The server computer (1000) saves the user's ID (1005) and user's password (1006) to its database table (1000A).

Then, the server computer (1000) creates the mobile device_ID (1407), the encryption/decryption key (103), and a symmetric private keyM (1408), which is symmetric and used for encryption and decryption, then saving them in the database table (1000A) of the server computer (1000). The mobile device_ID (1407) is used to identify the device acting as the device-with-encryption-decryption-key (100). The mobile device_ID (1407) has the same purpose as of the serial-number (1002) used to identify the physical device, i.e. the device-with-encryption-decryption-key (100).

The term "symmetric" in "symmetric key," or in variations of it, such as in "symmetrical private key schema," is well-known term in the art and is used to signify that a single encryption key is used to encrypt and decrypt.

In contrast, in an asymmetric encryption schema, also called public key encryption, two keys are needed: a private key and a public key. The private key is used by the message sender to encrypt a message; the public key is available to anyone who wishes to decrypt the message encrypted with the private key.

In preferred embodiments of the devices and methods disclosed herein, the device symmetrical private key schema is used. This means that preferably the same key is used for encryption of an original software program producing an encrypted software program, and for decryption of the encrypted software program to reproduce the original software program.

In FIG. 14, the server computer (1000) using the symmetric private keyM (1408) encrypts the encryption/decryption key (103), producing an encrypted-original-encryption/decryption-key.

Then the server computer (1000) transmits, via the eighth secure connection (1460) the mobile device_ID (1407) and the encryption/decryption key (103) that is encrypted, to the mobile device (1430). After receiving, the mobile device (1430) saves the received encryption/decryption-key as an encrypted-original-encryption/decryption-key (1404A) and the received mobile_ID (1407) as first-copy-of-mobile-device_ID (1407A) in a file (1400B) in the mobile device (1430) non-transitory medium (not shown).

The user uses the first computer (130) through the software driver (935) (the software driver can be a separate software application downloaded from server computer (1000) as well, like new application (1409) or something similar. But for sake of simplicity, the software driver will be used) provides the user's ID (1005), the user's password (1006), and the first-copy-of-mobile-device_ID (1407A), and the first computer (130) logs into the server computer (1000) via the ninth secure connection (1470). The server computer (1000) after receiving information sent from the first computer (130), creates a device-with-encryption-decryption-key-ID (1003) and after associating it with the mobile device_ID (1407), saves the device-with-encryption-decryption-key-ID (1003) in the database table (1000A).

Then the server computer (1000) transmits to the first computer (130) via the ninth secure connection (1470) the device-with-encryption-decryption-key-ID (1003) and the encryption/decryption key (103). The encryption/decryption key (103) is used at a later step for decryption of the encrypted-original-encryption/decryption-key (1404A).

And once the first computer (130) receives them from the server computer (1000), the first computer (130) saves in the file or database table (1400A) in the second-non-transitory computer storage medium (350) of the first computer (130): the received first-copy-of-mobile-device_ID (1407A) as second-copy-of-mobile-device_ID (1407AM); the received encryption/decryption key (103) as copy-of-encryption/decryption-key (103AM); and the received device-with-encryption-decryption-key-ID (1003) as copy-of-device-with-encryption-decryption-key-ID (1003AM).

After both, the first computer (130) and the mobile device (1430) communicate with the server computer (1000) and registers with it, then the mobile device (1430) and the first computer (130) are ready to communicate through the communication link, e.g. the Bluetooth connection (1450) with each other. The user at the mobile device (1430) initiates the software application (1440) and the software driver (935) on the first computer (130). Then the first computer (130) and the mobile device (1430) communicate through the software application (1440) and the software driver (935) using the communication link, e.g. the Bluetooth connection (1450). The communication link, e.g. the Bluetooth connection (1450), can be any kind of link: wired or wireless.

Then the user types the first-copy-of-mobile-device_ID (1407A) into the mobile device (1430) or the software application (1440) may present it for the user selection, instead. And the mobile device (1430) transmits the first-copy-of-mobile-device_ID (1407A) and the encrypted-original-encryption/decryption-key (1404A) to the first computer (130) through the Bluetooth connection (1450).

Once the first computer (130) receives from the mobile device (1430) the first-copy-of-mobile-device_ID (1407A) and the encrypted-original-encryption/decryption-key (1404A), the first computer (130) compares the first-copy-of-mobile-device_ID (1407A) that was received with the second-copy-of-mobile-device_ID (1407AM) that is stored in the second-non-transitory computer storage medium (350) of the first computer (130), and if there is a match, the first computer (130) does the following:

1) sends an acknowledgement back to the client device, i.e. the mobile device (1430), and once the mobile device (1430) receives the acknowledgement, it ends the communication with the first computer (130).

2) decrypts the received encrypted-original-encryption/decryption-key (1404A) with the copy-of-encryption/decryption-key (103AM) deriving a decrypted symmetric private keyM (1408).

3) uses the decrypted symmetric private keyM (1408) to encrypt any new software upon installing it to produce the digital-DNA (300) and then saves the digital-DNA (300) in the second-non-transitory computer storage medium (350) of the first computer (130) as the only installed software copy, decrypting the digital-DNA (300) of the first computer (130) prior to its execution.

If anything happens to the mobile device (1430) such that the encrypted-original-encryption/decryption-key (1404A) is not available, or if the encrypted-original-encryption/decryption-key (1404A) is needed in another mobile device, then preferably the following sequence of events may be implemented:

1) The user logs in with the first computer (130) providing the user's ID (1005) and user's password (1006).

2) The first computer (130) provides to the user the second-copy-of-mobile-device_ID (1407AM).

3) The user installs a new application in the new mobile device, connects the new mobile device to the server computer (1000) through the new application, and provides via eighth secure connection (1460) to the server computer (1000) the user's ID (1005), the user's password (1006) and the mobile device_ID (1407) which is the received copy of the second-copy-of-mobile-device_ID (1407AM) from the first computer (130).

4) The server computer (1000) encrypts the encryption/decryption key (103) with the symmetric private keyM (1408) deriving an encrypted encryption/decryption key.

5) Then, the server computer (1000) transmits via the eighth secure connection (1460) the encrypted encryption/decryption key to the new mobile device.

6) Then the new mobile device associates the encrypted encryption/decryption key with the mobile device_ID (1407) and saves the encrypted encryption/decryption key as encrypted-original-encryption/decryption-key (1404A) and the mobile device_ID (1407) as the first-copy-of-mobile-device_ID (1407A) in the non-transitory storage of the new mobile device.

7) Thereafter, the new mobile device will be able to communicate, e.g. using a Bluetooth connection (1450) with the first computer (130), as previously.

If an embodiment is implemented on a mobile device (1430) and the first computer (130) doesn't have wireless or Bluetooth connection (1450), then a universal serial bus device can be employed to plug into the first computer (130) and used to communicate between the first computer (130) and the mobile device (1430). Or, the mobile device (1430) and first computer (130) may communicate through the server computer (1000), wired or wireless connection.

A mobile device and a client have been illustrated but it can be implemented between two mobile devices, or in between two clients, or in between two servers. As long two computing devices of any kind are able to communicate, it will do.

If the first computer (130) is hosting one or more virtual machine/s hosting one or more virtual operating system/s, the explanation for FIG. 13B applies to FIG. 14 as well. In such implementation, each virtual operating system requests and receives the copy-of-encryption/decryption-key (103AM) from the mobile device (1430) and uses it to decrypted the encrypted virtual operating system symmetric private key deriving the decrypted virtual operating system symmetric private key which is used to encrypt and decrypt code hosted by the virtual operating system.

Code Injection Hacking

Besides a plethora of viruses in the form of a computer file, hackers have in their arsenal one more destructive hacking method, and it is code injection into a server's running process. Code injection may be done in the user's client computer as well, but the focus of this disclosure is related to the server computer, but a client computer can be affected, nonetheless.

FIG. 15 illustrates a method of remote code injection hacking commonly in use today. The hacker at a hacker's client (1500) uses a hacker-server-access-connection (1515) (see the fifth double-headed arrow line) to access a server (1510) and try to discover a flaw in any software, i.e. a running process (1545), operating on the server (1510) or any hardware flaw which may be present in the server (1510).

The hacker at the hacker's client (1500) running the terminal software (1530), the terminal software (1530) while connected through the hacker-server-access-connection (see the fifth double-headed arrow line, the hacker-server-access-connection (1515)) with the server (1510), acts as a window (1525) into the server (1510). Once a flaw in the server (1510) is found, the hacker then sends hacker's code (1550) from the window (1525) to a running process (1545) on the server (1510) (see the first dashed single-headed arrow line (1527)). This process is called: code injection. Once the hacker using terminal software (1530) gets inside the server (1510), the hacker can do any action at will, and in the majority cases, can do so without leaving any trace of its presence in the compromised server (1510).

The means for the hacker to inject executable code, namely the hacker's code (1550), into a compromised computer, e.g. the server (1510), is the hacker's access to the running process (1545) on the server (1510). The hacker's code (1550) is typically in the same format as the running process (1545) and, the operating system on the server (1510) and central processing unit are not able to make any distinction of the two codes in the random access memory of the server (1510). Therefore, executing both as if both are the native intended code of the running process (1545) operating on the server (1510).

Code Execution of the Prior Art

Computers understand electronic signals and they are represented in the form of low-signal which is a zero "0", and high-signal which is a one "1". Before a program's code in the format written by a computer programmer is processed by the computer's central processing unit, the program-code gets compiled and each instruction of the program-code gets translated into the format a computer understands: zeroes and ones. Zeroes and ones can also be converted into a hexadecimal format equivalent. The explanations below employ the hexadecimal format.

A hexadecimal format is a form of translating values using a sixteen-digit format, half byte we've discussed prior. For instance, we humans use the decimal system because we have ten fingers in our hands, therefore, using the base ten is appropriate. Since computers use only zeroes and ones, then a binary system is used.

But as explained before, the computer architecture handles zeroes and ones with the base of two. The values start with one, then one is multiplied by two (to wit, base two), becoming four. And four is multiplied by two, becoming eight. And eight multiplied by two becoming sixteen, which represents half-byte. A byte has "8" bits which represents the decimal values from "0-255".

The hexadecimal format represents a half-byte values and it goes from "0-9" to represent the decimal values of "0-9". The decimal equivalent from "10-16", is represented as follows: "A=10", "B=11", "C=12", "D=13", "E=14" and "F=15". Therefore from "0" to "15" has "16" numbers—a hex.

The hexadecimal representation still not a binary representation, but it is a representation that enables a programmer to explain what the underlying binary value in the computer's memory is.

As an example, the hexadecimal value of "EF" is the equivalent decimal value of "239". Conversion of the hexadecimal value "EF": "E=14—decimal" and "14=1110—binary"; "F=15—decimal" and "15=1111—binary". Therefore, the hexadecimal value becomes the binary value of: "11101111", which is the value of "239". The hexadecimal value of "EF" becomes the binary value ""11101111" stored into the computer's memory and executed by the computer's central processing unit. We'll be using hexadecimal values but it is to be understood that what is stored in the computer's random access memory is its binary equivalent.

FIG. 16 illustrates an exemplar code in the random access memory in the server (1510). The running process (1545) having a code equivalent (1600). And the hacker's code (1550) having the hacker's code equivalent (1610). The code equivalent (1600) of the running process and hacker's code equivalent (1610) are the computer executable code being used/executed by the central processing unit of the server (1510). The code equivalent (1600) represents the actual computer code of the running process (1545) which is executed by the central processing unit of the server (1510). The hacker's code equivalent (1610) represents the hacker's code (1550), also the actual computer code which is executed by the central processing unit of the server (1510).

As illustrated, the format for the code equivalent (1600) for the running process (1545) is the same code format for the hacker's code equivalent (1610) for the hacker's code (1550. The central processing unit of the server (1510) does not distinguish the code equivalent (1600) that is intended and which is the good code, from the non-intended code, which is the hacker's code equivalent (1610). Therefore, the central processing unit of the server (1510) executes both.

Encrypting Random Access Memory Data

Figure 17:
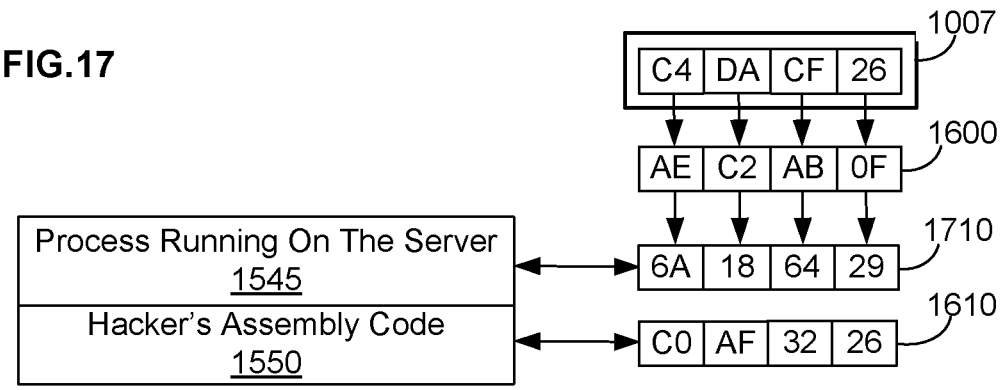
FIG. 17 illustrates code execution stored in a computer random access memory using devices and methods disclosed herein.

FIG. 17 illustrates the execution of encrypted code and data stored in the computer's random access memory using a preferred method disclosed herein. The running process (1545) has the code equivalent (1600) and the hacker's code (1550) has the hacker's code equivalent (1610), as explained above in regard to FIG. 16. The code equivalent (1600) is encrypted with the decrypted operating system symmetric private key (1007) producing the encrypted code (1710). The encrypted code (1710) becomes the new code equivalent for the running process (1545) which is stored into the random access memory (925) of the server (1510) for execution by the central processing unit (905) of the server (1510).

Each byte of the encryption/decryption key (103) is used to encrypt (e.g., by XORing in this example) one byte of the code equivalent (1600) of the running process (1545) producing one byte of the encrypted code (1710) that is stored in the random access memory (925) of the server (1510). The encrypted code (1710) becomes the new encrypted code equivalent for the running process (1545). As illustrated, the hacker's code (1550) is stored as is without any encryption, since the hacker does not have access to the decrypted operating system symmetric private key (1007).

Executing Encrypted Code From Random Access Memory

When stopping code injection into a process (e.g., a program) running in the random access memory (925) of the first computer (130), the operating system (120) may function differently than as already explained for stopping virus infection of the software program (330).

As already explained, in applying a preferred method for stopping virus infection of non-encoded software (310), the operating system (120) decrypts the encrypted software file (to wit, the digital-DNA (300)) and stores the decrypted version, the non-encoded software (310), into the random access memory (925) of the first computer (130). The mentioning of the first computer (130) is to be interpreted as to cover the second computer (130A), the server (1510) or any computing device as well.

In order to provide more rigorous computer protection, a preferred method must preclude the hacker's code (1550) from being injected into a running process in the random access memory (925) of the first computer (130).

Instead of the operating system (120) decrypting the encrypted software program, namely the digital-DNA (300), and storing the non-encoded software (310) in the random access memory (925) of the first computer (130), the operating system (120), instead decrypts the optional-header-identification-code (320) and if it valid, e.g. contains the phrase "VALIDATED DNA", the operating system (120) removes the optional-header-identification-code (320) and stores the encrypted version software file code, the digital-DNA (300), into the random access memory (925) of the first computer (130).

Figure 18:
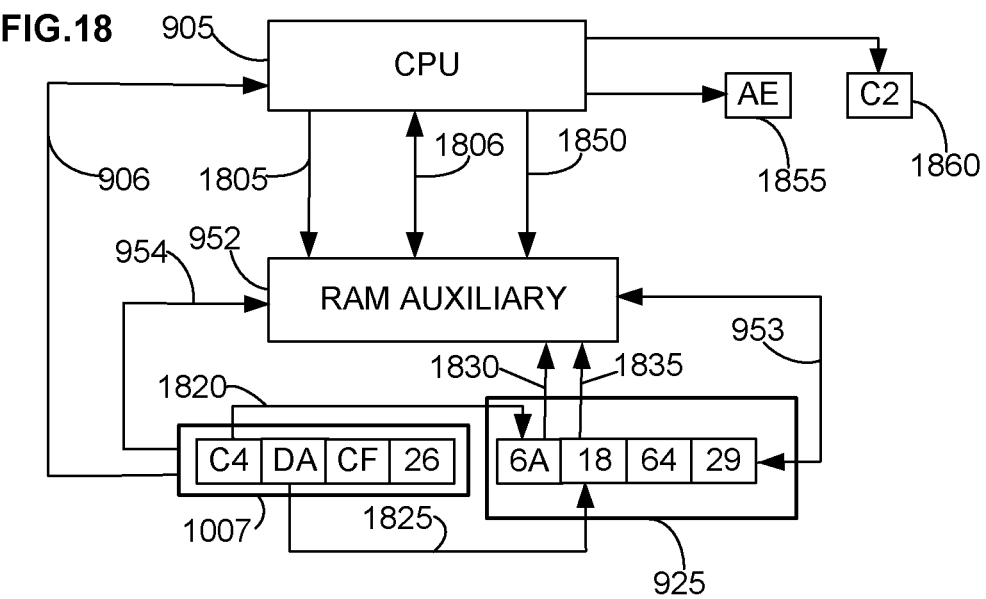
FIG. 18 illustrates the code execution using a disclosed preferred embodiment.

FIG. 18 illustrates this preferred method where the central processing unit (905) working in conjunction with random access memory auxiliary (952) processes encrypted code stored in the random access memory (925) of the first computer (130). The address bus lines (1850), the data bus lines (1806), and the read/write line (1805) of the central processing unit (905) are connected to the random access memory auxiliary (952). Whenever, the central processing unit (905) needs code for processing (e.g., data), or execution (e.g., computer instruction code), or data to be stored into the random access memory (925), the central processing unit (905) sets a signal on read/write line (1805). In our exemplar explanation, if the read/write line (1805) has a low "0" value, it indicates a read from the random access memory (925), if it has a high "1", it indicates a write into the random access memory (925).

The central processing unit (905) sets the read/write line (1805) to "0" indicating a read, and it also places a value on the address bus lines (1850) indicating the location in random access memory (925) it intends to read. The random access memory auxiliary (952) proceeds and calculates which the byte value of the decrypted operating system symmetric private key (1007) it will use to decrypt the encrypted stored byte in random access memory (925) addressed by a value the central processing unit (905) has placed of the address bus lines (1850).

Encrypting and decrypting an encrypted continues string using an encryption key is easy. It starts by applying the first byte value of the string to the first value of the encryption key, one by one, from the first to the last byte of the encryption string against bytes of the string being encrypted/decrypted, and then starting from the beginning of the encryption key all the way to the end of it again, and again, until the whole string is encrypted/decrypted. As an example, a string to be encrypted '1234', the encryption key '12'. At the first pass, the bytes '12' of the string to be encrypted is encrypted with the bytes '12' of the encryption key. At the second pass, the bytes '34' of the string to be encrypted is encrypted with the bytes '12' of the encryption string.

But encrypting and decrypting data byte stored in random location of the random access memory (925) of the first computer (130) requires a sophisticated algorithm to identify which byte of the encryption key is used to encrypt and decrypt the precise memory byte location addressed by the central processing unit (905). The explanation for the algorithm follows.

The random access memory auxiliary (952) takes a modulus between the value of the address bus lines (1850) and the length of the decrypted operating system symmetric private key (1007) deriving the modulus value (e.g., the random access memory address at the address bus lines (1850) MOD length of the decrypted operating system symmetric private key (1007)). Then adding the value of '1' to the derived modulus value deriving a summed value. Then using the summed value to point to a location of the decrypted operating system symmetric private key (1007). Using the respective value of the decrypted operating system symmetric private key (1007) where the derived summed value has pointed thereto to decrypt the location byte-value of the random access memory (925) addressed by the address bus lines (1850) of the central processing unit (905).

If it is assumed that the location of the random access memory (925) addressed by the central processing unit (905) is the first location, location zero (the binary system starts at a zero which represents the first location) with the encrypted value of "6A". The random access memory auxiliary (952) takes the modulus between the length of the decrypted operating system symmetric private key (1007) which is "4" and the location address which "0", the modulus operand result will be "0" (zero) (0 mod 4=0) and the value of '1' is added to the derived modulus result (0+1=1). Then the first byte of the value "C4" of the decrypted operating system symmetric private key (1007) is used in an XOR (any other encryption schema may be used) operation to decrypt (see the thirtieth-second single-headed arrow line (1820)) the value "6A" deriving the decrypted value (see the thirtieth-third single-headed arrow line (1830)). Then the random access memory auxiliary (952) returns the decrypted value "AE" to the central processing unit (905) using the data bus lines (1806), and the central processing unit (905) executes the instruction value "AE" (1855).

Next, the central processing unit (905) requests the next byte at location "1" which represents the second location in random access memory (925) of the first computer (130). Then the random access memory auxiliary (952) takes a modulus between the byte location "1" and the decrypted operating system symmetric private key (1007) length which is "4" deriving the modulus value of "1" (1 mod 4=1) then adding the value of '1' to the derived modulus value deriving the summed modulus value of '2' (1+1=2). Then the random access memory auxiliary (952) uses the second byte "DA" of the decrypted operating system symmetric private key (1007) and in XOR operation (see the thirtieth-fourth single-headed arrow line (1825)) decrypts the byte-value "18" of the byte memory location "2" deriving the decrypted value (see the thirtieth-fifth single-headed arrow line (1835)). Then random access memory auxiliary (952) returns the derived decrypted value of "C2" to the central processing unit (905) using the data bus lines (1806). And lastly, the central processing unit (905) executes the decrypted instruction byte-value "C2" (1860).

Preferably, the random access memory auxiliary (952) has a direct access connection (see the second double-headed arrow line (953)) to the random access memory (925) of the first computer (130) and it also has direct access (see the second single-headed arrow line (954)) to a copy of the decrypted operating system symmetric private key (1007). The central processing unit (905) also has a direct access to the decrypted operating system symmetric private key (1007) (see the twentieth-third single-headed arrow line (906)). In this arrangement, the central processing unit (905) will be able to read the decrypted operating system symmetric private key (1007) and do the decryption of the encrypted digital-DNA (300) stored in the random access memory (925) of the first computer (130) and to do any encryption as needed to be saved in the random access memory (925). Further, in this arrangement the central processing unit (905) may work in conjunction with the operating system (120) or the software driver (935) to perform encryption and decryption as requested by one and/or the other.

If implemented as such, where the central processing unit (905) access the decrypted operating system symmetric private key (1007) and uses the decrypted operating system symmetric private key (1007) to perform encryption and decryption, then the central processing unit (905) will perform the modulus operating as described for the random access memory auxiliary (952). Then the random access memory auxiliary (952) will not be necessary because the central processing unit (905) performs the same functionality of the random access memory auxiliary (952). Also, optionally, a macro operating system (955) or any embedded software can be used by a unit working in conjunction with the central processing unit (905) to perform the algorithm and the encryption/decryption.

The random access memory auxiliary (952) also may be used to encrypt/decrypt software files to derive digital-DNA, as well.

The random access memory auxiliary (952) and central processing unit (905) may be integrated into a single unit.

It may also be implemented where the central processing unit (905) has a smart random access memory controller comprising the random access memory auxiliary (952) integrated into it.

Executing Injected Code From Random Access Memory

Figure 19:
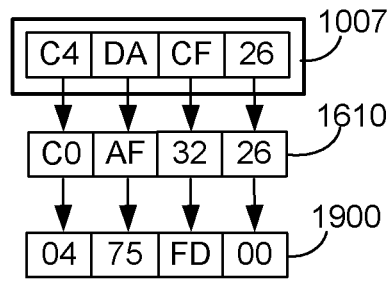
FIG. 19 illustrates the disabling of the hacker's random access memory injected code.

FIG. 19 illustrates what happens once the hacker's code (1550), which is un-encrypted (e.g., represented as hacker's code equivalent (1610)), is injected into the random access memory (925). Since the behavior of the random access memory auxiliary (952) is to decrypt digital-DNA code (also known as encrypted program code) from the random access memory (925) before returning it to the central processing unit (905), once a request for the execution of the hacker's code equivalent (1610) arrives at the central processing unit (905) of the first computer (130) and the random access memory auxiliary (952) gets to it, the random access memory auxiliary (952) using the decrypted operating system symmetric private key (1007) will decrypt the hacker's code equivalent (1610) turning it into unusable code and is essentially a jumbled-hacker's-code (1900) which the central processing unit (905) cannot execute.

Once the central processing unit (905) tries and fails to execute the jumbled-hacker's-code (1900), the central processing unit (905) disables the jumbled-hacker's-code (1900) in the random access memory (925), generating an interrupt error. The operating system (120) generates an error to the user, ending the execution of the jumbled-hacker's-code (1900), thus preventing the action intended to be implemented by the hacker's code (1550). Alternatively, this operation may be performed without the random access memory auxiliary (952). A software driver (935) running on the random access memory (925) may be employed to perform the same functionality of performing the modulus operation with the length of the encryption/decryption key (103) and the intended location address of the random access memory (925) then using the byte retrieved from the encryption/decryption key (103) to encrypt/decrypt software code from the random access memory (925). Or it may be that the macro operating system (955) (see FIG. 9), if present, be used to perform the modulus operation and/or the encryption/decryption of data and/or executable program code for the central processing unit (905), thus, increasing the first computer (130) operational speed. The macro operating system (955) may be executed by random access memory (925), or by a separate processing unit working in conjunction with the central processing unit (905).

Operating System Loading of the Prior Art

FIG. 20 illustrates loading the operating system as currently performed in the art once a computer is first turned on. There are essentially two methods of loading the operating system. In the first method, at the computer's power up, the ROM-BIOS (2030) loads the operating system stored in the computer's hard disk (2020) for execution into the random access memory.

In the second method, the computer is started via a peripheral attachment, such as a compact disk or a dongle (2000) that holds the operating system. When the compact disk or the dongle (2000) is connected to the computer at the time of startup, the ROM-BIOS (2030) first accesses the dongle (2000) and determines whether or not an operating system is present and properly configured on the dongle (2000). If the operating system is present in the compact disk or the dongle (2000) and properly configured, then at the computer's power up, ROM-BIOS (2030) loads the operating system from the compact disk or the dongle (2000) and stores it for execution in the random access memory of the computer.

The obvious disadvantages of the prior art's loading of the operating system from the dongle (2000) is that, once the operating system is loaded into random access memory, whatever computer virus is present on the compact disk or the dongle (2000), will automatically be loaded into the computer on the random access memory along with the operating system. And once there, the computer virus proceeds and infect the computer. Once such virus infects the operating system on computer's hard disk (2020), then it is possible for the virus to be executed first, before executing the operating system. Basically, when this happens, the virus takes control of the computer before the operating system in the computer's hard disk (2020) is even loaded.

Operating System Loading

FIG. 21 illustrates a preferred embodiment with the loading of the operating system using the new methods disclosed herein. An attached dongle has a first switch (2105) which if closed, indicates to the basic input/output system (2130) to load the operating system stored in the third-non-transitory computer storage medium of the dongle. The operating system on second-non-transitory computer storage medium (350) also has a second switch (2135) which if closed, indicates to the basic input/output system (2130) to load the operating system stored in the second-non-transitory computer storage medium (350) of the first computer (130).

As per the illustration in FIG. 21, the first switch (2105) is turned off (i.e., opened) and the second switch (2135) is turned on (i.e., closed). In this illustration, the basic input/output system (2130) using the encryption/decryption key (103), reads the encrypted operating system (120-E) from the second-non-transitory computer storage medium (350) and using the encryption/decryption key (103) decrypts the encrypted operating system symmetric private key (1007-E) deriving the decrypted operating system symmetric private key (1007), then using the decrypted operating system symmetric private key (1007) decrypts the encrypted operating system (120-E) deriving the operating system (120), then stores the operating system (120) that has been decrypted for execution in the random access memory (925) of the first computer (130).

In an alternative embodiment, the basic input/output system (2130) loads the encrypted operating system (120-E) into the random access memory (925) of the first computer (130). Then, once the central processing unit (905) is instructed to execute the encrypted operating system (120-E), the basic input/output system (2130) (or the random access memory auxiliary (952)) using the encryption/decryption key (103) decrypts the encrypted operating system symmetric key (1007-E) deriving the decrypted operating system symmetric private key (1007), then using the decrypted operating system symmetric private key (1007) to perform the decryption of the encrypted operating system (120-E) using the same mechanism with the use of the modulus, as has been explained in the discussion above relating to FIG. 18. Alternatively, the basic input/output system (2130) loads the encrypted operating system into random access memory (925) and decryption is performed by the random access memory auxiliary (952), as has been explained in the discussion above relating to FIG. 18.

FIG. 22 illustrates a preferred embodiment of the new method disclosed herein, once the first switch (2105) is turned on connecting the dongle to the basic input/output system (2130) and second switch (2135) is turned off, disconnecting the ability of the encrypted operating system (120-E) to be loaded from second-non-transitory computer storage medium (350). In this arrangement, the basic input/output system (2130) turns off/disconnects the device-with-encryption-decryption-key (100) from the computer (as per the illustration in FIG. 22, the device-with-encryption-decryption-key (100) is not present), therefore, not allowing any program from the dongle to read the encryption/decryption key (103).

There are two ways of implementing the basic input/output system (2130) handling of the dongle. A first way may be implemented such that the basic input/output system (2130) wouldn't allow the operating system stored in the third non-transitory computer storage medium (2100) to be loaded.

In a second way, the basic input/output system (2130) allows the operating system stored in the third non-transitory computer storage medium (2100) of the dongle to be loaded into the random access memory (925) of the first computer (130).

If the second way is implemented, and if the dongle happens to be infected by a computer virus, and if the computer virus infects the computer, then as discussed above, once the computer is powered up, this loads the operating system of FIG. 21. The virus will then be disabled because it is not encrypted. If the computer virus happens to be an operating system infector and infects the operating system (120) stored in the second-non-transitory computer storage medium (350) of the first computer (130), then once the first computer (130) is restarted with the arrangement of FIG. 21, the computer virus will be disabled because the encrypted operating system (120-E) stored in the second-non-transitory computer storage medium (350) of the first computer (130) is encrypted and the operating system loader software routines will work normally because it will get decrypted by the basic input/output system (2130). This then will cause the infecting virus code to be disabled because the infecting virus code lacks encryption and once the basic input/output system (2130) decrypts it, it becomes gibberish.

It is preferably that only one switch be closed at once, either first switch (2105) or second switch (2135): If one is on, the other is off. In preferred embodiments, both switches are not closed or opened at the same time. It is possible that a single switch be used, if it is on, load one operating system, if is off, load the other operating system.

A dongle has been illustrated, but it can be a compact disk in a compact disk reader or any other plugin device attached to the computer and accessible by the basic input/output system.

Also, the encrypted operating system (120-E) stored in the second-non-transitory computer storage medium (350) of the first computer (130) typically is the primary operating system, the attached operating system on the dongle is typically the secondary operating system.

The first switch (2105) and the second switch (2135) may be mechanical or electronic. If mechanical, the switch will be set manually. If electronic, the switch may be set manually or by a software.

The basic input/output system (2130) is any software (whether embedded or not) which the central processing unit (905) of the first computer (130) uses at the startup to decrypt the encrypted operating system (120-E) stored in the second-non-transitory computer storage medium (350) of the first computer (130) deriving the operating system (120) and load the operating system (120) into random access memory (925) of the first computer (130), or to load operating system stored in the third non-transitory computer storage medium (2100) of the dongle into the random access memory (925) of the first computer (130) and disable the device-with-encryption-decryption-key (100). The basic input/output system (2130) may be part of the first computer (130), or in the central processing unit (905), or stored in a ROM (e.g., the basic input/output system (2130)), flash memory, Electrical Erasable Programmable Read Only Memory, etc.

Preferred Methods

FIG. 24 illustrates a preferred method embodiment, namely the First preferred method (2400). As a general rule for interpretation of this disclosure, ordinal numbers used herein (e.g., "first", "second," "third," etc.) are for the purposes of supplying a unique name and not to imply any rank of preference.

The First preferred method (2400) is illustrated in FIG. 24. The First preferred method (2400) is for improving the operation of a computer, also called a first computer (130), to provide the first computer (130) with immunity from infection of a software program (330) by a software virus, also referred to as virus code (810C), or by memory software code injection. Memory software injection is essentially the injection of the virus code (810C) into computer memory, such as random access memory (925), most commonly via a network connection.

The First preferred method (2400) includes: a Hosting step (2405); a Receiving step (2410); a Decrypting step (2415); an Encrypting step (2420); a First-loading step (2425); a Second-loading step (2430); a Precluding step (2435) and optionally, a RAM step (2440). The optional status of the RAM step (2440) is denoted by a dashed line in FIG. 24.

The Hosting step (2405) of hosting an operating system (120) in a non-transitory computer storage medium that is accessible by the first computer (130). The non-transitory computer storage medium is also referred to as a first-non-transitory computer storage medium (104).

The Receiving step (2410) of receiving at the first computer (130) an encrypted operating system symmetric private key (1007-E) through a network connection. Network connections are shown in the drawings as an arrow connecting boxes, such as in FIG. 12B and indicated by the two-way connection signified by the double-headed arrow of the fourth secure connection (1220).

The Decrypting step (2415) of decrypting the encrypted operating system symmetric private key (1007-E) on the first computer (130) to derive a decrypted operating system symmetric private key (1007).

The Encrypting step (2420) of encrypting a software program (330) using the decrypted operating system symmetric private key (1007) upon first installation of the software program (330) and thereby create an encrypted software program, namely the digital-DNA (300), that is the only installed version of the software program (330) on the first computer (130).

The First-loading step (2425) occurs when executing a command to start the software program (330), requiring the operating system (120) to use the decrypted operating system symmetric private key (1007) to decrypt a first part of the encrypted software program, namely the digital-DNA (300), necessary to start the software program (330).

The Second-loading step (2430) of requiring the first computer (130) to use the decrypted operating system symmetric private key (1007) to subsequently decrypt any second part of the encrypted software program, namely the digital-DNA (300), that is needed during operation of the first part.

The Precluding step (2435) is precluding the operating system (120) from running any executable code that has not been previously encrypted with the decrypted operating system symmetric private key (1007).

The RAM step (2440), which is optional, is storing the first part and any second part that is decrypted in a random access memory (925) accessible by the first computer (130).

FIG. 25 illustrates a preferred method embodiment, referred to as a Second preferred method (2500). The Second preferred method (2500) is a method for controlling loading of multiple operating systems into a random access memory (925) accessible by a computer, also called herein a first computer (130), the first computer (130) comprising a first-non-transitory computer storage medium (104), a second-non-transitory computer storage medium (350), a third non-transitory computer storage medium, the random access memory (925), a central processing unit (905), a basic input/output system (2130), and a switch, which is also referred to as the first switch (2105).

The Second preferred method (2500) has a First storing step (2505); a Second storing step (2510); a Third storing step (2515); a Fourth storing step (2520), a Setting step (2525) and a Configuring step (2530).

The First storing step (2505) is storing a first key, the first key is the same as the encryption/decryption key (103) in the first-non-transitory computer storage medium. The first key, to wit, the encryption/decryption key (103), is usable for encryption of an operating system symmetric private key. The operating system symmetric private key is also referred to as a decrypted operating system symmetric private key (1007). The first key is further usable for decryption of an encrypted operating system symmetric private key (1007-E).

The Second storing step (2510) is storing an encrypted operating system (120-E) on the first computer (130) in the second-non-transitory computer storage medium (350).

The Third storing step (2515) is storing an encrypted operating system symmetric private key (1007-E) in the second-non-transitory computer storage medium (350).

Fourth storing step (2520) is storing a non-encrypted operating system (120-NE) on the first computer (130) in the third non-transitory computer storage medium (2100).

The Setting step (2525) is setting are the first switch (2105) and the second switch (2135) to enable the basic input/output system (2130) to load either the encrypted operating system (120-E) or the non-encrypted operating system (120-NE) into the random access memory (925).

The Configuring step (2530) is configuring the first computer (130) to power up and then to implement one of the following alternative actions that is dependent upon a stated condition of the first switch (2105).

A first action is to make the first key, to wit, the encryption/decryption key (103), available from the first-non-transitory computer storage medium (104) to the basic input/output system (2130) when the second switch (2135) is set to enable the basic input/output system (2130) to load the encrypted operating system (120-E) and direct the basic input/output system (2130) to read the encrypted operating system (120-E) from the second-non-transitory computer storage medium (350) and using the first key to decrypt the encrypted operating system symmetric private key (1007-E) deriving, i.e. producing, a decrypted operating system symmetric private key (1007) and using the decrypted operating system symmetric private key (1007) to decrypt the encrypted operating system (120-E), as requested by the central processing unit (905).

A second action occurs when the first switch (2105) is set to enable the basic input/output system (2130) to load the non-encrypted operating system (120-NE) from the third non-transitory computer storage medium (2100), directing the basic input/output system (2130) to disable access to the first key, to wit, the encryption/decryption key (103), then read the non-encrypted operating system (120-NE) from the third non-transitory computer storage medium (2100), and then store the non-encrypted operating system (120-NE) in the random access memory (925) accessible by the first computer (130).

FIG. 26 illustrates a preferred method embodiment, referred to as a Third preferred method (2600). The Third preferred method (2600) includes: a 3M hosting step (2605); a 3M receiving step (2610); a 3M decrypting step (2615); a 3M encrypting step (2620); a 3M partial decrypting step (2625); a 3M subsequent decrypting step (2630); a 3M storing step (2635); and optionally, a 3M precluding step (2640). The optional step in FIG. 26 is shown connected by a dashed line, which indicates its optional status.

FIG. 26 illustrates a preferred method embodiment, referred to herein as a Third preferred method (2600). The Third preferred method (2600) is a method for improving operation of a computer, also called herein a first computer (130). The Third preferred method provides the first computer (130) with immunity from infection of a software program (330) by a software virus, also referred to as the virus or worm (800C), or by memory software code injection. Memory software injection is essentially the injection of the virus or worm (800C) into computer memory, such as random access memory (925), most commonly via a network connection.

The Third preferred method (2600) includes a 3M hosting step (2605); a 3M receiving step (2610); a 3M decrypting step (2615); a 3M encrypting step (2620); a 3M partial decrypting step (2625); a 3M subsequent decrypting step (2630); 3M storing step (2635); and optionally, a 3M precluding step (2640).

The 3M hosting step (2605) is hosting an operating system (120) in a non-transitory computer storage medium accessible by the first computer (130). The non-transitory computer storage medium is also referred to as a first-non-transitory computer storage medium (104).

The 3M receiving step (2610) is receiving at the first computer (130) an encrypted operating system symmetric private key (1007-E) through a network connection. Network connections are shown in the drawings as an arrow connecting boxes, such as in FIG. 12B and indicated by the two-way connection signified by the double-headed arrow of the fourth secure connection (1220).

The 3M decrypting step (2615) is decrypting the encrypted operating system symmetric private key (1007-E) on the first computer (130) to derive a decrypted operating system symmetric private key (1007).

The 3M encrypting step (2620) is encrypting a software program (330) using the decrypted operating system symmetric private key (1007) upon first installation of the software program (330) and thereby create an encrypted software program, referred to herein as the digital-DNA (300). The digital-DNA (300) is the only installed version of the software program (330) on the computer, i.e., no unencrypted software program is present on the computer.

The 3M partial decrypting step (2625) occurs when executing a command to start the software program (330), requiring the operating system (120) to use the decrypted operating system symmetric private key (1007) to decrypt a first part of the encrypted software program, namely the digital-DNA (300), necessary to start the software program;

The 3M subsequent decrypting step (2630) is requiring the first computer (130) to use the decrypted operating system symmetric private key (1007) to subsequently decrypt any second part of the encrypted software program, namely the digital-DNA (300), that is needed during operation of the first part.

The 3M storing step (2635) is storing the first part and any second part that is decrypted in a random access memory (925) accessible by the first computer (130).

The 3M precluding step (2645) is optional and denoted by the dashed line. This is a step of precluding the operating system (120) from running any executable code that has not been previously encrypted with the decrypted operating system symmetric private key (1007).

In a Fourth preferred method the same steps of the Third preferred method (2600) are performed, except that the 3M storing step (2635) is optional and the 3M precluding step (2645) is required.

Comparison Between a Computer and a Human Being

The new method and device disclosed herein may also be illustrated by comparison between the first computer (130) and a human being. The first computer (130) may be compared to a human body in the sense that a computer virus adversely affects the normal operation of a computer and a human infecting virus adversely affects the health of the human being.

Figure 23:
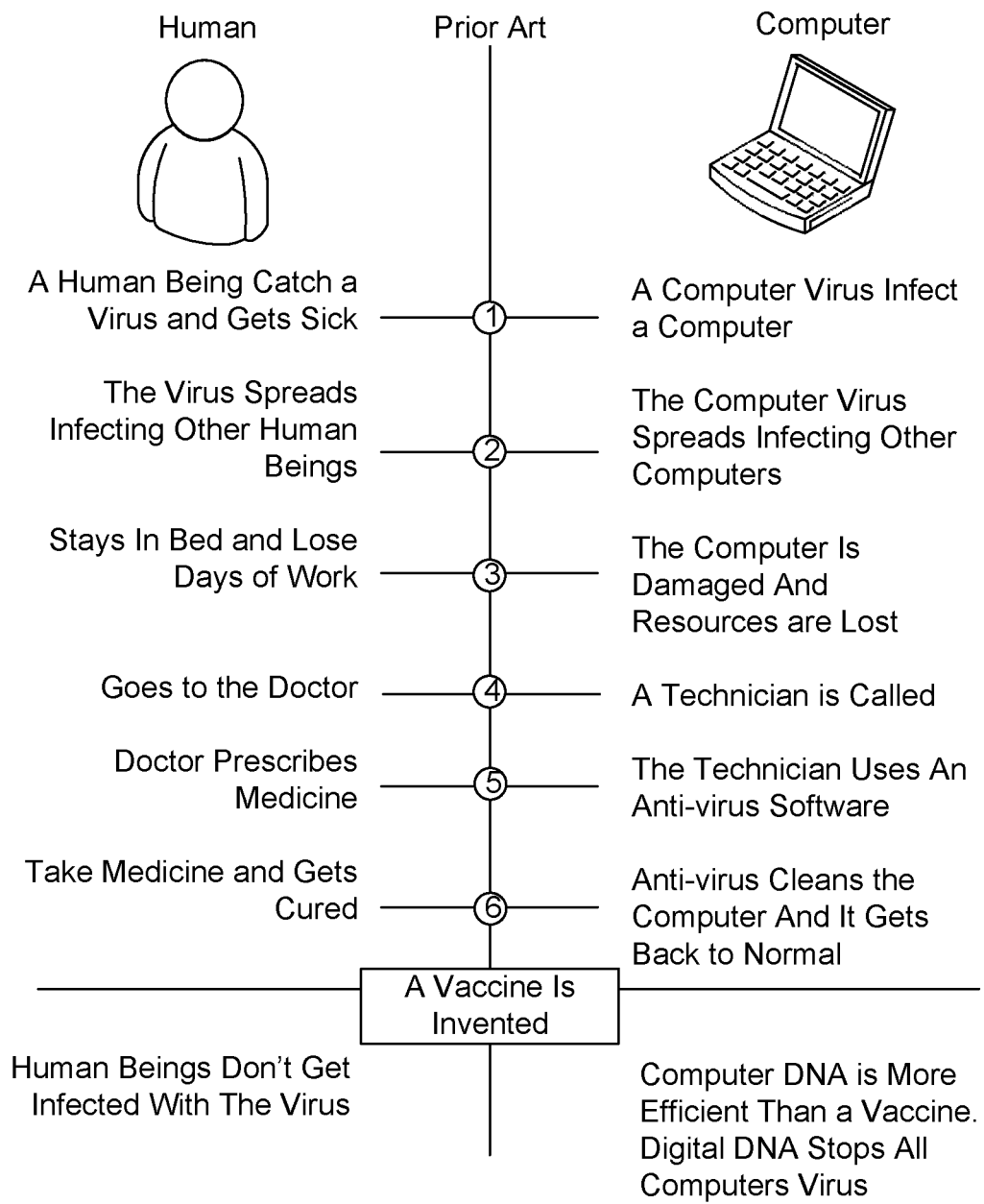
FIG. 23 illustrates the comparison between a human body and a computer.

FIG. 23 illustrates such comparison. First, making the comparison with the prior art, then at the very end, with a preferred embodiment. On the left is a human, and on the right a computer.

Step (1): A human catches a virus—a computer catches a computer virus.

Step (2): The human virus spreads to other humans—a computer virus spreads to other computers.

Step (3): An infected human stay in bed and loses days of work—an infected computer isn't able to fully perform.

Step (4): A sick human goes to a doctor—a computer technician pays a visit to an infected computer.

Step (5): The doctor prescribes medication to the sick human—the technician runs an antivirus software in the infected computer. And, Step (6): The human takes the prescribed medicine and gets healed—the antivirus cleans the computer and the computer gets back to normal operation.

Once a vaccine is invented to combat the virus, the virus no longer affects the human—the devices and methods disclosed herein are more potent than a vaccine. A vaccine stops only one the virus it was designed to stop. But the digital-DNA once applied in the computer, computer viruses of all kind can no longer affect the computer.

CONCLUSION

The processes for enabling computer virus prevention as disclosed herein are preferably performed by a combination of hardware and software. If a virus is injected into a computer possessing the device-with-encryption-decryption-key (100), it is injected in an unencrypted form into the computer's digital-DNA, which is encrypted. In order to be run on the computer, the virus would necessarily be run through a decryption step using the encryption/decryption key (103) to decrypt the encrypted operating system symmetric private key (1007-E) deriving the decrypted operating system symmetric private key (1007), then using the decrypted operating system symmetric private key (1007) for decryption of the computer virus turning it into gibberish. This destroys the operability of the virus before the virus can be executed.

The method and devices disclosed do not require specially-designed software application programs. Therefore, the same operational application programs in their original un-encoded state could be used at any computer. However, each operational application program installed using the method and devices disclosed herein is installed to an encrypted state, i.e. what is termed, the digital-DNA (300) of the first computer (130).

The methods and devices disclosed herein will work on any operational application program as long as the first computer (130) has access to the device-with-encryption-decryption-key (100).

When the operational application program in its encrypted state is executed in a computer with the device-with-encryption-decryption-key (100), the encryption/decryption key (103) is used to first decrypt the encrypted operating system symmetric private key (1007-E) deriving the decrypted operating system symmetric private key (1007), then using the decrypted operating system symmetric private key (1007) for decryption of what is needed to execute the operational application program.

Preferred methods and devices disclosed herein only require a single encryption key (e.g., the decrypted operating system symmetric private key (1007)) for all operational application programs, which must be installed using the operating system symmetric private key, which is the same as the decrypted operating system symmetric private key (1007). A single key is needed for every installed operational application program, not a plurality of encryption keys for installed programs. Further, this single key is kept encrypted and unavailable from any running process, and is only available to authorized software.

The decrypted operating system symmetric private key (1007) is a private key system (which is symmetrical) for encrypting and decrypting, not a public-key-system (asymmetrical) where a private key is used for encryption and a public key is used for decryption. If a public-key-system were to be used, the private key will be the one used for encrypting the software code and the public-key will be used by the computer to do the decrypting the encrypted software code. Anyone possessing the private-key will be able to encrypt virus program and the encrypted virus program will be decrypted in the computer since the computer uses the public-key for decryption. Therefore, the public-key-system allows a computer virus to be introduced into the computer.

The decrypted operating system symmetric private key (1007) is not stored un-encrypted on the computer's hard disk, since, if the key were to be stored un-encrypted in the computer's hard disk, anyone could then copy it and then use it to encrypt a software virus to run in the computer or use it to encrypt a code to be injected into a running process of the computer.

In either case: use of a public key or an unencrypted key stored in the computer's hard disc, would increase the potential for viral infection and loss of the computer's security.

Preferred methods and devices disclosed herein execute software code that has been converted to the computer's digital-DNA. If an un-encoded program is present in the computer as software file, the file will not be executed by the central processing unit (905) of the first computer (130). Or, if the executable software code is un-encoded process in the random access memory (925) of the first computer (130), the central processing unit (905) will not execute it. This functionality only happens because the behavior of the operating system (120) and central processing unit (905) change from what it would otherwise be using current computer methodology and technology.

In a preferred embodiment, before the operating system (120) loads a software file into the random access memory (925) of the first computer (130), it will decrypt it, and if it doesn't have a valid digital-DNA format, the operating system (120) will not load it into the random access memory (925) of the first computer (130). If it has a valid digital-DNA format, the operating system (120) will load the encrypted version, i.e. digital-DNA (300). The same is true for un-encoded software code loaded into the random access memory (925) of the first computer (130), once it gets decrypted it will be in a format not known to the central processing unit (905). The operating system (120) designates if it has a valid format by reading the optional-header-identification-code (320) part of the encrypted software code, i.e. the digital-DNA (300), if the optional-header-identification-code (320) is present and valid, then the operating system (120) loads the code.

In another embodiment, the operating system (120) decrypts the digital-DNA (300), i.e. the first-encrypted software program, and loads it into the random access memory (925) of the first computer (130), and if prior to decryption, the software happens to be an un-encoded version, it will become encrypted and therefore the computer will not run it.

Preferred methods and devices disclosed herein operate automatically without requiring user's intervention to insert an encryption and/or a decryption key for the operating system's encryption/decryption operation, or to supply a user's identification and/or password for the operation of the encryption/decryption. And without requiring the use of a dedicated central processing unit within the device-with-encryption-decryption-key to: manage the enabling or disabling of the device-with-encryption-decryption-key (100); or to enable or disable the encryption/decryption key (103) within the device-with-encryption-decryption-key (100); or to move code (which may be executable or data) from one storage location to another within the device-with-encryption-decryption-key (100); or to move the encryption/decryption key (103) from one storage location to another within the device-with-encryption-decryption-key (100); or requiring the user to manually perform the encryption/decryption of the operating system symmetric private key.

Preferably, the device-with-encryption-decryption-key (100) is easy to build and of low cost, without downgrading the device with the security of the device-with-encryption-decryption-key (100) and doesn't require separate computer code for its operation.

Preferably, the central processing unit (905) does the requests for data/code to be read from or stored to the random access memory (925), but does not do the actual encryption/decryption. The encryption/decryption is done by a chip or software which is not part of current central processing unit's architecture nor is it necessary for the central processing unit's functioning as currently implemented into central processing unit's technologies.

It is within the scope of the present disclosure that non-preferred methods and devices may be implemented into the central processing unit (905) to be designed in the future, and the encryption/decryption may be done by the actual central processing units. If implemented into the central processing unit, then the encryption/decryption key (103) may be part of the central processing unit, like registers are part of every central processing unit, and the encryption/decryption key (103) may be stored into special register inside the central processing unit. If the encryption/decryption may be done by the actual central processing units, the encrypted operating system symmetric private key (1007-E) is passed to the central processing unit (905) for decryption deriving the decrypted operating system symmetric private key (1007), then the central processing unit (905) using the derived decrypted operating system symmetric private key (1007) for encryption/decryption.

If implemented into the central processing unit (905), preferably an embedded macro operating system (955) or similar program does the encryption/decryption operations in behalf of the central processing unit (905), freeing the central processing unit (905) from the modulus operations which can be resource intensive, thus, speeding the operation of the first computer (130)

The disclosure that the central processing unit (905) is doing the encryption/decryption should be interpreted broadly to include a combination of the central processing unit (905), the random access memory auxiliary (952), and/or the embedded macro operating system (955). Or a combination of the central processing unit (905), a memory management controller, and/or the embedded macro operating system (955). If the device-with-encryption-decryption-key (100) is implemented at the memory management controller. Or a combination of the central processing unit (905) and any other program (e.g., operating system, or driver, or basic input/output system, or embedded macro operating system (955)), or computer chip used to work in synchrony with the central processing unit (905) doing the encryption of code sent by the central processing unit (905) to be stored in the random access memory (925) of the first computer (130), or doing the decryption of encrypted executable code or data stored in the random access memory (925) of the first computer (130).

Preferred methods and devices disclosed herein may be implemented with an API (the acronym stands for Application Program Interface) where a program platform like a code interpreter interpreting executable code (or any other kind of program), e.g. PHP, ASP.NET, JSP, etc., the platform program takes a decrypted file-code and passes to the API and the API using the encryption/decryption key (103) encrypts the file and sends it back to the platform, or the platform sends an encrypted file-code and receives a decrypted one.

Whenever is mentioned the program code stored in the random access memory (925) accessible by the computer, the term 'random access memory accessible by the computer' is to be broadly interpreted to include any random access memory which the computer can access, including the random access memory in the central processing unit cache.

The security program if used in the embodiment of FIG. 21 will be encrypted and basic input/output system software residing in the read only memory using the decrypted operating system symmetric private key (1007) decrypts the encrypted security program deriving the decrypted security program, then initiating the execution of the decrypted security program.

If the security program is used in an embodiment, other than the embodiment of FIG. 21, the security program will not be encrypted. Preferably, if not encrypted, the security program will be associated with the operating system (120) in the form of a software driver (935) working in conjunction with the operating system (120) or a module part of the operating system (120).

The term "computer" or the term "server" are interchangeable and are broadly defined so that when the first computer (130) or the second computer (130A) is used, the server (1510) may be substituted therefor, and vice versa.

It was mentioned throughout the disclosure the encryption/decryption key (103), it is to be broadly interpreted to mean that the encryption/decryption key (103) is stored in the non-transitory memory cells of the first-non-transitory computer storage medium (104) of the device-with-encryption-decryption-key (100) and also to be broadly interpreted to include copied encryption/decryption key (120-A) under the control of the operating system (120). It has been mentioned the copied encryption/decryption key (110), it is to be broadly interpreted to mean that the copied encryption/decryption key (110) is stored in the latch memory cells of the latch memory (111) of the device-with-encryption-decryption-key (100), or under the control of the operating system (120) as copied encryption/decryption key (120-A).

Whenever the following abbreviations appear in the drawings or in the disclosure they stand for: RAM=Read Access Memory; OS=Operating System; ROM=Read Only Memory; I/O=Input and Output; Encryption/Decryption Key=Symmetric Encryption/Decryption Key; and, BIOS=Basic Input Output System.

The macro operating system (955) is to be broadly interpreted to include any embedded software which works with the central processing unit (905) or the random access memory auxiliary (952) to perform encryption and/or decryption operation in the computer.

Whenever the term operating system symmetric private key is used in the disclosure or in the drawings, it is to be broadly interpreted to include the program symmetric private key and to include the decrypted operating system symmetric private key. Whenever the term program symmetric private key is used in the disclosure or in the drawings, it to be broadly interpreted to include the operating system symmetric private key and to include the decrypted operating system symmetric private key. Whenever the term decrypted operating system symmetric private key is used in the disclosure or in the drawings, it to be broadly interpreted to include the operating system symmetric private key and to include the program symmetric private key. The same encryption and decryption steps used with the operating system symmetric private key is also used with the program symmetric private key.

Whenever the term encryption/decryption key is used it is to be broadly interpreted to include symmetric encryption/decryption key. Whenever the term device private key is used it is to be broadly interpreted to include device symmetric private key. The above-described embodiments including the drawings are examples that provide illustrations of a variety of embodiments using the methods and devices disclosed herein. Other embodiments will be obvious to those skilled in the art. Thus, the scope of the invention is determined by the appended claims and their legal equivalents rather than by the examples given.

INDUSTRIAL APPLICABILITY

The invention has application to the computer industry.

What is claimed is:

1. A computer system comprising:
a storage device that is a separate unit from components necessary for startup of a computer, the storage device comprising:
a first-non-transitory computer storage medium, the first-non-transitory computer storage medium storing:
a device symmetric private key, the device symmetric private key operable to decrypt an encrypted operating system symmetric private key so as to produce a decrypted operating system symmetric private key;
a computer comprising a central processing unit, an address bus, and a second-non-transitory computer storage medium on which is stored the encrypted operating system symmetric private key and a security program that is operable to:
retrieve the device symmetric private key from the storage device;
decrypt the encrypted operating system symmetric private key with the device symmetric private key to produce the decrypted operating system symmetric private key;
preclude the computer from storing the device symmetric private key or the decrypted operating system symmetric private key in any non-transitory computer storage medium;
require the computer, upon first installation of an application program on the computer, to use the decrypted operating system symmetric private key to encrypt the application program such that the encrypted application program is the only installed version of the application program on any non-transitory computer readable memory accessible by the computer;
enable the computer, each time a command is given to startup the application program, to use the decrypted operating system symmetric private key to decrypt a first portion of the encrypted application program needed implement the command, and to store what was decrypted in a random access memory accessible by the computer;
require the computer to use the decrypted operating system symmetric private key to subsequently decrypt any second portion of the encrypted application program that is needed during operation of the first portion and to store what was subsequently decrypted in the random access memory accessible by the computer; and
prevent access to the device symmetric private key after the device symmetric private key is first accessed to produce the decrypted operating system symmetric private key, unless express authorization is first obtained.

2. The computer system of claim 1, wherein the security program is further operable to prevent the computer from running any part of the application program that has not been first encrypted with the decrypted operating system symmetric private key.

3. The computer system of claim 1, wherein the security program is further operable to store the encrypted application program in the random access memory accessible by the computer.

4. The computer system claim 3, wherein the security program is further operable to:
produce a modulus value by causing the central processing unit to perform a modulus operand between an address bus value and a length of the decrypted operating system symmetric private key to derive a remainder;
add the value of one to the remainder producing an added remainder value;

use the added remainder value to point to a byte value in the decrypted operating system symmetric private key; and require the central processing unit to use the byte value for decryption of the encrypted application program stored in the random access memory.

5. The computer system of claim 1, wherein the security program is further operable to require the computer, after startup of the computer, to decrypt any executable code residing in the random access memory accessible by the computer, prior to running that executable code, where the decrypted operating system symmetric private key is used to decrypt said executable code.

6. The computer system of claim 1, wherein the security program is further operable to limit the storage device to a microchip integrated into a motherboard of the computer.

7. The computer system of claim 1, wherein the security program is further operable to prevent access to the device symmetric private key by implementing a procedure selected from the group consisting of producing and sending an automated signal from an operating system of the computer to the storage device, acting on manual input by a user at the physical location of the computer, producing and sending an automated signal from an basic input and output system of the computer to the security device, automatically activating a tristate switch, and causing the operating system to change a value in a flag to one recognized as a command to prevent such access.

8. The computer system of claim 1, wherein the first-non-transitory computer storage medium of the storage device is selected from the group consisting of an electronic chip, and a removable compact disk.

9. The computer system of claim 1, wherein the storage device is an electronic chip integrated into the computer.

10. The computer system of claim 9 further comprising:
a first-electronic tristate switch in the electronic chip; and
wherein the security program is further operable to activate the first-electronic tristate switch in order to prevent access to the device symmetric private key.

11. The computer system of claim 10, further comprising:
a second-electronic tristate switch in the electronic chip; and
wherein the security program is further operable to activate the second-electronic tristate switch to prevent reading the device symmetric private key from the random access memory accessible by the computer.

12. A storage device usable with a computer, the storage device comprising:
a non-transitory computer storage medium, a central processing unit, a data bus, and an address bus;
the non-transitory computer storage medium comprising a key usable for decrypting encrypted program code, the encrypted program code stored in a random access memory accessible by the computer, the key comprising a plurality of bytes wherein each byte in the plurality of bytes has a byte value;
the central processing unit of the storage device connectable to the random access memory through the data bus and the address bus;
the non-transitory computer storage medium storing computer code operable on the central processing unit of the storage device to:
identify a designated location in the random access memory accessible by the computer holding an encrypted byte of executable code;
perform a modulus operand between an address location of the encrypted byte of executable code and a length of the key to derive a remainder value;
add one to the remainder value deriving a summed value;
fetch the byte value of the byte in the plurality of bytes of the key, said byte located at the summed value;
use the byte value that is fetched to decrypt an encrypted executable code starting at the designated location in the random access memory accessible by the computer, wherein such use producing a decrypted executable code; and
execute the decrypted executable code.

13. A method for improving operation of a computer to provide the computer with immunity from infection of a software program by a software virus or by memory software code injection, the method comprising the steps of:
hosting an operating system in a non-transitory computer storage medium accessible by the computer;
receiving at the computer an encrypted operating system symmetric private key through a network connection;
decrypting the encrypted operating system symmetric private key on the computer to derive a decrypted operating system symmetric private key;
encrypting a software program using the decrypted operating system symmetric private key upon first installation of the software program and thereby create an encrypted software program that is the only installed version of the software program on the computer;
when executing a command to start the software program, requiring the operating system to use the decrypted operating system symmetric private key to decrypt a first part of the encrypted software program necessary to start the software program;
requiring the computer to use the decrypted operating system symmetric private key to subsequently decrypt any second part of the encrypted software program that is needed during operation of the first part; and
precluding the operating system from running any executable code that has not been previously encrypted with the decrypted operating system symmetric private key.

14. The method of claim 13, further comprising the step of storing the first part and any second part that is decrypted in a random access memory accessible by the computer.

15. A method for improving operation of a computer to provide the computer with immunity from infection of a software program by a software virus or by memory software code injection, the method comprising the steps of:
hosting an operating system in a non-transitory computer storage medium accessible by a computer;
receiving at the computer an encrypted operating system symmetric private key through a network connection;
decrypting the encrypted operating system symmetric private key on the computer to derive a decrypted operating system symmetric private key;
encrypting a software program using the decrypted operating system symmetric private key upon first installation of the software program and thereby create an encrypted software program that is the only installed version of the software program on the computer;
when executing a command to start the software program, requiring the operating system to use the decrypted operating system symmetric private key to decrypt a first part of the encrypted software program necessary to start the software program;
requiring the computer to use the decrypted operating system symmetric private key to subsequently decrypt any second part of the encrypted software program that is needed during operation of the first part; and storing the first part and any second part that is decrypted in a random access memory accessible by the computer.

16. The method of claim 15, further comprising the step of precluding the operating system from running any executable code that has not been previously encrypted with the decrypted operating system symmetric private key.

* * * * *